(12) United States Patent
Oguro et al.

(10) Patent No.: US 10,477,201 B2
(45) Date of Patent: Nov. 12, 2019

(54) IMAGE CAPTURING DEVICE, IMAGE CAPTURING SYSTEM, AND MOVING BODY

(71) Applicant: CANON KABUSHIKI KAISHA, Tokyo (JP)

(72) Inventors: Yasuhiro Oguro, Tokyo (JP); Noriyuki Shikina, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/036,243

(22) Filed: Jul. 16, 2018

(65) Prior Publication Data

US 2019/0037211 A1    Jan. 31, 2019

(30) Foreign Application Priority Data

Jul. 25, 2017   (JP) .................................. 2017-143686

(51) Int. Cl.
| | |
|---|---|
| *H04N 5/935* | (2006.01) |
| *H04N 17/00* | (2006.01) |
| *H04N 5/369* | (2011.01) |
| *H04N 5/341* | (2011.01) |
| *B62D 15/02* | (2006.01) |
| *B60W 30/09* | (2012.01) |
| *B60Q 9/00* | (2006.01) |

(52) U.S. Cl.
CPC ........... *H04N 17/002* (2013.01); *H04N 5/341* (2013.01); *H04N 5/3696* (2013.01); *B60Q 9/008* (2013.01); *B60W 30/09* (2013.01); *B60W 2550/10* (2013.01); *B62D 15/0265* (2013.01)

(58) Field of Classification Search
CPC .... H04N 17/002; H04N 5/341; H04N 5/3696; B60Q 9/008
USPC ..... 348/148, 135, 137, 143, 210, 46, 51, 47; 386/210, 224, 230
See application file for complete search history.

(56) References Cited

U.S. PATENT DOCUMENTS

| | | | |
|---|---|---|---|
| 5,883,668 A * | 3/1999 | Kazama | H04N 5/3454 348/294 |
| 6,388,245 B1 | 5/2002 | Lee | |
| 6,791,619 B1 | 9/2004 | Misawa | |
| 2011/0254960 A1 | 10/2011 | Seger | |
| 2017/0345306 A1 | 11/2017 | Mutou | |
| 2018/0098010 A1* | 4/2018 | Shikina | H01L 27/14603 |

FOREIGN PATENT DOCUMENTS

| | | | |
|---|---|---|---|
| GB | 2556198 | * | 5/2018 |
| JP | 2000-077637 A | | 3/2000 |
| JP | 2001-359000 A | | 12/2001 |
| JP | 2009-118427 A | | 5/2009 |
| JP | 2011-166793 A | | 8/2011 |
| WO | 16/117401 A1 | | 8/2017 |

\* cited by examiner

*Primary Examiner* — Robert Chevalier
(74) *Attorney, Agent, or Firm* — Canon U.S.A., Inc. IP Division

(57) ABSTRACT

An image capturing device includes reference pixels arranged in rows and configured to output pixel signals forming address signals indicating the positions of the rows to which the reference pixels belong, and a vertical scanning circuit having control signal output units each provided corresponding to the rows and each configured to output a control signal for controlling effective pixels and reference pixels of a corresponding one of the rows.

20 Claims, 35 Drawing Sheets

*FIG. 5*

|  | FIRST GROUP | | | | SECOND GROUP | | | | THIRD GROUP | | | | |
|---|---|---|---|---|---|---|---|---|---|---|---|---|---|
| D(0,0) → | 0 | 1 | 2 | 3 | 4 | 5 | 6 | 7 | 8 | 9 | 10 | 11 | ← COLUMN NUMBER |
| 0th ROW | 0 | 0 | 0 | 0 | 0 | 0 | 0 | 0 | 0 | 0 | 0 | 0 | |
| 1st ROW | 0 | 0 | 0 | 1 | 0 | 0 | 0 | 1 | 0 | 0 | 0 | 1 | ～4 |
| 2nd ROW | 0 | 0 | 1 | 0 | 0 | 0 | 1 | 0 | 0 | 0 | 1 | 0 | ～D(2,11) |
| ⋮ | ⋮ | ⋮ | ⋮ | ⋮ | ⋮ | ⋮ | ⋮ | ⋮ | ⋮ | ⋮ | ⋮ | ⋮ | |
| 16th ROW | 1 | 1 | 1 | 1 | 1 | 1 | 1 | 1 | 1 | 1 | 1 | 1 | ～D(16,11) |

| | IMAGE CAPTURING FRAME | SECOND PRE-IMAGE-CAPTURING FRAME | FIRST PRE-IMAGE-CAPTURING FRAME |
|---|---|---|---|
| IN THE CASE OF NO ABNORMALITY IN REFERENCE PIXEL 4 | 0th/1st/2nd/...16th ROW × 0th/1st/2nd/3rd COLUMN values | 0th/1st/2nd/...16th ROW × 0th/1st/2nd/3rd COLUMN values (all 1s) | 0th/1st/2nd/...16th ROW × 0th/1st/2nd/3rd COLUMN values (all 0s) |
| IN THE CASE OF ABNORMALITY IN REFERENCE PIXEL 4 | (same with REFERENCE PIXEL WITH ABNORMALITY at 2nd ROW, 2nd COLUMN) | (same with REFERENCE PIXEL WITH ABNORMALITY at 2nd ROW, 2nd COLUMN = 0) | (same with REFERENCE PIXEL WITH ABNORMALITY at 2nd ROW, 2nd COLUMN) |

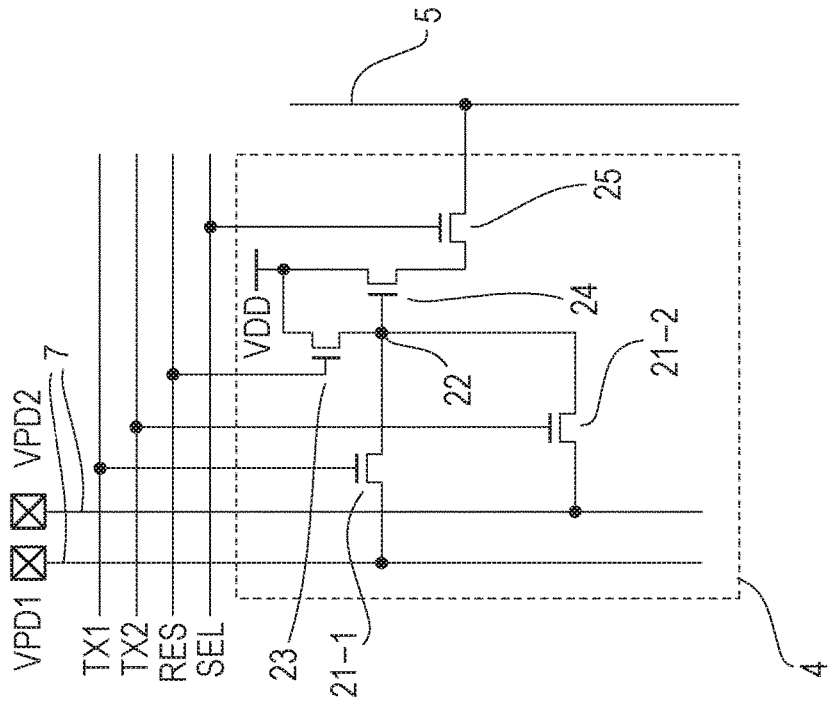
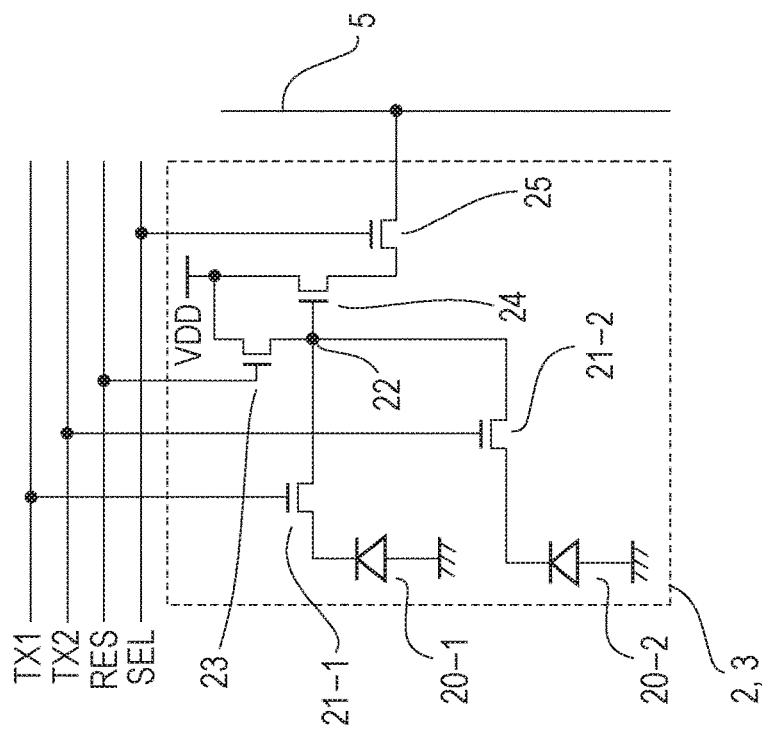

FIG. 18

FIG. 34B
FRONT VIEW
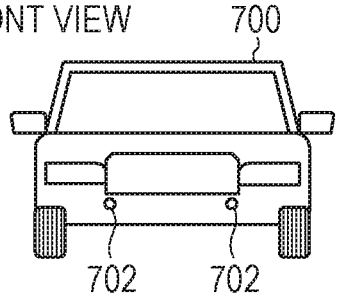
UPPER VIEW
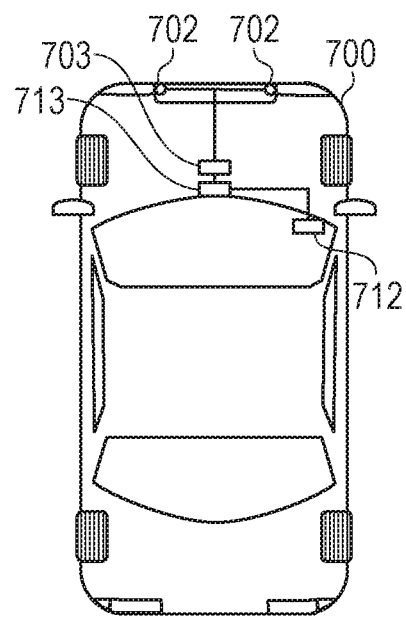
BACK VIEW
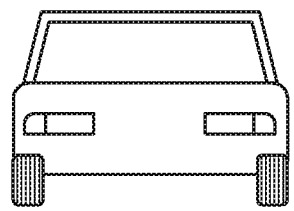

IMAGE CAPTURING DEVICE, IMAGE CAPTURING SYSTEM, AND MOVING BODY

BACKGROUND OF THE INVENTION

Field of the Invention

The aspect of the embodiments relates to an image capturing device, a pixel chip, a signal processing chip, an image capturing system, and a moving body.

Description of the Related Art

Japanese Patent Laid-Open No. 2009-118427 describes failure detection of an image capturing device including an effective pixel region and a non-effective pixel region.

In the effective pixel region, pixels with photodiodes are arranged, and each photodiode receives incident light from the outside to generate an electric signal by photoelectric conversion. The non-effective pixel region includes a reference region and a failure detection pattern region. In the reference region, pixels covered with light shielding films are arranged, and generate reference signals. In the failure detection pattern region, failure detection pixels are arranged such that photodiode equipped pixels and photodiode non-equipped pixels are arranged in a specific arrangement pattern. A signal corresponding to the arrangement pattern is checked for each frame, and in this manner, the presence or absence of failure of the image capturing device is determined.

Japanese Patent Laid-Open No. 2009-118427 fails to disclose a configuration in which reference pixels including the photodiode equipped pixels and the photodiode non-equipped pixels arranged in the specific arrangement pattern are arranged in rows. Thus, no study has been conducted on a circuit configured to suitably read out signals from the reference pixels, the circuit contributing to high-speed determination on the presence or absence of failure of the image capturing device in the case of arranging the reference pixels in the rows.

SUMMARY OF THE INVENTION

An image capturing device includes effective pixels each configured to output a signal corresponding to a quantity of incident light and arranged in rows and columns, reference pixels arranged in the rows and configured to output pixel signals forming address signals indicating positions of a row to which the reference pixels belong, and a vertical scanning circuit having control signal output units each provided corresponding to the rows and each configured to output a control signal for controlling effective pixels and reference pixels of a corresponding one of the rows.

Further features of the disclosure will become apparent from the following description of exemplary embodiments (with reference to the attached drawings).

BRIEF DESCRIPTION OF THE DRAWINGS

FIG. 5 is a diagram of an address signal.
FIG. 10 is a diagram of the address signal for each frame.
FIG. 11 is a diagram of the address signal for each frame.
FIGS. 14A and 14B are diagrams of equivalent circuits of pixels.
FIG. 18 is a diagram of the address signal.
FIGS. 34A and 34B are a diagram and a view of the entirety of a moving body.

DESCRIPTION OF THE EMBODIMENTS

Figure 1:
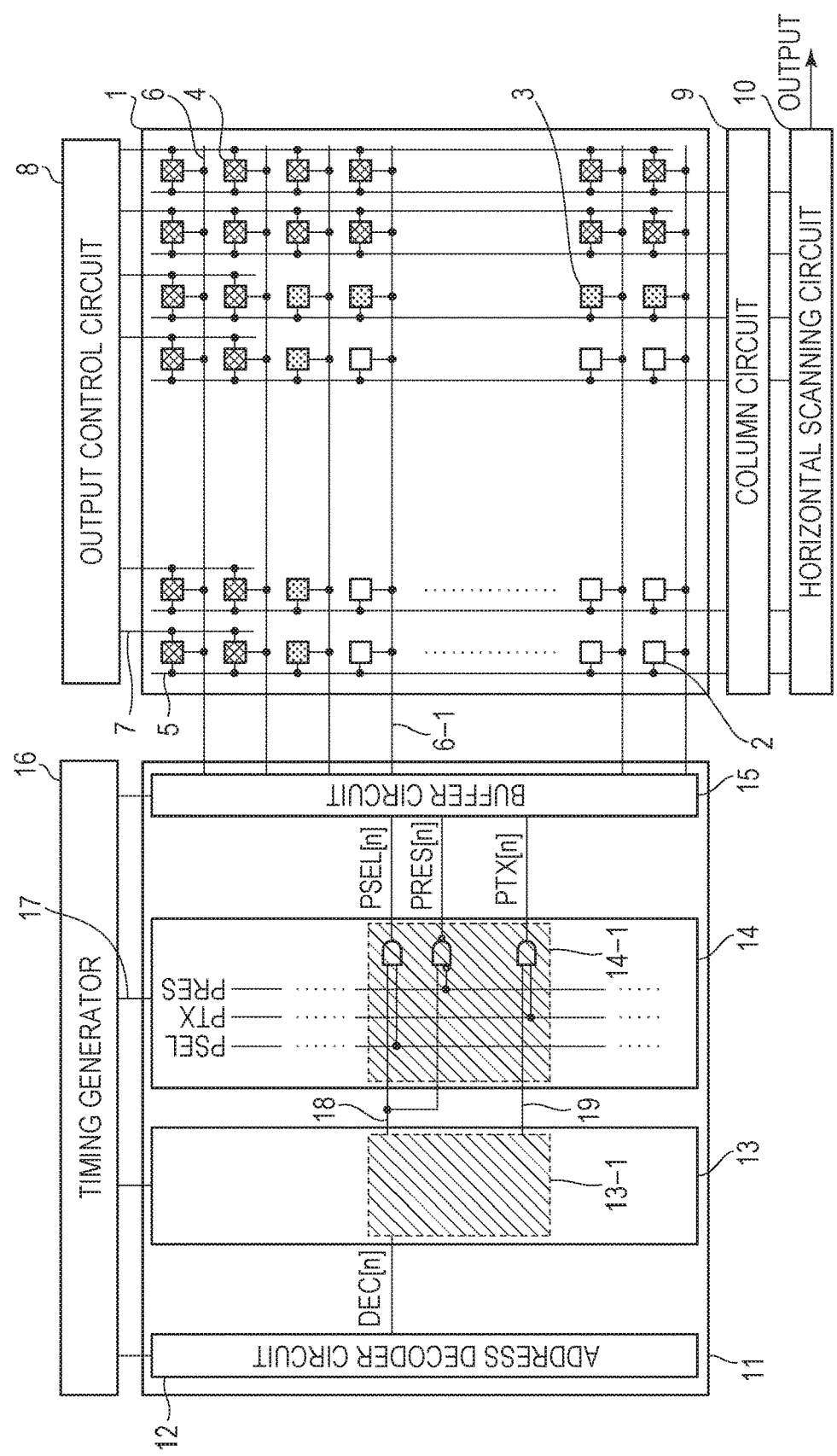
FIG. 1 is a diagram of a configuration of an image capturing device.

One embodiment of the disclosure is an image capturing device. The image capturing device includes multiple pixels arranged in a matrix. The multiple pixels include light receiving pixels and reference pixels. Light is input to the light receiving pixel from the outside. The light receiving pixel is configured to output a pixel signal corresponding to the incident light. The reference pixel is configured to output a pixel signal for forming an address signal.

The address signal contains information on a row or column position. Address signals with different signal values are assigned to at least two rows or two columns. A single address signal includes a pixel signal from a single reference pixel or pixel signals from multiple reference pixels.

In an embodiment in which a single address signal includes a pixel signal from a single reference pixel, at least one reference pixel is arranged in each row. The reference pixels of different rows output multiple pixel signals of different levels. The level means a current value or a voltage value of the pixel signal. The level of the pixel signal of the reference pixel indicates the signal value of the address signal. For example, a single reference pixel is arranged in each row, the reference pixel of an odd-numbered row outputs a high-level pixel signal, and the reference pixel of an even-numbered row outputs a low-level pixel signal. With this configuration, it can be determined whether the image capturing device reads out the signal of the even-numbered row or the odd-numbered row. Alternatively, the reference pixel for each row outputs a pixel signal of a level unique to a row to which the reference pixel belongs. In a case where the image capturing device includes pixels in 4000 rows, the reference pixels output pixel signals of 4000 levels. With this configuration, the image capturing device can determine the row from which the signal is read out.

In another example, multiple reference pixels are arranged in a single row. In this example, a single address signal includes pixel signals from the multiple reference pixels. For example, each reference pixel outputs a high-level pixel signal or a low-level pixel signal. In the case of arranging N reference pixels, the address signal is formed as an N-bit digital signal by combination of the high-level pixel signal and the low-level pixel signal. The high-level pixel signal corresponds to "1" of each bit, and the low-level pixel signal corresponds to "0" of each bit. In this case, an arrangement pattern of 0 and 1 of the digital signal indicates a signal value of the address signal. 12 reference pixels are arranged so that an address signal with a signal value unique to each of 4096 rows can be generated. Note that the unique address signal is not necessarily generated for all rows. For the pixels of 4096 rows, the reference pixels included in each row may be less than 12 pixels. In this case, the address signal with the same signal value is assigned to multiple rows.

Note that in each of the above-described examples, each reference pixel may output at least two pixel signals of different levels. Alternatively, each reference pixel may be configured to output only a pixel signal of a single level. Moreover, in description above, the image capturing device configured such that the reference pixel(s) is included in each row has been described by way of example. However, for an image capturing device configured such that a reference pixel(s) is included in each column, the "row" in the specification may be replaced with the "column".

One embodiment of the disclosure is an image capturing system. The image capturing system includes a signal processing unit configured to process a pixel signal output from an image capturing device to obtain an image signal. The signal processing unit is further configured to receive an address signal output from the image capturing device, thereby determining whether or not the pixel signal is normally output from the image capturing device. The address signal is the same as that described in the above-described embodiment of the image capturing device.

In one embodiment, the signal processing unit determines whether or not pixel signals of multiple rows are output in a predetermined order. It is determined whether or not multiple address signals sequentially output in association with read-out of the pixel signals of the multiple rows change as expected. For example, in a case where address signals of signal values different between an odd-numbered row and an even-numbered row are assigned, it is determined whether or not the address signals of the different signal values are alternately output. With this configuration, it can be determined whether or not the pixel signals of the multiple rows are output in the predetermined order.

Alternatively, the signal processing unit determines whether or not pixel signals of a specified row are properly output. It is determined whether or not a signal value of an address signal output together with the pixel signal is coincident with a signal value assigned to the specified row. With this configuration, it can be determined whether or not pixel signals are normally output from a predetermined row.

In the present embodiment, while the address signal is outputting the expected signal value, it is determined that the image capturing device is normally operated or normally outputs the signal. In a case where the signal value of the address signal is different from the expected signal value, the signal processing unit determines that the image capturing device is not normally operated or is failed.

In the present embodiment, the external signal processing unit of the image capturing device determines whether or not the image capturing device normally outputs the pixel signal. On the other hand, in the embodiment of the image capturing device, an internal circuit of the image capturing device may determine whether or not the signal is normally output.

The above-described image capturing device or image capturing system is used for a camera, a security device, a robot, etc. Alternatively, the above-described image capturing device or image capturing system is used for a moving body. In one embodiment, in a moving body for transporting a person, such as an automobile, an airplane, and a ship, an equipped device is to have high reliability. According to the above-described image capturing device or image capturing system, it can be determined whether or not the pixel signal is normally output from the image capturing device. Thus, in a case where the image capturing device is failed, image capturing operation can be stopped, or a warning of failure can be made.

In some embodiments, an image capturing device or image capturing system includes a unit configured to detect an abnormality of a reference pixel. In other words, in a case where a signal value of an address signal output from the reference pixel is not coincident with an expected signal value, it is determined whether such inconsistency is due to the abnormality or failure of the reference pixel or indicates that a signal is actually read out from an unintended light receiving pixel. By such a unit, reliability of the image capturing device or image capturing system or a moving body using the image capturing device or image capturing system can be further improved.

Hereinafter, the embodiments of the disclosure will be described in detail with reference to the drawings. The disclosure is not limited to only the embodiments described below. Variations configured such that some configurations of the embodiments described below are changed without departing from the gist of the disclosure are also embodiments of the disclosure. Moreover, an example where some configurations of any of the embodiments below are added to other embodiments or are replaced with some configurations of other embodiments is also an embodiment of the disclosure.

First Embodiment

A first embodiment will be described. FIG. 1 schematically illustrates a configuration of an image capturing device according to the first embodiment. The image capturing device includes multiple pixels 2, 3, and 4 arranged in multiple rows and multiple columns. The multiple pixels include light receiving pixels 2, optical black pixels (hereinafter referred to as "OB pixels") 3, and reference pixels 4. The image capturing device further includes a vertical scanning circuit 11, column circuits 9, a horizontal scanning circuit 10, an output control circuit 8, vertical output lines 5, drive control lines 6-1, and output control lines 7. The image capturing device further includes a timing generator 16.

The multiple pixels 2, 3, and 4 included in a single row are connected to the common drive control line 6-1. The vertical scanning circuit 11 is configured to supply a drive signal to the multiple pixels 2, 3, and 4 via the drive control line 6-1. Based on the drive signal, pixel signals are output in parallel from the multiple pixels 2, 3, and 4 included in the single row to the vertical output lines 5. The multiple pixels 2, 3, and 4 included in a single column are connected to the common vertical output line 5. The pixel signals output to the vertical output line 5 are input to the column circuit 9. A single column circuit 9 is arranged for each vertical output line 5. The column circuit 9 is configured to perform operation such as amplification of the pixel signal, analog-digital conversion for the pixel signal, holding of the pixel signal, and noise removal of the pixel signal. The pixel signals are sequentially read out from the column circuits 9 by the horizontal scanning circuit 10.

The light receiving pixel 2 is configured to receive light from the outside. The light receiving pixel 2 is configured to output the pixel signal corresponding to the incident light. The OB pixel 3 is covered with a not-shown light shielding film. The light shielding film is arranged such that the light receiving pixel 2 is exposed. The OB pixel 3 is configured to output a pixel signal of a level corresponding to a state in which no incident light is present, i.e., a pixel signal of a dark level. The pixel signal output from the OB pixel 3 might contain a noise component varying according to pixel. For this reason, there is a probability that the pixel signal output from the OB pixel 3 varies according to location. However, the quantity of noise component is associated with, e.g., manufacturing variation or thermal noise, and therefore, is random. For this reason, the pixel signal from the OB pixel 3 is not information for specifying row and column positions.

The reference pixel 4 is configured to output the pixel signal for forming an address signal. In the present embodiment, any of the above-described address signals is used. In the present embodiment, the output control circuit 8 is configured to control the level of the pixel signal output from the reference pixel 4. Specifically, the output control circuit 8 supplies a predetermined voltage to the output control line 7. The reference pixel 4 outputs a pixel signal of a level corresponding to the voltage of the output control line 7. The reference pixel 4 may be covered with a not-shown light shielding film. Alternatively, the reference pixel 4 may be exposed because the reference pixel 4 has no photodiode.

The image capturing device further has the timing generator 16.

The vertical scanning circuit 11 will be described.

The vertical scanning circuit 11 has a logic unit 13 and a control signal generation unit 14. The logic unit has multiple logic cells 13-$n$ each provided corresponding to the rows of the pixels 2, 3, and 4. Moreover, the control signal generation unit 14 has multiple signal generation cells 14-$n$ each provided corresponding to the rows of the pixels 2, 3, and 4. Each of the multiple signal generation cells 14-$n$ is a control signal output unit configured to output control signals for controlling the light receiving pixels 2, the OB pixels 3, and the reference pixel 4. In the present embodiment, a single control signal output unit (a single signal generation cell 14-$n$) is provided corresponding to a single pixel row.

A scanning instruction signal as a signal containing information for specifying an n-th row address is supplied to an address decoder circuit 12 from the timing generator 16. The address decoder circuit 12 is configured to supply a decoder signal DEC[n] to an n-th row logic generation unit 13-1.

In response to the decoder signal DEC[n], the n-th row logic generation unit 13-1 supplies a row selection signal 18 as a row selection pulse to an n-th row signal generation cell 14-1. Moreover, the n-th row logic generation unit 13-1 is configured to supply a shutter operation signal 19 as a shutter operation pulse to the n-th row signal generation cell 14-1.

The timing generator 16 is configured to supply a pixel drive signal 17 to the control signal generation unit 14. The pixel drive signal includes a PSEL, a PTX, and a PRES.

The n-th row signal generation cell 14-1 is configured to generate a PSEL[n] by logic processing using the row selection signal 18 supplied from the n-th row logic generation unit 13-1 and the PSEL and to generate a PRES[n] by logic processing using the row selection signal 18 and the PRES. Moreover, the n-th row signal generation cell 14-1 is configured to generate a PTX[n] by logic processing using the shutter operation signal 19 supplied from the n-th row logic generation unit 13-1 and the PTX.

The control pulses PSEL[n], PRES[n], PTX[n] generated by the n-th row signal generation cell 14-1 are supplied to an n-th row pixel drive control line 6-1 of an image capturing region 1 via a buffer circuit 15.

The control pulses output from the vertical scanning circuit 11 are supplied to the light receiving pixels 2, the OB pixels 3, and the reference pixels 4. The light receiving pixel 2 includes a photodiode (hereinafter referred to as a "PD"), and is configured to photoelectrically convert the incident light from the outside into an electric signal, thereby outputting the pixel signal corresponding to the quantity of incident light. The OB pixel 3 is configured such that an upper portion of the light receiving pixel 2 is covered with the light shielding film, and is configured to output the dark level as a reference for the pixel signal. The reference pixel 4 is configured to output the address signal for identifying the row in the image capturing region 1. A fixed voltage is supplied to the reference pixel 4 from the output control circuit 8 via the output control line 7. Moreover, the reference pixel 4 has no PD, and is configured to output the signal corresponding to the fixed voltage supplied from the output control circuit 8.

The common pixel drive signal line 6 is connected to the light receiving pixels 2, the OB pixels 3, and the reference pixels 4 of the single row. Moreover, the common vertical output line 5 is connected to the light receiving pixels 2, the OB pixels 3, and the reference pixels 4 of the single column. The pixel signals of the light receiving pixels 2, the OB pixels 3, and the reference pixels 4 output to the vertical output line 5 of each column are input to the column circuit 9 corresponding to the column in which the pixels are arranged.

The column circuit 9 is configured to perform operation such as amplification of the pixel signal, holding of the pixel signal, and analog-digital conversion of the pixel signal.

The horizontal scanning circuit 10 is configured to sequentially scan the output signals of the column circuits 9, thereby outputting these signals to the outside of the image capturing device.

In this embodiment, the decoder signal output from the address decoder circuit 12 is in units of layer, and the selected row in the image capturing region 1 is a single row. In the present embodiment, it is configured such that a single row in the image capturing region 1 is selected for a single layer of the decoder signal.

Figure 3A:
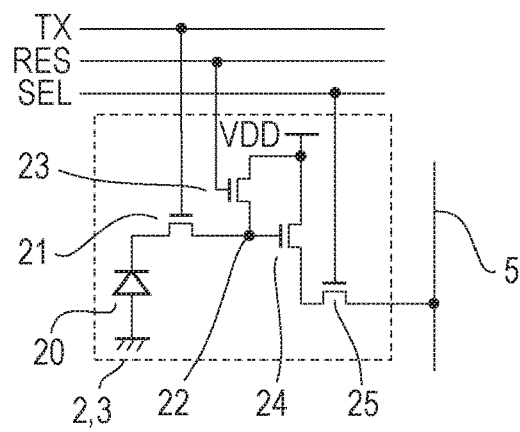
FIGS. 3A to 3C are diagrams of equivalent circuits of pixels.
Figure 3B:
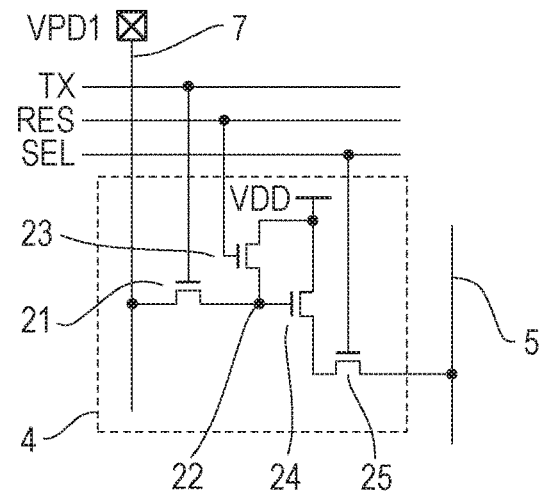
Figure 3C:
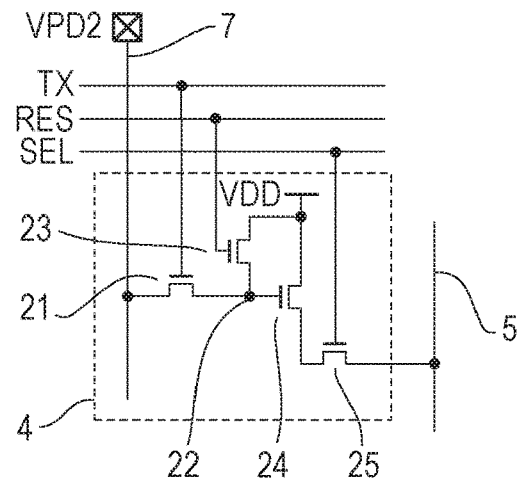

FIGS. 3A to 3C illustrate configurations of the light receiving pixel 2, the OB pixel 3, and the reference pixel 4 in the present embodiment.

FIG. 3A is an equivalent circuit diagram of the light receiving pixel 2 and the OB pixel 3. FIGS. 3B and 3C are equivalent circuit diagrams of the reference pixel 4.

As illustrated in FIG. 3A, the light receiving pixel 2 and the OB pixel 3 have the same circuit arrangement. A PD 20 configured to photoelectrically convert the incident light is provided. The PD 20 of the OB pixel 3 is light-shielded, and a noise signal corresponding to the state in which no light is input is accumulated.

On the other hand, as illustrated in FIGS. 3B and 3C, the reference pixel 4 has no PD 20. Instead, the reference pixel 4 is connected to the output control line 7. Voltage values supplied to the reference pixel 4 via the output control line 7 include a VPD1 and a VPD2. The VPD1 and the VPD2 are different voltage values, and the output control circuit 8 can select, as the voltage to be supplied to the reference pixel 4, either one of the VPD1 and the VPD2. Thus, the reference pixel 4 can select and output, for each pixel, a pixel signal of a level corresponding to the VPD1 or a pixel signal of a level corresponding to the VPD2.

Each of the light receiving pixel 2 and the OB pixel 3 includes a floating diffusion (hereinafter referred to as an "FD") 22 configured to accumulate an electric charge generated at the PD 20, and a transfer transistor 21 configured to transfer the electric charge generated at the PD 20 to the FD 22.

The reference pixel 4 also includes a transfer transistor 21. One node of the transfer transistor 21 is connected to a supply line for supplying the voltage value VPD1 or the voltage value VPD2, and the other node of the transfer transistor 21 is connected to a gate of an amplification transistor 24. The transfer transistor 21 is configured to transfer, to an FD 22, a pixel signal corresponding to the voltage value VPD1 or the voltage value VPD2 supplied from the output control line 7. In the FD 22 of the reference pixel 4, the pixel signal corresponding to the voltage value VPD1 or the voltage value VPD2 supplied from the output control line 7 is accumulated.

Each of the light receiving pixel 2, the OB pixel 3, and the reference pixel 4 has a reset transistor 23 configured to reset the FD 22 to a power source voltage VDD, and the amplification transistor 24 configured to output a signal corresponding to the voltage of the FD 22. Further, each pixel has a row selection transistor 25 configured to connect the output of the amplification transistor 24 to the vertical output line 5.

Of the control signals supplied from the buffer circuit 15 to the pixel drive signal line 6, the signal PRES for resetting the pixel signal is output to a gate of the reset transistor 23. Moreover, the signal PTX is output to a gate of the transfer transistor 21 configured to transfer, to the FD 22, the signal accumulated in the PD 20 or the pixel signal corresponding to the voltage value supplied from the output control line 7. Further, the signal PSEL is output to a gate of the row selection transistor 25 of each pixel belonging to the pixel row selected as a read-out row.

With the above-described configuration, the light receiving pixel 2 outputs the pixel signal generated according to the quantity of incident light, the OB pixel 3 outputs the dark level signal generated by light shielding, and the reference pixel 4 outputs the pixel signal of the level corresponding to the voltage value VPD1 or the voltage value VPD2 selected by the output control circuit 8.

Next, details of driving until the control signals are supplied to the light receiving pixel 2, the OB pixel 3, and the reference pixel 4 after output of the decoder signal will be described.

Figure 2:
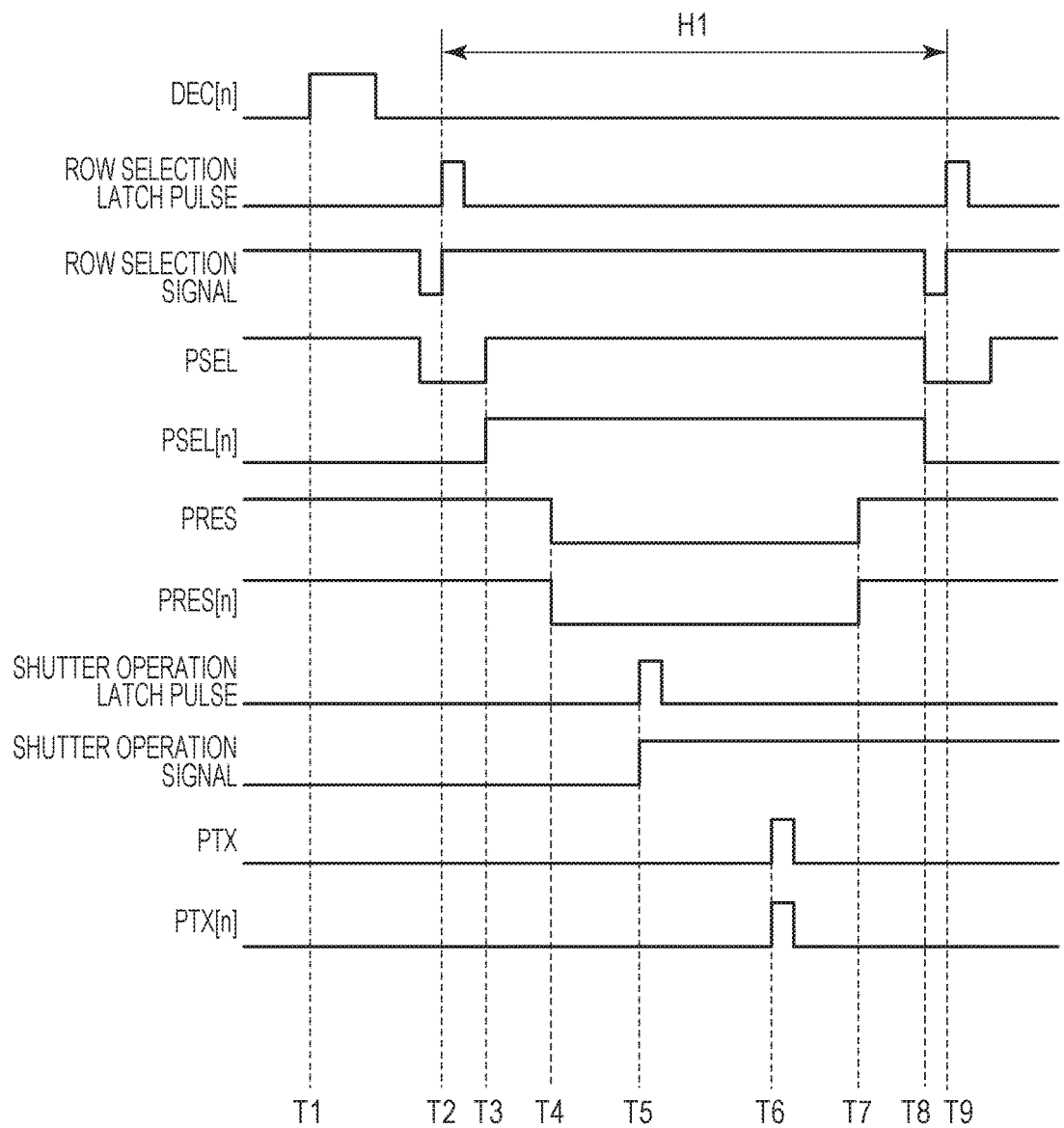
FIG. 2 is a chart of driving of the image capturing device.

FIG. 2 is a timing chart when an n-th layer of the decoder signal is output.

At a time point T1, the address decoder circuit 12 outputs a decoder signal DEC[n] pulse for selecting an n-th row.

Before a time point T2, the row selection signal 18 and the signal PSEL reach a low level.

At the time point T2, the timing generator 16 supplies a row selection latch pulse to the n-th row logic generation unit 13-1. Accordingly, the row selection signal 18 reaches a high level.

At a time point T3, the timing generator 16 brings, to the high level, the signal PSEL to be supplied to the n-th row signal generation cell 14-1. The AND logical operation of the row selection signal 18 and the signal PSEL is obtained, and accordingly, an n-th row signal PSEL[n] reaches the high level.

At a time point T4, the pixel reset pulse PRES turns to the low level from the high level. The AND logical operation of the row selection signal 18 and the PRES is obtained, and accordingly, an n-th row pixel reset pulse PRES[n] reaches the low level.

At a time point T5, the timing generator 16 supplies a shutter operation latch pulse to the n-th row logic generation unit 13-1, and the shutter operation signal 19 reaches the high level.

At a time point T6, the pixel transfer pulse PTX reaches the high level. The AND logical operation of the shutter operation signal 19 and the PTX is obtained, and accordingly, an n-th row pixel transfer pulse PTX[n] reaches the high level.

At a time point T7, the PRES reaches the high level, and at the same time, the PRES[n] also reaches the high level.

At a time point T8, the PSEL reaches the low level, and at the same time, the PSEL[n] also reaches the low level.

At a time point T9, the timing generator 16 supplies the row selection latch pulse to the logic generation unit 13-1, and an n+1-th row pixel drive signal is generated.

A period H1 from the time point T2 to the time point T9 is an n-th row pixel drive signal generation period.

Figure 4:
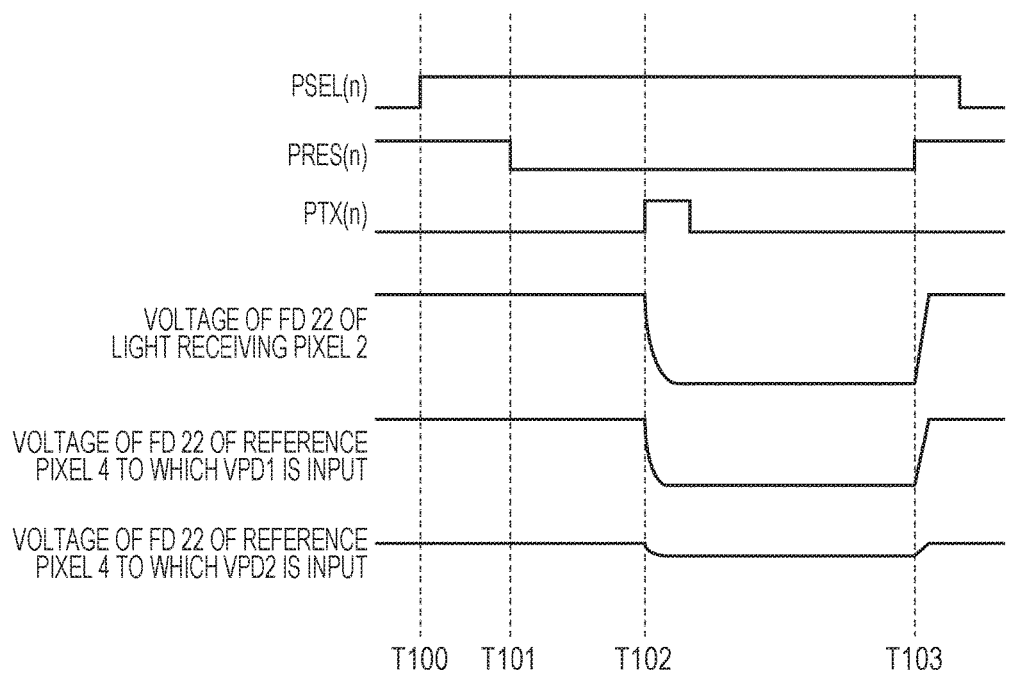
FIG. 4 is a chart of operation of the pixels.

FIG. 4 illustrates operation timing of the light receiving pixel 2, the OB pixel 3, and the reference pixel 4.

A signal PSEL(n) is a signal input to the gate of the row selection transistor 25. A signal PRES(n) is a signal input to the gate of the reset transistor 23. A signal PTX(n) is a signal input to the gate of the transfer transistor 21. Note that in a case where the signal input to the gate of the transistor is the high level, the transistor is turned ON. On the other hand, in a case where the signal input to the gate is the low level, the transistor is turned OFF. Moreover, FIG. 4 illustrates the voltage of the FD of the light receiving pixel 2 and the voltage of the FD of the reference pixel 4.

In a period before a time point T100, the row selection transistor 25 is OFF. That is, in the period before the time point T100, the pixel row targeted for driving illustrated in FIG. 4 is not selected as the pixel row to which the signals are output. Meanwhile, the reset transistor 23 is ON. Thus, the power source voltage VDD and the gate of the amplification transistor 24 are connected together. Thus, the voltage of the FD 22 is reset to a voltage corresponding to the power source voltage VDD. Thus, the voltage of the FD of each of the light receiving pixel 2, the OB pixel 3, and the reference pixel 4 belonging to the pixel row illustrated in FIG. 4 is the power source voltage VDD. In a precise sense, the voltage of the FD 22 at this point is a voltage obtained in such a manner that a voltage threshold Vth of the reset transistor 23 is subtracted from the power source voltage VDD. However, there is no difficulty in taking such a voltage as the power source voltage VDD. For this reason, the voltage of the FD 22 at this point is taken as the power source voltage VDD.

In a period before a time point T102, the transfer transistor 21 is OFF. Thus, the PD 20 and the gate of the amplification transistor 24 are electrically disconnected from each other. The PD 20 is in a floating state, and therefore, the electric charge photoelectrically converted according to the quantity of incident light is accumulated in the light receiving pixel 2. Moreover, the electric charge of the dark level for no light incidence is accumulated in the OB pixel 3. In the reference pixel 4, the signal of the level corresponding to the VPD1 or the VPD2 as the voltage value selected by the output control circuit 8 is accumulated.

At the time point T100, the pixel row targeted for operation illustrated in FIG. 4 is selected as the pixel row for outputting the signals. That is, the signal PSEL(n) reaches the high level, and the row selection transistor 25 is turned ON. Accordingly, the amplification transistor 24 and the vertical output line 5 are connected together.

At the time point T101, the RES signal reaches the low level, and the reset transistor 23 is turned OFF. Accordingly, the power source voltage VDD and the gate of the amplification transistor 24 are electrically disconnected from each other. A noise signal corresponding to reset noise of the FD 22 of each of the light receiving pixel 2, the OB pixel 3, and the reference pixel 4 is output to the vertical output line 5 by the amplification transistor 24.

At a time point T102, the transfer transistor 21 is turned ON. Accordingly, the PD 20 and the gate of the amplification transistor 24 are electrically connected together. Thus, in each of the light receiving pixel 2 and the OB pixel 3, the electric charge accumulated in the PD 20 is transferred to the FD 22. Accordingly, the voltage of the FD 22 changes from the voltage corresponding to the power source voltage VDD to a signal voltage Vsig. The amplification transistor 24 of the light receiving pixel 2 outputs, to the vertical output line 5, a pixel signal of a signal level corresponding to the signal voltage Vsig.

Meanwhile, in the reference pixel 4, the voltage value VPD1 or the voltage value VPD2 selected by the output control circuit 8 is transferred to the FD 22. Accordingly, the voltage of the FD 22 changes from the voltage corresponding to the power source voltage VDD to the voltage VPD1 in the case of supplying the voltage value VPD1 to the FD 22. On the other hand, the voltage of the FD 22 changes from the voltage corresponding to the power source voltage VDD to the voltage VPD2 in the case of supplying the voltage value VPD2 to the FD 22. The amplification transistor 24 of the reference pixel 4 outputs, to the vertical output line 5, the pixel signal of the signal level corresponding to the voltage value VPD1 or the voltage value VPD2.

At a time point T103, the reset transistor 23 is turned ON. Accordingly, the FD 22 is reset to the power source voltage VDD. Thereafter, the row selection transistor 25 is turned OFF. Accordingly, the operation of reading out the pixel signals from the light receiving pixels 2, the OB pixels 3, and the reference pixels 4 included in the single row is completed.

The light receiving pixels 2, the OB pixels 3, and the reference pixels 4 belonging to the same row are connected to the common pixel drive signal line 6. Thus, each of the pixel signals of the light receiving pixels 2, the OB pixels 3, and the reference pixels 4 belonging to the same row is read out in parallel by a corresponding one of the vertical output lines 5. Note that the pixel signal of the reference pixel 4 forms the address signal for identifying each row in the image capturing region 1.

Next, details of the address signal formed of pixel signals output from the multiple reference pixels 4 will be described.

(First Example of Address Signal)

The address signal formed of the pixel signals output from the reference pixels 4 will be described in detail. A digital signal is used as the address signal of this example. That is, the pixel signal of the reference pixel 4 corresponds to a signal value of each bit of the digital signal. As illustrated in FIG. 5, a pixel signal of a level corresponding to a voltage Va is represented by and a pixel signal of a level corresponding to a voltage Vb is represented by "1". For distinguishing the pixel signals from each other, reference characters "D(m, n)" are assigned to the pixel signal. A character "m" represents a row number, and a character "n" represents a column number.

FIG. 5 schematically illustrates a signal value of the address signal of this example. FIG. 5 illustrates, by way of example, the pixel signals of the reference pixels 4 in 16 rows×12 columns. However, the number of reference pixels 4 is not limited to above.

In this example, a single row includes 12 reference pixels 4. That is, in this example, the address signal is represented as a 12-bit digital signal. The address signal formed of the pixel signals from the reference pixels 4 of the single row includes three sub-signal groups with the same signal value. For example, the reference pixels 4 with column numbers 0 to 3 in the first row output a sub-signal with a signal value of "0001". The reference pixels 4 with column numbers 4 to 7 in the first row output a sub-signal with the same signal value of "0001". Moreover, the reference pixels 4 with column numbers 8 to 11 in the first row output a sub-signal with the same signal value of "0001".

Moreover, the address signals have signal values different among the rows. For example, the sub-signal of the address signal of the first row has a signal value of "0001". A sub-signal of the address signal of the second row has a signal value of "0010". The values of "0001" and "0010" are different signal values.

Figure 6:
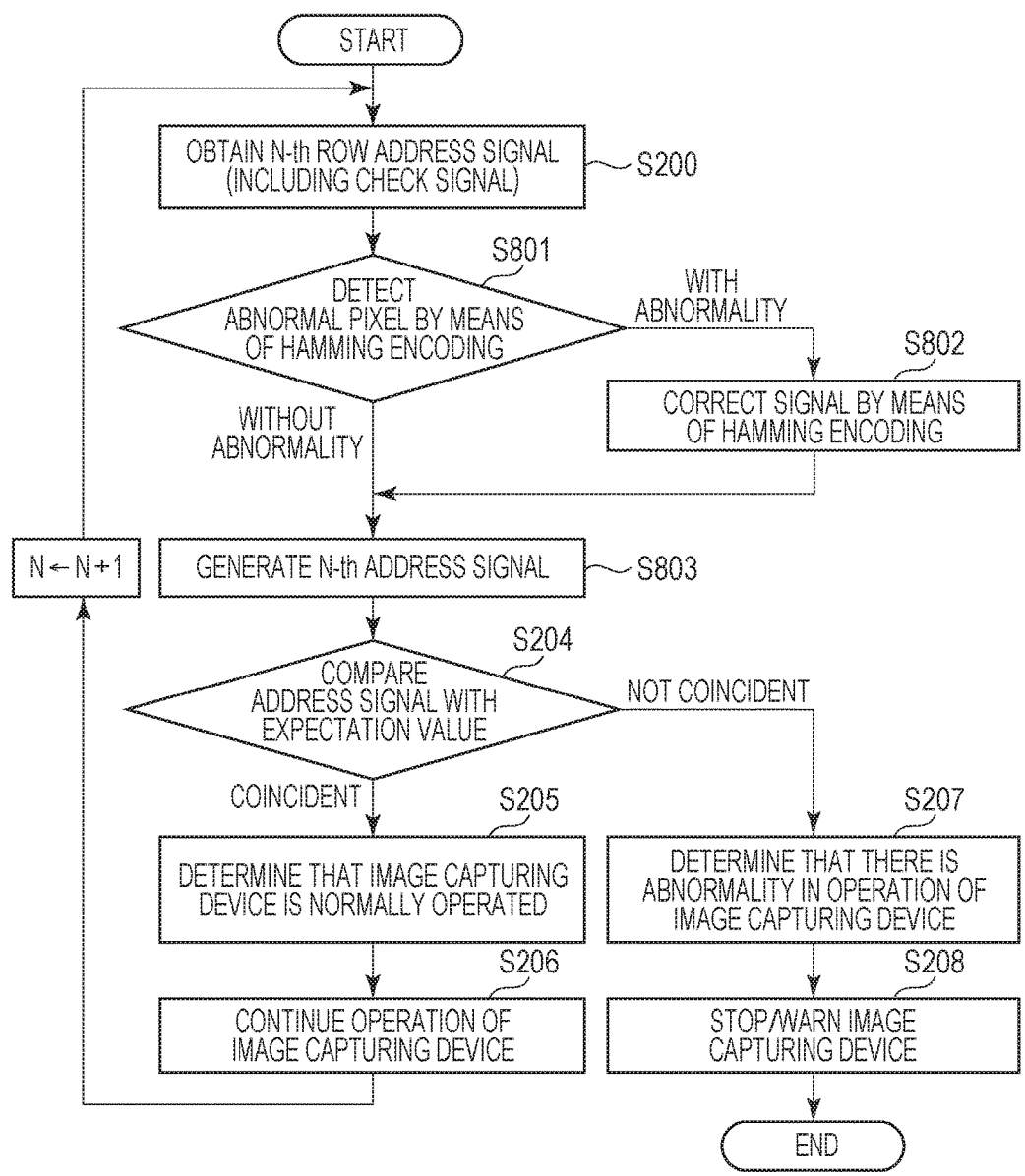
FIG. 6 is a flowchart of comparison between the address signal and an expectation value.

Subsequently, the method for determining, based on the address signal, whether or not the image capturing device normally outputs the pixel signals will be described. FIG. 6 is a flowchart for determining operation of the image capturing device. For example, such determination processing is performed by an external signal processing unit of the image capturing device. Alternatively, the determination processing is performed by an internal signal processing circuit of the image capturing device.

At step S200, an N-th row address signal is obtained. As mentioned above, the address signal includes three sub-signal groups.

At step S801, it is determined whether or not the signal values of three sub-signal groups are coincident with each other. In a case where all of the signal values of three sub-signals are coincident with each other, it is determined that there is no abnormality in the reference pixels 4. In this case, the processing proceeds to a subsequent step S803. If any one of the signal values of three sub-signal groups is different from the other signal values, it is determined that there is an abnormality in some of the reference pixels 4. In this case, the processing proceeds to step S802.

At step S802, the signal value as the majority of sub-signals is used as the address signal representing this row. In other words, at step S802, majority decision by means of three sub-signals is made. For example, in a case where the single values of three sub-signals are each "0001", "0001", and "0101", "0001" is used as the signal value of the address signal indicating an N-th row.

At step S803, the address signal with the signal value obtained at the previous step is generated as the address signal indicating the N-th row. In a case where all of the signal values of three sub-signal groups are coincident with each other, the address signal with such a coincident signal value is generated. In a case where any one of the signal values of the sub-signals is different from the other signal values, the address signal with the signal value selected by the majority decision at step S802 is generated.

At step S204, the generated address signal is compared with an expectation value of the N-th row address signal. In a case where the signal value of the address signal is coincident with the expectation value, it is, at step S205, determined that the image capturing device is normally operated. Then, the processing transitions to read-out processing for an N+1-th row.

In a case where the signal value of the address signal is not coincident with the expectation value at step S204, it is, at step S207, determined that there is an abnormality in operation of the image capturing device. That is, it is determined that failure occurs in the image capturing device. In this case, at step S208, operation of the image capturing device is stopped, or a warning of failure of the image capturing device is made.

As described above, in this example, the pixel signals output from the reference pixels 4 form the address signal indicating the position of the row to which the reference pixels 4 belong. With this configuration, it can be determined whether or not the pixel signals have been normally output from the specified row. As a result, failure of the image capturing device can be accurately sensed.

Moreover, in this example, the single address signal includes three sub-signals with the same signal value. With this configuration, the presence or absence of failure of the image capturing device can be accurately determined even when there is an abnormality in some of the reference pixels 4. That is, the multiple reference pixels included in the single row function, as a whole, as a detection unit configured to detect the abnormality of the reference pixel.

Beneficial Effects of First Embodiment

In the present embodiment, in a case where a single stage of address decoder is selected, one of the multiple pixel rows is selected. The pixel signals of the multiple reference pixels 4 included in the selected single row form the address signal with the value different from that of the pixel signals of the multiple reference pixels of other rows, the address signal being unique to the selected single row. With this address signal, the external signal processing unit of the image capturing device can identify the pixel row having output the address signal. Then, the signal processing unit can determine whether or not the selected row normally outputs the pixel signals. The image capturing device of the present embodiment is configured so that operation determination can be performed for each signal generation cell 14-$n$ configured to output the control signals according to the address decoder signal.

In the image capturing device described in Japanese Patent Laid-Open No. 2009-118427, the presence or absence of the abnormality of the image capturing device is determined for each frame. For this reason, the period of the single frame is used for detection on the presence or absence of the abnormality of the image capturing device. Moreover, study has not been conducted on the circuit configured to suitably read out the signals from the reference pixels, the circuit contributing to high-speed determination on the presence or absence of failure of the image capturing device in the case of using the reference pixels arranged in the multiple rows. In the present embodiment, the signal generation cell 14-$n$ is provided corresponding to the row of the reference pixels 4. Of the multiple rows of the reference pixels 4, only some rows can be selected, and the pixel signals can be read out. Consequently, the period for reading out the pixel signals to the vertical output lines 5 can be shortened as compared to that in the case of reading out the pixel signals from all of the pixel rows of the reference pixels 4. As a result, the number of times of subsequent signal processing periods of the column circuits 9 and the number of times of horizontal scanning periods for reading out the signals from the multiple column circuits 9 are also reduced. The external signal processing unit of the image capturing device can determine, without waiting for read-out of the pixel signals from all rows of the reference pixels 4, the presence or absence of failure of the image capturing device by means of the pixel signals of the reference pixels 4 of only some rows. With this configuration, suitable read-out of the signals from the reference pixels can be realized, such read-out contributing to high-speed determination on the presence or absence of failure of the image capturing device in the case of using the reference pixels arranged in the multiple rows.

Moreover, at the time of determination that there is an abnormality in the image capturing device, operation of the image capturing device can be stopped. Thus, continuation of image capturing operation in a state in which failure occurs in the image capturing device can be prevented. The form of the image capturing device includes, for example, an industrial camera configured to detect an object delivered on a production line at a factory, and an on-vehicle camera configured to pick up an image of a front side for supporting driving of an automobile. For example, in the industrial camera, the production line can be promptly stopped by high-speed detection of failure of the image capturing device. Moreover, the on-vehicle camera can promptly notify a driver of failure by high-speed detection of failure of the image capturing device. Thus, high-speed determination on the presence or absence of failure of the image capturing device provides the effect of reducing influence on a device or a person utilizing the image capturing device.

(Second Example of Address Signal)

Another example of the address signal will be described. The following example is different from the above-described example in an address signal configuration.

Figure 7A:
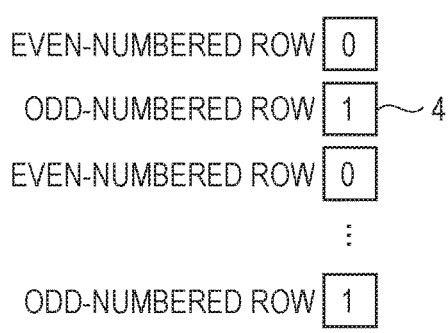
FIGS. 7A to 7C are diagrams of the address signal.
Figure 7B:
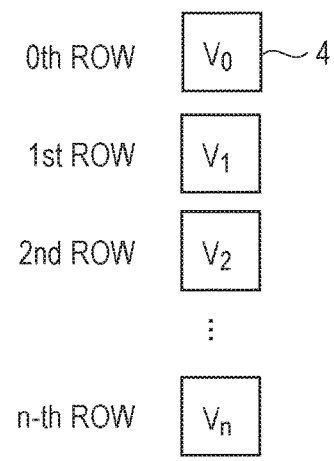
Figure 7C:
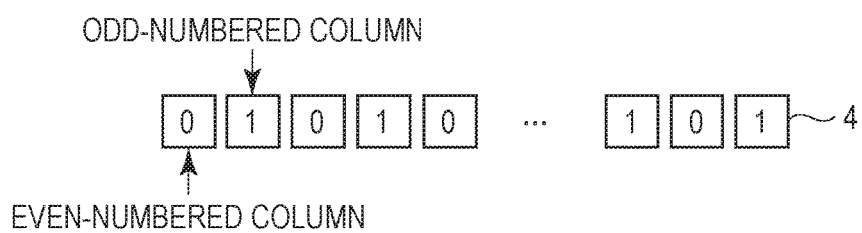

FIGS. 7A to 7C schematically illustrate the signal value of the address signal of this example. In the image capturing device illustrated in FIG. 7A, each row includes a single reference pixel 4. The reference pixel 4 outputs a pixel signal indicating whether the row to which the reference pixel 4 belongs is an even-numbered row or an odd-numbered row. For example, the reference pixel 4 for the even-numbered row outputs a pixel signal of a level indicating "0". The reference pixel 4 for the odd-numbered row outputs a pixel signal of a level indicating "1". Other configurations are the same as those of the first example, and therefore, description thereof will not be repeated.

With this configuration, it can be determined whether or not the signals are output in a correct order from the image capturing device. For example, in the case of performing the operation of sequentially outputting the pixel signals from all rows, the signal value of the address signal to be output alternately changes between "0" and "1". Such a change in the address signal is detected so that it can be determined that the image capturing device accurately outputs the pixel signals.

FIG. 7B illustrates another example. In the image capturing device illustrated in FIG. 7B, the reference pixel 4 outputs a pixel signal of a level unique to the row to which the reference pixel 4 belongs. Moreover, the level of the pixel signal output from the reference pixel 4 indicates the signal value of the address signal. That is, the address signal of this example is an analog signal. Specifically, the reference pixel 4 of the 0th row outputs a pixel signal of a level corresponding to a voltage V0. Similarly, the reference pixel 4 of the n-th row outputs a pixel signal of a level corresponding to a voltage Vn. Each of the voltage V0 and the voltage Vn is a value different from other voltages.

With this configuration, it can be determined whether or not the pixel signals of the specified row are properly output. For example, when the pixel signals are read out from the light receiving pixels 2 and the OB pixels 3 in the second row, it is determined whether or not the signal value of the pixel signal output from the reference pixel 4 is coincident with a signal value assigned to the second row, i.e., a voltage V2 in this example. In a case where both values are not coincident with each other, there is a probability that the pixel signals are not read out from the light receiving pixels 2 and the OB pixels 3 in the second row, and therefore, it can be determined that the image capturing device has been failed.

FIG. 7C illustrates still another example. In the image capturing device illustrated in FIG. 7C, a single reference pixel 4 is arranged in a single column. The reference pixel 4 outputs a pixel signal indicating whether the row to which the reference pixel 4 belongs is an even-numbered column or an odd-numbered column. Other configurations are the same as the contents described with reference to FIG. 7A. Alternatively, the reference pixel 4 in each column may be configured to output a pixel signal of a different level as in FIG. 7B.

As described above, in this example, the pixel signal output from the reference pixel 4 forms the address signal indicating the position of the row or column to which the reference pixel 4 belongs. With this configuration, it can be determined whether or not the pixel signals are normally output from the specified row or column. As a result, failure of the image capturing device can be accurately sensed.

Further, in this example, the single row includes only one reference pixel 4, or the single column includes only one reference pixel 4. Thus, the number of reference pixels 4 can be reduced, and therefore, the image capturing device can be downsized.

Note that in this example, no detection unit configured to detect the abnormality of the reference pixel is provided. Thus, step S801 and step S802 of the flowchart of FIG. 6 are not performed. The pixel signal output from the reference pixel 4 is directly used as the address signal. A variation of this example may include the detection unit configured to detect the abnormality of the reference pixel 4 as in the first example.

(Third Example of Address Signal)

Another example of the address signal will be described. This example is different from the first example of the address signal in the address signal configuration. Differences from the first example of the address signal will be mainly described below.

In this example, the light receiving pixels 2, the OB pixels 3, and the reference pixels 4 included in the same row are connected to the common drive control line 6-1. Thus, the pixel signals are read out in parallel with read-out of the pixel signals from the light receiving pixels 2 and the OB pixels 3. The pixel signals from the reference pixels 4 form the address signal indicating the row to which the reference pixels 4 belong. With this configuration, it can be determined whether or not the pixel signals are normally output from the specified row. Note that the light receiving pixels 2, the OB pixels 3, and the reference pixels 4 included in the same row may be each connected to individual drive control lines electrically separated from each other. Connection of the light receiving pixels 2, the OB pixels 3, and the reference pixels 4 of the same row to the common drive control line 6-1 is an example of the configuration for reading out these pixel signals in parallel.

The address signal formed of the pixel signals output from the reference pixels 4 will be described in detail. A digital signal is used as the address signal of this example. That is, the pixel signal of the reference pixel 4 corresponds to a signal value of each bit of the digital signal. As illustrated in FIG. 5, the pixel signal of the level corresponding to the voltage Va is represented by "0", and the pixel signal of the level corresponding to the voltage Vb is represented by "1". For distinguishing the pixel signals from each other, reference characters "D(m, n)" are assigned to the pixel signal. A character "m" represents a row number, and a character "n" represents a column number.

Figure 8:
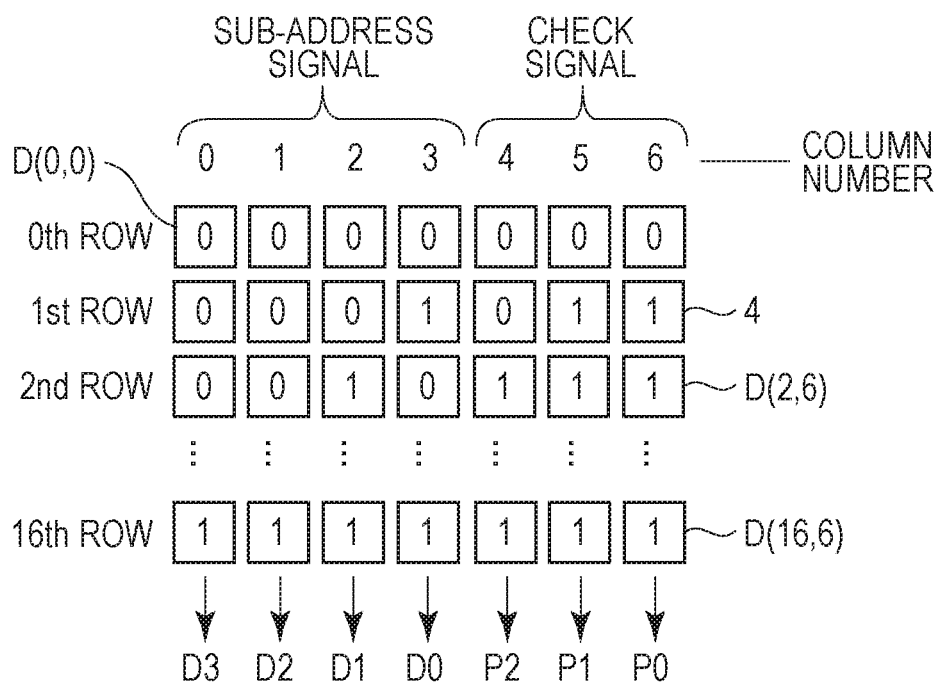
FIG. 8 is a diagram of the address signal.

FIG. 8 schematically illustrates the signal value of the address signal of this example. FIG. 8 illustrates, by way of example, the pixel signals of the reference pixels 4 in 16 rows×7 columns. However, the number of reference pixels 4 is not limited to above.

A single row includes seven reference pixels 4. That is, in this example, the address signal is represented as a 7-bit digital signal. The address signal formed of the pixel signals from the reference pixels 4 of the single row includes a sub-address signal indicating the position of the row to which the reference pixels 4 belong, and a check signal. The pixel signals output from the reference pixels 4 with column numbers 0 to 3 in each row form the sub-address signal. The pixel signals output from the reference pixels 4 with column numbers 4 to 6 in each row form the check signal. The check signal contains information for correcting an error of the address signal. The check signal of this example is set by hamming encoding calculation for the sub-address signal. That is, hamming encoding is used for the address signal of this example. Note that the check signal may be, as other examples, generated as a parity bit.

Hamming encoding calculation will be described. In this example, the sub-address signal is a 4-bit digital signal. Four bits forming the sub-address signal are represented by "D0" to "D3". The check signal is a 3-bit digital signal. Three bits forming the check signal are represented by "P0" to "P2". By calculation according to the following expressions (1) to (3), the signal value of each bit of the check signal is obtained.

$$P2 = D3 + D2 + D1 \quad (1)$$

$$P1 = D3 + D1 + D0 \quad (2)$$

$$P0 = D2 + D1 + D0 \quad (3)$$

In each expression, "+" means that logic calculation of an exclusive logic product (EXOR) is performed. In the case of two logic values different from each other, a calculation result is "1". In the case of two logic values equal to each other, the calculation result is "0".

The sub-address signal of the 0th row has a signal value of "0000". Thus, the check signal of the 0th row has a signal value of "000". The sub-address signal of the 1st row has a signal value of "0001". Thus, the check signal of the 1st row has a signal value of "011". The sub-address signal of the 2nd row has a signal value of "0010". Thus, the check signal of the 2nd row has a signal value of "111". Similarly, the signal value of the check signal is set for other rows. In this example, the signal value of the address signal varies according to row.

Figure 9:
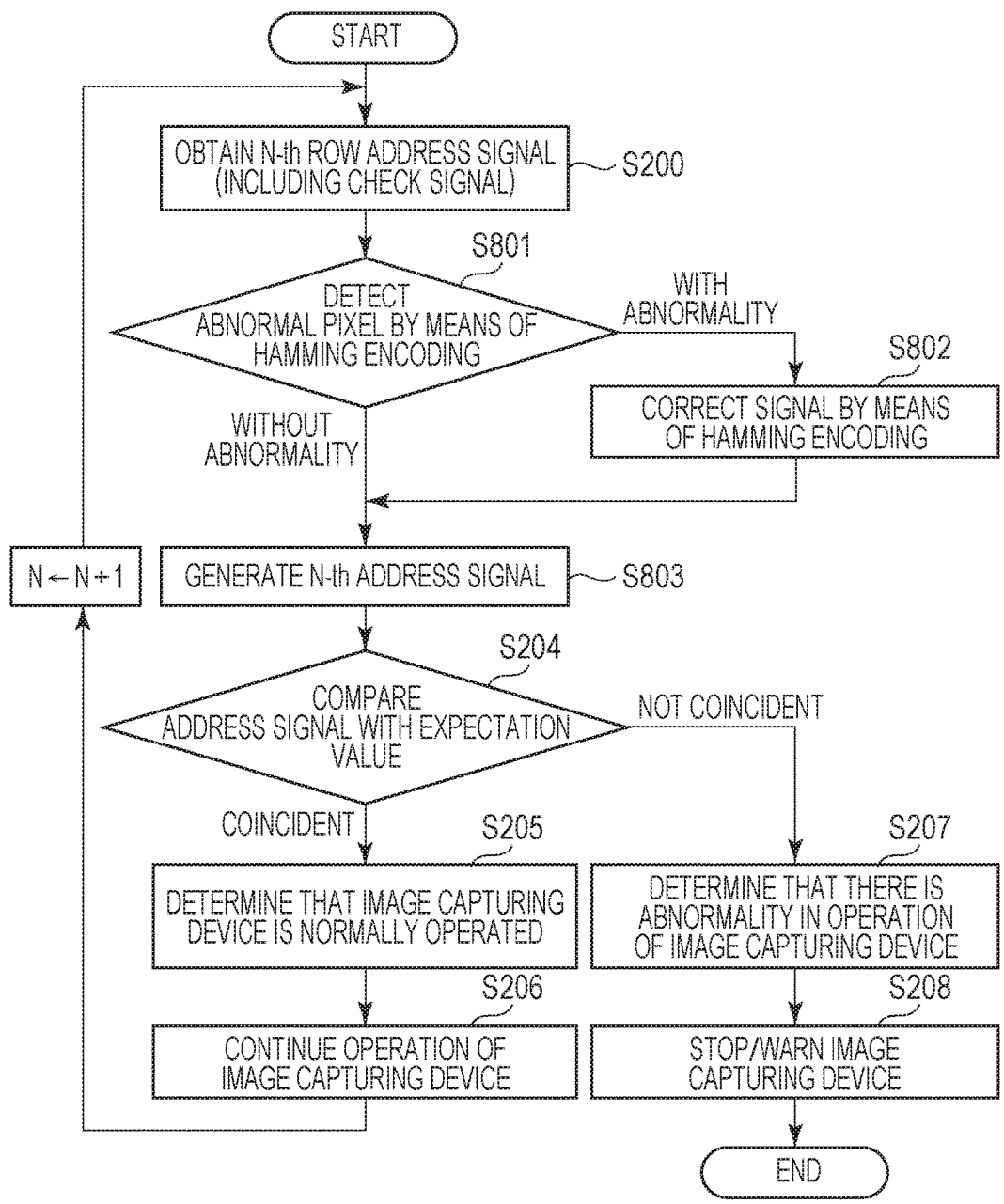
FIG. 9 is a flowchart of comparison between the address signal and the expectation value.

Subsequently, the method for determining, based on the address signal, whether or not the image capturing device normally outputs the pixel signals will be described. FIG. 9 is a flowchart for determining operation of the image capturing device. The same reference numerals as those of FIG. 6 are used to represent steps for operation equivalent to that of FIG. 6. This determination processing is, for example, performed by the external signal processing unit of the image capturing device. Alternatively, the determination processing is performed by the internal signal processing circuit of the image capturing device.

At step S200, the N-th row address signal is obtained. As mentioned above, the address signal includes the sub-address signal and the check signal.

At step S801, it is, using the address signal subjected to hamming encoding, determined whether or not there is an abnormality in the reference pixels 4. Specifically, decoding processing is performed for the address signal. Thus, the bit of the address signal with the abnormality can be determined. For the decoding processing, a well-known hamming code decoding technique is used.

At step S801, in the case of sensing the abnormality of the reference pixel 4, the signal value of the address signal is corrected at step S802. Specifically, the signal value of the bit corresponding to the reference pixel 4 determined as having the abnormality is inversed. Thereafter, the processing proceeds to step S803. At step S801, in the case of not sensing the abnormality of the reference pixel 4, the processing directly proceeds to step S803.

At step S803, the address signal with the signal value obtained at the previous step is generated as the address signal indicating the N-th row. In a case where there is no abnormality in the reference pixels 4, the address signal with the signal value of the sub-address signal is generated. In a case where there is the abnormality in the reference pixels 4, the address signal with the signal value of the sub-address signal corrected at step S802 is generated.

Subsequent operation is the same as that of the first example of the address signal. At step S204, the generated address signal is compared to the expectation value of the N-th row address signal. In a case where the signal value of the address signal is coincident with the expectation value, it is, at step S205, determined that the image capturing device is normally operated. Then, the processing transitions to the read-out operation for the N+1-th row.

In a case where the signal value of the address signal is not coincident with the expectation value at step S204, it is, at step S207, determined that there is the abnormality in operation of the image capturing device. That is, it is determined that failure occurs in the image capturing device. In this case, at step S208, operation of the image capturing device is stopped, or the warning of failure of the image capturing device is made.

As described above, in this example, the pixel signals output from the reference pixels 4 form the address signal indicating the position of the row to which the reference pixels 4 belong. With this configuration, it can be determined whether or not the pixel signals have been normally output from the specified row. As a result, failure of the image capturing device can be accurately sensed.

Moreover, in this example, the address signal includes the check signal calculated based on hamming encoding calculation. With this configuration, the presence or absence of failure of the image capturing device can be accurately determined even when there is the abnormality in some of the reference pixels 4. That is, the reference pixels 4 configured to output the pixel signals forming the check signal function as the detection unit configured to detect the abnormality of the reference pixel.

In description above, the address signal of each row has been described by way of example, but operation of the image capturing device may be determined using an address signal of each column. In this case, the "row" may be replaced with the "column" in the specification.

(Fourth Example of Address Signal)

A fourth example of the address signal will be described. This example is different from the first example of the address signal in that a single reference pixel outputs multiple pixel signals of different levels. Moreover, this example is different from the first example of the address signal in the method for detecting the abnormality of the reference pixel 4. Differences from the first example of the address signal will be mainly described below.

Note that the reference pixel 4 of the first example is configured to selectively output, based on control of the output control circuit 8, the pixel signal of the level corresponding to the voltage Va and the pixel signal of the level corresponding to the voltage Vb. However, in the first example, the single reference pixel 4 does not necessarily output two pixel signals of different levels. On the other hand, the reference pixel 4 of this example outputs, based on the control of the output control circuit 8, both of the pixel signal of the level corresponding to the voltage Va and the pixel signal of the level corresponding to the voltage Vb. By determination on whether or not the level of the pixel signal output from the reference pixel 4 changes as expected, the presence or absence of the abnormality of the reference pixel 4 can be determined.

Figure 10:
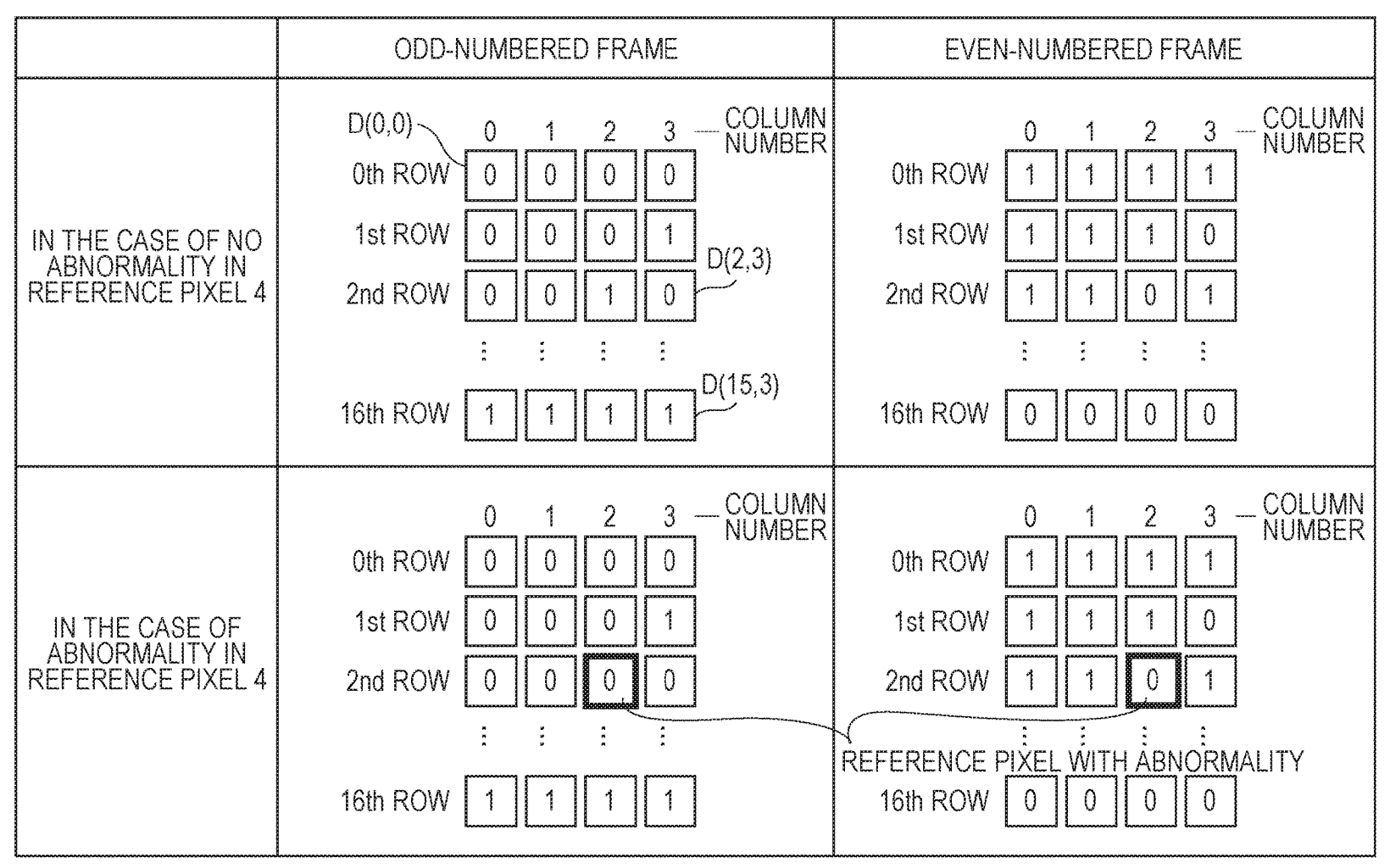

FIG. 10 schematically illustrates the signal value of the address signal of this example. FIG. 10 illustrates, by way of example, the pixel signals of the reference pixels 4 in 16 rows×4 columns. However, the number of reference pixels 4 is not limited to above. A single row includes four reference pixels 4. That is, in this example, the address signal is represented as a 4-bit digital signal.

FIG. 10 illustrates an example where the address signal of each row has different signal values according to an operation status of the image capturing device. Specifically, the address signal for an odd-numbered frame and the address signal for an even-numbered frame have signal values inverted from each other. For example, the address signal of the second row for the odd-numbered frame has a signal value of "0010". On the other hand, the address signal of the second row for the even-numbered frame has a signal value of "1101". Similarly, as illustrated in FIG. 10, the signal value of each bit of the address signal is inverted between the odd-numbered frame and the even-numbered frame. The output control circuit 8 can switch, for each frame, the voltage supplied to the reference pixel 4 between the voltage Va and the voltage Vb, thereby inverting the signal value of each bit of the address signal.

In a case where there is the abnormality in the reference pixel 4, the level of the pixel signal output from the reference pixel 4 does not change. FIG. 10 illustrates an example where there is the abnormality in the reference pixel 4 with a column number 2 in the second row. In the odd-numbered frame, the address signal of the second row has a signal value of "0000". On the other hand, in the even-numbered frame, the address signal of the second row has a signal value of "1101". Since the signal value D(2, 2) is not inverted as described above, it can be sensed that there is the abnormality in the reference pixels 4 with the column number 2 in the second row.

Another example of the method for changing the signal value of the address signal will be described. FIG. 11 schematically illustrates the signal value of the address signal of this example. FIG. 11 illustrates, by way of example, the pixel signals of the reference pixels 4 in 16 rows×4 columns. However, the number of reference pixels 4 is not limited to above. A single row includes four reference pixels 4. That is, in this example, the address signal is represented as a 4-bit digital signal.

In the example illustrated in FIG. 11, the signal value of the address signal formed of the pixel signals output from the same reference pixels 4 is different among a period during image capturing and other periods. The operation of reading out the pixel signals of the reference pixels 4 is performed before the pixel signals are output from the light receiving pixels 2 and the OB pixels 3 or before image capturing for a single frame is performed. First, the output control circuit 8 supplies the voltage Va corresponding to a signal value of "0" to all of the reference pixels 4. In this state, the pixel signals of the reference pixels 4 are read out. Such read-out operation is called "read-out operation for a first pre-image-capturing frame". Next, the output control circuit 8 supplies the voltage Vb corresponding to a signal value of "1" to all of the reference pixels 4. In this state, the pixel signals of the reference pixels 4 are read out. Such read-out operation is called "read-out operation for a second pre-image-capturing frame". When there is no abnormality in the reference pixel 4, the pixel signal output from each reference pixel 4 alternately shows "0" and "1".

In a case where there is the abnormality in the reference pixel 4, the level of the pixel signal output from such a reference pixel 4 does not change. FIG. 11 illustrates an example where there is the abnormality in the reference pixel 4 with a column number 2 in the second row. When the above-described read-out operation for the first pre-image-capturing frame and the above-described read-out operation for the second pre-image-capturing frame are performed, a signal value D(2, 2) is not inverted as illustrated in FIG. 11. That is, it can be sensed that there is the abnormality in the reference pixel 4 with the column number 2 in the second row.

Thereafter, upon image capturing, the output control circuit 8 selects any of the voltage Va and the voltage Vb, and supplies the selected voltage to the reference pixel 4 such that the address signal of each row has a signal value unique to the row to which the reference pixel 4 belongs.

As described above, according to the image capturing device of this example, the abnormality of the reference pixel 4 can be sensed by the method illustrated in FIG. 10 or 11. Thus, processing such as the processing of not performing comparison between the address signal and the expectation value as illustrated in FIGS. 6 and 9 (step S204) can be performed for the address signal including the pixel signal of the reference pixel 4 with the abnormality. This can reduce the probability of erroneously determining that the image capturing device is failed. That is, in this example, the output control circuit 8 functions as the detection unit configured to detect the abnormality of the reference pixel.

Second Embodiment

A second embodiment will be described. The second embodiment is different from the first embodiment in row section and an address signal configuration. In the present embodiment, details of differences from the first embodiment will be described, and description of contents similar to those of the first embodiment will not be repeated.

Figure 12:
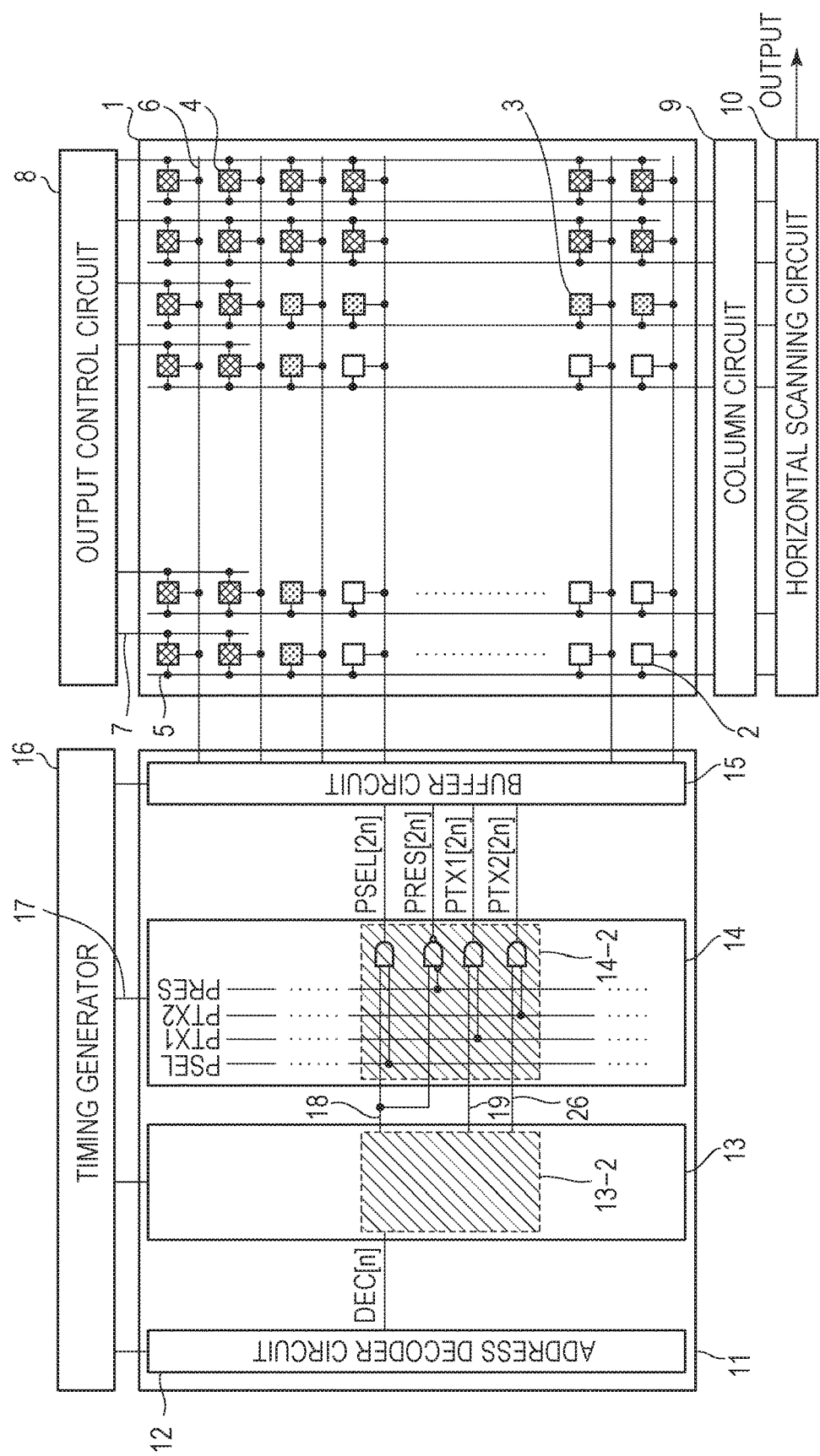
FIG. 12 is a diagram of a configuration of an image capturing device.

FIG. 12 illustrates an entire configuration of an image capturing device in the present embodiment.

The image capturing device of the present embodiment is different from that of the first embodiment in a configuration of a vertical scanning circuit 11. The vertical scanning circuit of the image capturing device of the first embodiment is configured to control the single pixel row by the single address decoder signal. The vertical scanning circuit of the image capturing device of the present embodiment is different in that two pixel rows are controlled by a single address decoder signal. From another perspective, two pixel rows are controlled by control signals output from a single signal generation cell 14-*n*.

The number of pixel rows is calculated with reference to PDs. That is, two pixel rows indicate a pixel circuit for outputting signals based on two rows of PDs 20 and electric charges accumulated in two rows of the PDs 20. In the present embodiment, two PDs 20 share a single FD 22 as described later. Thus, two pixel rows include two PDs 20 and a single pixel circuit.

When a decoder signal DEC[n] is output from an address decoder circuit 12, a 2n-th row logic generation unit 13-2 supplies, in response to such a signal, a row selection signal 18, a shutter operation signal 19, and a shutter operation signal 26 to a 2n-th row signal generation cell 14-2.

A PTX1[2n] is generated by logic processing using the shutter operation signal 19 and a PTX1, and a PTX2[2n] is generated by logic processing using the shutter operation signal 26 and a PTX2.

Moreover, the 2n-th row logic generation unit 13-supplies the row selection signal 18 to the 2n-th row signal generation cell 14-2. A PSEL[2n] is generated by logic processing using the row selection signal 18 and a PSEL, and a PRES[2n] is generated by logic processing using the row selection signal 18 and a PRES.

Each of the generated control pulses PSEL[2n], PRES [2n], PTX1[2n], and PTX2[2n] is supplied to a pixel drive signal line 6 for a 2n-th row and a 2n+1-th row via a buffer circuit 15. The control pulses PSEL[2n] and PRES[2n] are control signals for collectively controlling pixels belonging to the 2n-th row and the 2n+1-th row. The control pulse PTX1[2n] is a control signal for controlling transfer transistors 21 of the pixels belonging to the 2n-th row. The control pulse PTX2[2n] is a control signal for controlling transfer transistors 21 of the pixels belonging to the 2n+1-th row. With this configuration, two pixel rows are controlled for a single address decoder signal.

Next, details of driving timing until the control signals are supplied to the corresponding pixel row after output of the address decoder signal.

Figure 13:
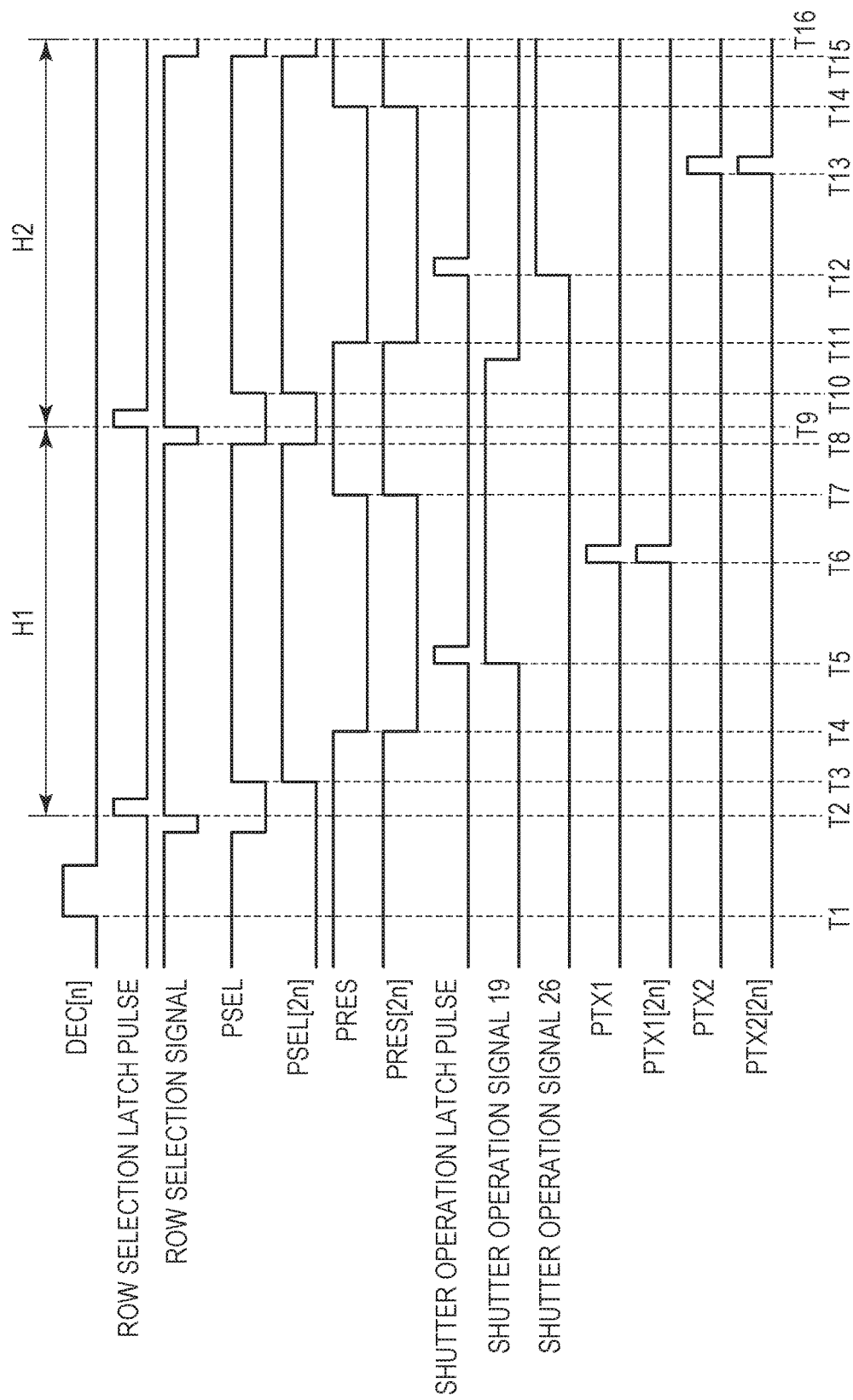
FIG. 13 is a chart of driving of the image capturing device.

FIG. 13 is an operation timing chart of the vertical scanning circuit in the present embodiment.

A period H1 from a time point T2 to a time point T9 indicates a pixel drive signal generation period of the 2n-th row. A period H2 from the time point T9 to a time point T16 indicates a pixel drive signal generation period of the 2n+1-th row.

The PTX1 illustrated in FIG. 13 operates in a manner similar to that of the PTX illustrated in FIG. 2 of the first embodiment.

Moreover, a PTX1[n] illustrated in FIG. 13 also operates in a manner similar to that of the PTX[2n] illustrated in FIG. 2 of the first embodiment, and description until a point before the time point T9 will not be repeated.

At the time point T9, a timing generator 16 supplies a row selection latch pulse to the 2n-th row logic generation unit 13-2. Accordingly, the row selection signal 18 reaches a high level.

At a time point T10, the timing generator 16 brings, to the high level, the pixel selection pulse PSEL to be supplied to the 2n-th row signal generation cell 14-2. The logic of the row selection signal 18 and the PSEL is obtained, and accordingly, the signal PSEL[2n] of the 2n+1-th row reaches the high level. The signal PSEL[2n] is a selection pulse for controlling the pixels belonging to the 2n-th row and the pixels belonging to the 2n+1-th row.

At a time point T11, the timing generator 16 brings the signal PRES to a low level. The logic of the row selection signal 18 and the signal PRES is obtained, and accordingly, the signal PRES[2n] of the 2n+1-th row reaches the low level. The signal PRES[2n] is a signal for controlling reset transistors 23 of the pixels belonging to the 2n-th row and reset transistors 23 of the pixels belonging to the 2n+1-th row.

At a time point T12, the timing generator 16 supplies a shutter operation latch pulse to the 2n-th row logic generation unit 13-2. Accordingly, the shutter operation signal 19 reaches the high level.

At a time point T13, the timing generator 16 brings the pixel transfer pulse PTX2 to the high level. Accordingly, the signal PTX2[2n] of the 2n+1-th row reaches the high level.

At a time point T14, the timing generator 16 brings the PRES to the high level. Accordingly, the signal PRES[2n] reaches the high level.

At a time point T15, the timing generator 16 brings the PSEL to the low level. Accordingly, the signal PSEL[2n] reaches the low level.

At the time point T16, the timing generator 16 supplies the row selection latch pulse to the logic generation unit 13-2. Accordingly, a pixel drive signal of a 2n+2-th row is generated.

FIGS. 14A and 14B illustrate configurations of a light receiving pixel 2, an OB pixel 3, and a reference pixel 4 in the present embodiment.

FIG. 14A is an equivalent circuit diagram of the light receiving pixel 2 and the OB pixel 3. FIG. 14B is an equivalent circuit diagram of the reference pixel 4.

In a case where a PD 20-1 is a PD of the 2n-th row as illustrated in FIG. 14A, a PD 20-2 represents a PD of the 2n+1-th row. A transfer transistor 21-1 of the 2n-th row is connected to the PD 20-1. A transfer transistor 21-2 of the 2n+1-th row is connected to the PD 20-2. The transfer transistor 21-1 of the 2n-th row and the transfer transistor 21-2 of the 2n+1-th row are connected to the FD 22. That is, two rows of the pixels share a single FD 22. Moreover, the PD 20-1 and the PD 20-2 of the OB pixels 3 are light-shielded.

On the other hand, as illustrated in FIG. 14B, two rows of the reference pixels 4 also share a single FD 22 as in the light receiving pixels 2 and the OB pixels 3. As in the first embodiment, the reference pixel 4 has no PD 20. Meanwhile, the reference pixels 4 of each row are connected to output control lines 7. Moreover, a voltage value VPD1 is supplied to the 2n-th row, and a voltage value VPD2 is supplied to the 2n+1-th row. Note that by an output control circuit 8, the VPD1 or the VPD2 to be supplied to the reference pixels 4 can be selected.

Figure 15:
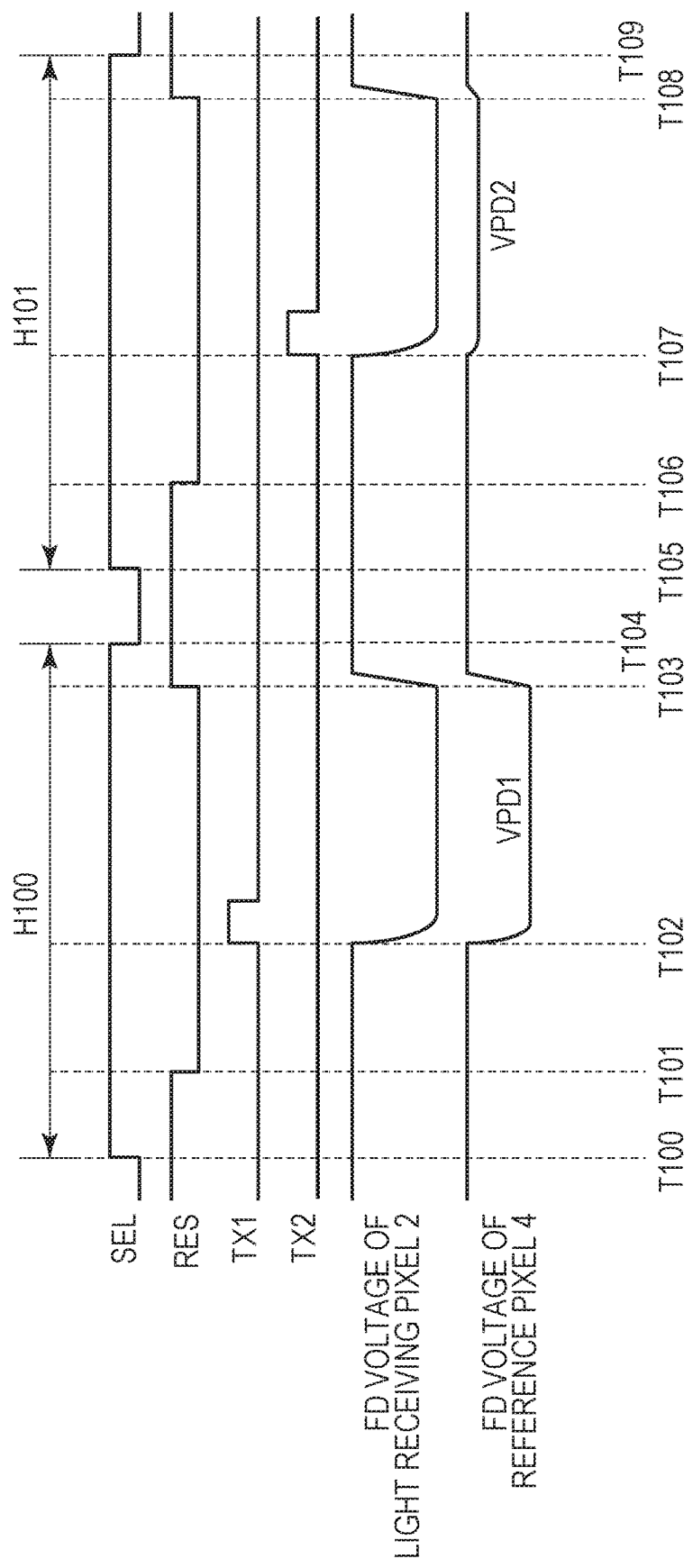
FIG. 15 is a chart of operation of the pixels.

In the present embodiment, operation timing of the light receiving pixels 2, the OB pixels 3, and the reference pixels 4 is illustrated in FIG. 15.

"SEL" indicates a signal input to a gate of a row selection transistor 25, "RES" indicates a signal input to a gate of a reset transistor 23, and "TX1" indicates a signal input to a gate of the transfer transistor 21-1. Moreover, "TX2" indicates a signal input to a gate of the transfer transistor 21-2.

When the signal input to the gate is the high level, the transistor is turned ON. When the gate level is the low level, the transistor is turned OFF.

Moreover, the voltage of the FD of the light receiving pixel 2, the voltage of the FD of the reference pixel 4 of the 2n-th row, and the voltage of the FD of the reference pixel 4 of the 2n+1-th row are illustrated. The voltage value VPD1 is supplied to the reference pixel 4 of the 2n-th row, and the voltage value VPD2 is supplied to the reference pixel 4 of the 2n+1-th row.

First, in a period until a time point T100, the row selection transistor 25 is OFF, and no pixel row is selected. The reset transistor 23 is ON, a power source voltage VDD and a gate of an amplification transistor 24 are connected together, and the voltage of the FD 22 is reset. In this state, the voltages of the FDs 22 of the light receiving pixel 2, the OB pixel 3, and the reference pixel 4 are a voltage corresponding to the power source voltage VDD.

The transfer transistors 21-1 and 21-2 are OFF, and the PDs 20-1 and 20-2 and the gate of the amplification transistor 24 are electrically disconnected from each other.

At the time point T100, the row selection transistor 25 is turned ON, a predetermined row is selected, and the amplification transistor 24 and a vertical output line 5 are connected together. A period H100 indicates a selection period for the 2n-th row.

At a time point T101, the reset transistor 23 is turned OFF, and the power source voltage VDD and the gate of the amplification transistor 24 are electrically disconnected from each other. The amplification transistor 24 outputs, to the vertical output line 5, a noise signal corresponding to reset noise of the FD 22 of each of the light receiving pixel 2, the OB pixel 3, and the reference pixel 4.

At a time point T102, the transfer transistor 21-1 is turned ON. Accordingly, the PD 20-1 and the gate of the amplification transistor 24 are electrically connected together. Thus, in the light receiving pixel 2 and the OB pixel 3, the electric charge accumulated in the PD 20-1 is transferred to the FD 22. Thus, the voltage of the FD 22 changes from the power source voltage VDD to a signal voltage Vsig. The amplification transistor 24 of the light receiving pixel 2 outputs, to the vertical output line 5, a pixel signal of a signal level corresponding to the signal voltage Vsig.

Meanwhile, in the reference pixel 4 of the 2n-th row, the voltage value VPD1 selected by the output control circuit 8 is transferred to the FD 22. Accordingly, the voltage of the FD 22 changes from the power source voltage VDD to the voltage value VPD1. The amplification transistor 24 of the reference pixel 4 outputs, to the vertical output line 5, a pixel signal of a level corresponding to the voltage value VPD1.

At a time point T103, the reset transistor 23 is turned ON. Accordingly, the FD 22 is reset to the power source voltage VDD.

At a time point T104, the row selection transistor 25 is turned ON. Accordingly, read-out operation for the light receiving pixels 2, the OB pixels 3, and the reference pixels 4 included in the 2n-th row is completed.

At a time point T105, the row selection transistor 25 is turned ON. Accordingly, the amplification transistor 24 and the vertical output line 5 are electrically connected together again. A period H101 indicates a selection period for the 2n+1-th row.

At a time point T106, the reset transistor 23 is turned OFF, and the power source voltage VDD and the gate of the amplification transistor 24 are disconnected from each other. The FDs of the light receiving pixel 2, the OB pixel 3, and the reference pixel 4 output the signals corresponding to the power source voltage VDD to the vertical output lines 5 via the amplification transistors 24.

At a time point T107, the transfer transistor 21-2 is turned ON. Accordingly, the PD 20-2 and the gate of the amplification transistor 24 are electrically connected together. Thus, in the light receiving pixel 2 and the OB pixel 3, the electric charge accumulated in the PD 20-2 is transferred to the FDs 22. Thus, the voltage of the FD 22 changes from the power source voltage VDD to the signal voltage Vsig. The amplification transistor 24 of the light receiving pixel 2 outputs, to the vertical output line 5, the pixel signal of the signal level corresponding to the signal voltage Vsig.

Meanwhile, in the reference pixel 4 of the 2n+1-th row, the voltage value VPD2 selected by the output control circuit 8 is transferred to the FD 22. Accordingly, the voltage of the FD 22 changes from the power source voltage VDD to the voltage value VPD2. The amplification transistor 24 of the reference pixel 4 outputs, to the vertical output line 5, a pixel signal of a signal level corresponding to the voltage value VPD2.

Subsequent operation is the same as that of the above-described time points T103 and T104.

Figure 16:
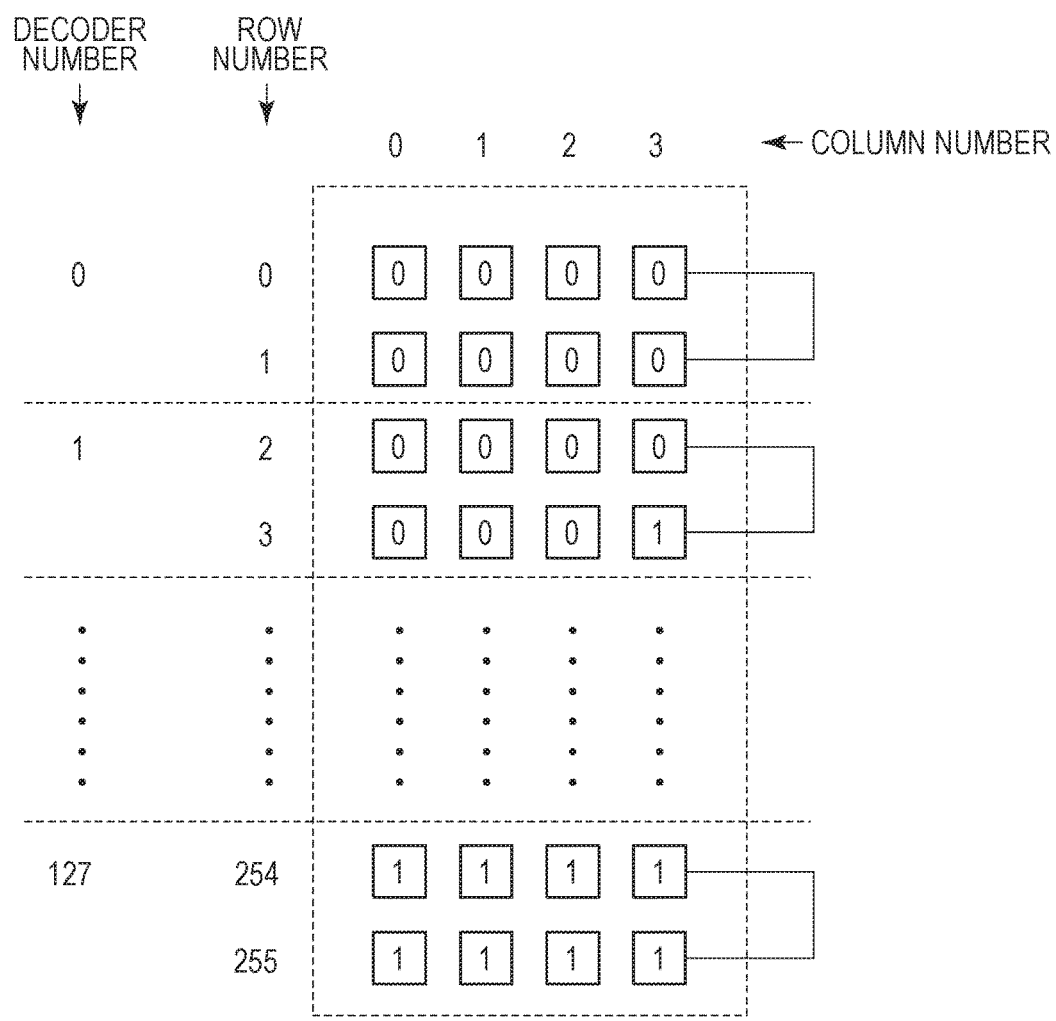
FIG. 16 is a diagram of an address signal.

FIG. 16 illustrates an address signal formed by the reference pixels 4 in the present embodiment.

In the present embodiment, two pixel rows are controlled in response to a single address decoder signal as described above.

The address signal is formed by the reference pixels 4 included in two rows selected for a single stage of decoder. Since two pixel rows are selected for a single address decoder signal, a row number is increased by two every time a decoder number value is increased by one.

In FIG. 16, four reference pixels 4 are arranged in a row direction, and 256 reference pixels 4 are arranged in a column direction. In a case where the address signal is formed by the reference pixels 4 included in two rows selected for the single stage of the decoder, the address signal is represented as a 8-bit digital signal. The address signal for the 0th row and the 1st row is indicated by "00000000", and the address signal for the 1st row and the 2nd row is indicated by "00000001". As described above, different address signals are provided for each unit decoder signal, and therefore, identification for each unit decoder signal is available.

In an example of FIG. 16, the address signal has eight bits, and therefore, more than 128 stages of decoder can be separately identified. As compared to the first embodiment, more rows can be identified for each unit decoder even when the number of reference pixels 4 is similar to that of the first embodiment. The number of reference pixels 4 arranged per row is changed according to the number of rows targeted for read-out in an image capturing region 1, and in this manner, identification can be available even for the number of rows corresponding to more than 128 stages of decoder.

The method for determining availability of normal operation of the image capturing device in the present embodiment will be described.

Figure 17:
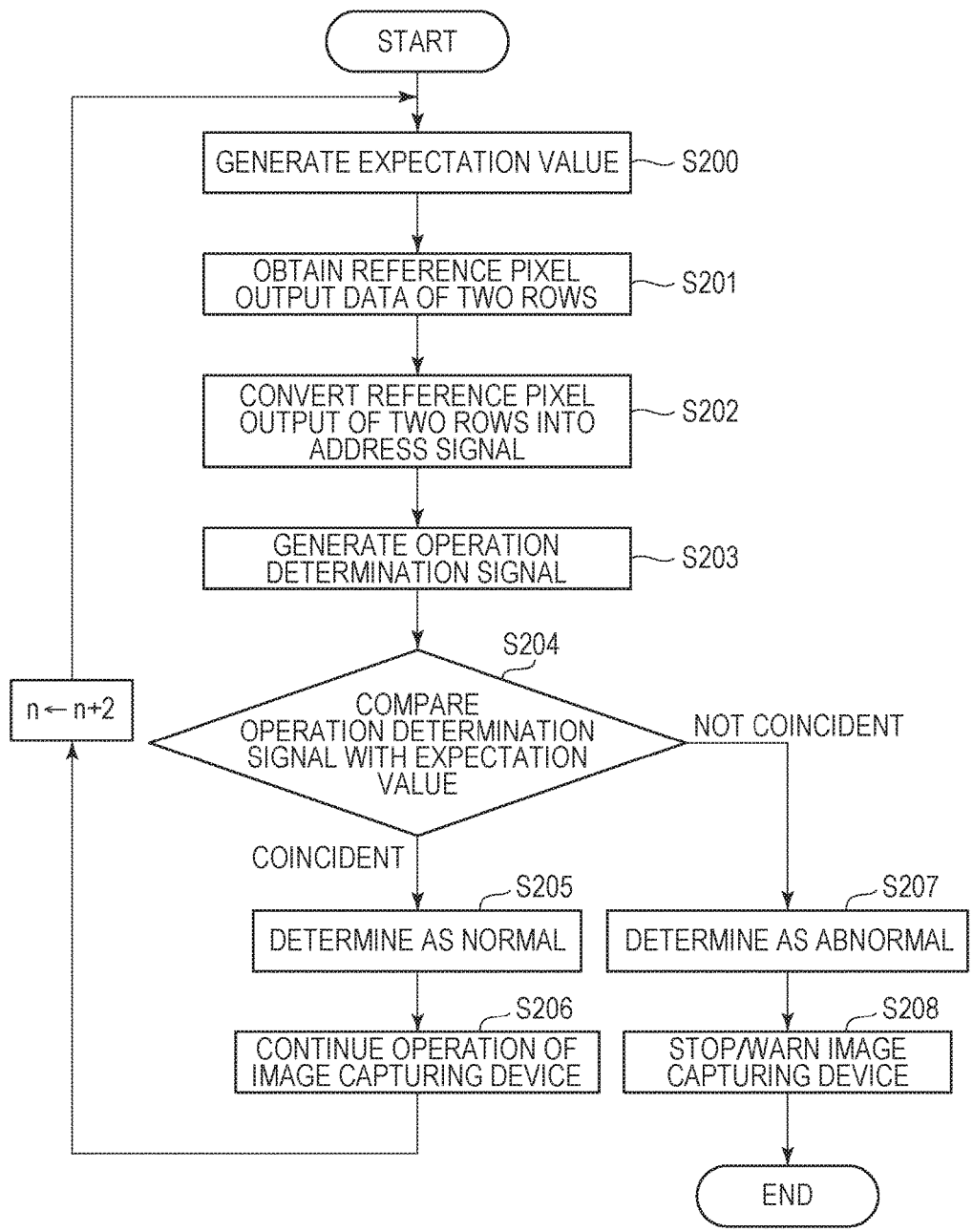
FIG. 17 is a flowchart of comparison between the address signal and an expectation value.

FIG. 17 illustrates a flowchart of the present embodiment.

The flowchart of FIG. 17 will be described with reference to operation determination for an n-th decoder stage by way of example.

At step S200, an expectation value of the address signal is generated.

At step S201, output data of the reference pixels included in the 2n-th row and the 2n+1-th row of the image capturing region 1 selected by a n-th stage decoder signal is obtained. At this point, an output signal in the case of supplying the voltage value VPD1 to the reference pixel 4 is "1", and an output signal in the case of supplying the voltage value VPD2 is "0".

At step S202, the output signal of the reference pixel 4 obtained at step S201 is converted into the address signal. Conversion into the address signal indicates that the reference pixels 4 of two rows for each of which an output signal of "1" or "0" is obtained at step S201 are arranged into a single signal.

At step S203, an operation determination signal is generated.

At step S204, the operation determination signal generated at step S203 and the expectation value generated at step S200 are compared with each other.

In a case where a comparison result of step S204 shows coincidence, it is, at step S205, determined that the n-th decoder stage is normal. Thus, operation of the image capturing device is continued at step S206, and the processing proceeds to operation determination for an n+1-th decoder stage, i.e., a 2n+2-th row and a 2n+3-th row.

On the other hand, in a case where the comparison result of step S204 does not show coincidence, the n-th decoder stage is determined as abnormal at step S207. Then, at step S208, operation of the image capturing device is stopped, or a warning of failure of the image capturing device is made. In this case, the processing does not proceed to operation determination for an n+1-th decoder stage.

As described above, in the present embodiment, in the case of selecting a single stage of address decoder, two rows in the image capturing region 1 are selected. The reference pixels 4 included in two rows selected by the single decoder stage form a unique address signal different from those of other decoders. With this address signal, identification can be separately performed for each unit decoder signal, and it can be determined whether or not two rows selected by the decoder signal normally output the pixel signals. As a result, operation determination is performed for each unit decoder signal, and operation of the image capturing device is stopped in a case where an abnormality has been determined. Thus, a time until abnormality determination can be shortened.

Third Embodiment

A third embodiment is different from the first embodiment in an address signal configuration. Other configurations are similar to those of the first embodiment, and description thereof will not be repeated.

Figure 18:
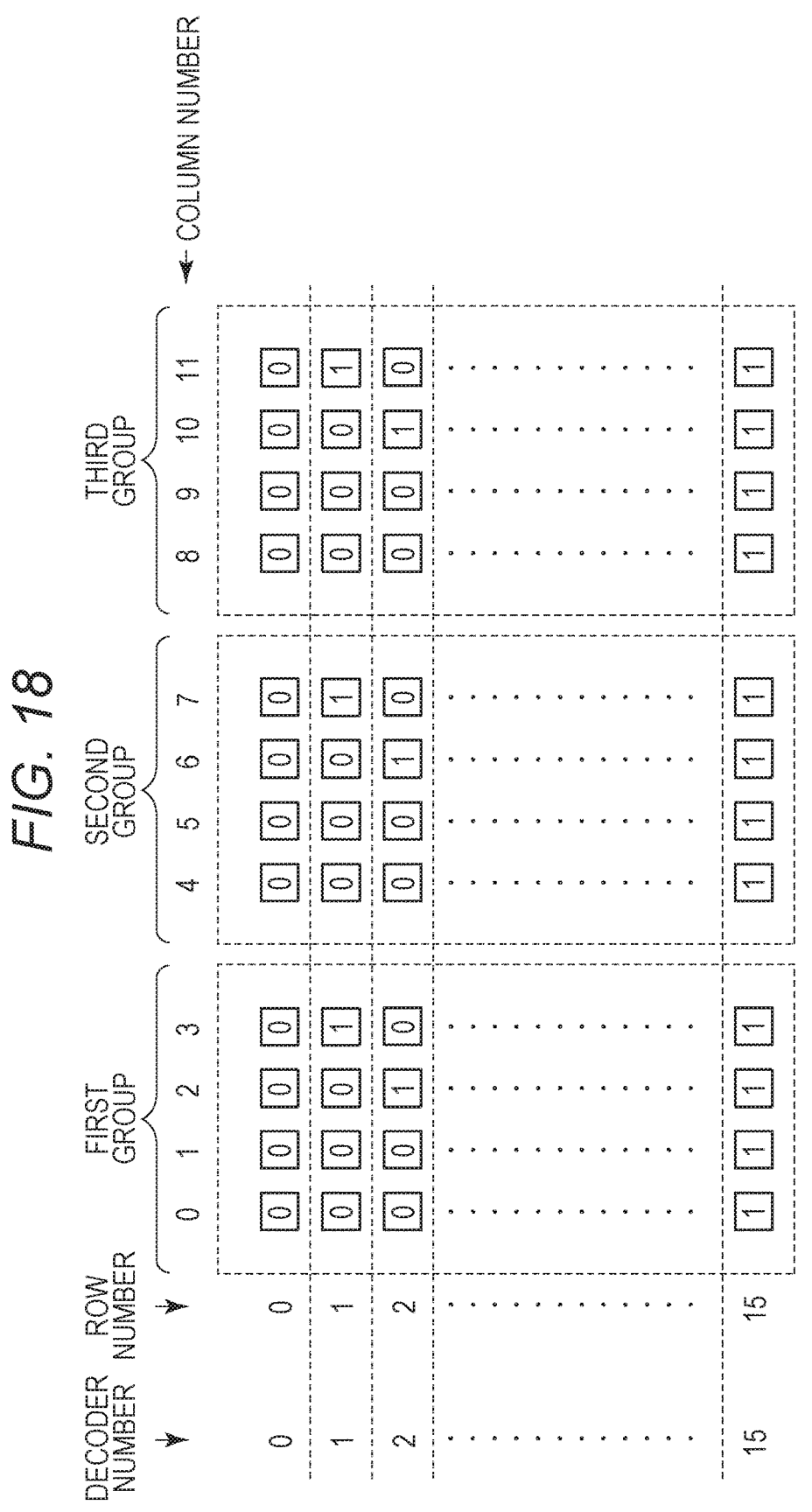

FIG. 18 illustrates an example of an address signal formed by reference pixels 4 in the present embodiment.

The reference pixels 4 of the present embodiment as illustrated in FIG. 18 includes 12 pixels in a row direction and 16 pixels in a column direction. In this case, the address signal for a single row is represented as a 12-bit digital signal. Moreover, the address signal for the single row includes three groups of 4-bit digital signals outputting the same signal value. For example, in a case where the first group of the address signal at the 0th column to the 3rd column in the first row is "0001", the second group of the address signal at the 4th column to the 7th column is represented as "0001", and the third group of the address signal at the 8th column to the 11th column is represented as "0001". In a case where the address signal represented by four bits is a unit signal, three groups of unit signals of "0001" are arranged in the single row. Note that the unit signals arranged in each row are not limited to three signals.

Next, the method for determining availability of normal pixel signal output of an image capturing device by means of address signal output of the reference pixels 4 will be described.

Figure 19:
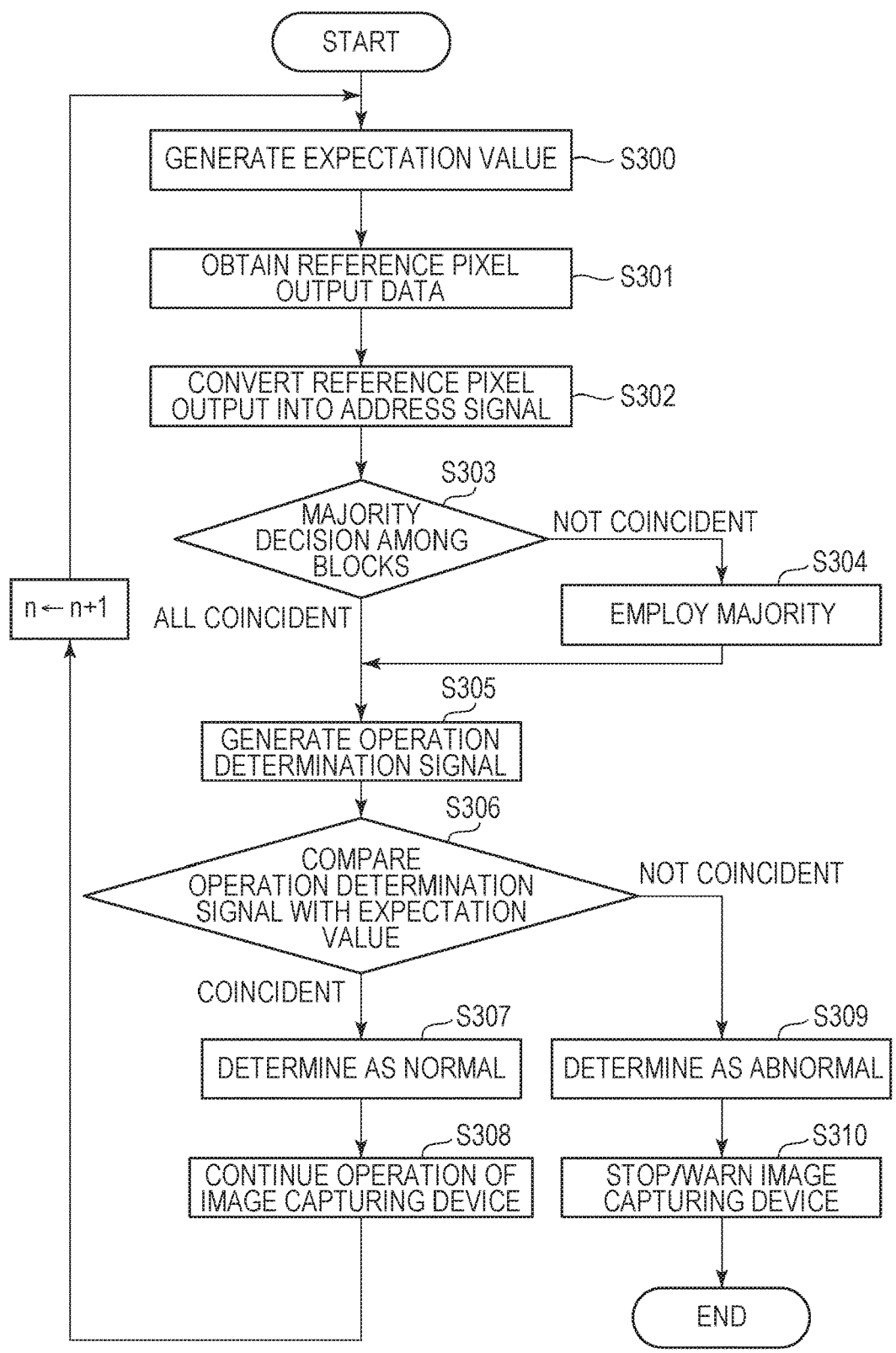
FIG. 19 is a flowchart of comparison between an address signal and an expectation value.

FIG. 19 is a flowchart of a flow until determination on the availability of normal operation of the image capturing device.

Operation determination for an n-th row will be described by way of example.

At step S300, an expectation value of the address signal is generated.

At step S301, output data of the reference pixels 4 included in a single row of an image capturing region 1 selected by an n-th stage decoder signal is obtained. At this point, an output signal in a case where a voltage value VPD1 is supplied to the reference pixel 4 is "1", and an output signal in a case where a voltage value VPD2 is supplied to the reference pixel 4 is "0".

At step S302, the output signals of the reference pixels 4 obtained at step S301 are converted into the address signal. By conversion into the address signal, three unit address signals are generated.

At step S303, these three unit signals are compared with each other. In a case where three unit signals are coincident with each other, an operation determination signal is generated at step S305. The operation determination signal indicates the above-described unit signals. On the other hand, in a case where three unit signals are not coincident with each other at step S303, such as a case where there is a defect in the reference pixel 4, majority decision is made for each bit of three unit signals at step S304. The signal as the majority of the bits is taken as the signal value of each bit. In this case, the operation determination signal generated at step S305 is a unit signal having the signal value of each bit determined by the majority decision at step S304.

At step S306, the operation determination signal generated at step S305 and the expectation value generated at step S300 are compared with each other. In a case where a comparison result of step S306 shows coincidence, it is, at step S307, determined that the n-th row is normal. Moreover, operation of the image capturing device is continued at step S308, and the processing proceeds to operation determination for an n+1-th row. On the other hand, in a case where the comparison result of step S306 does not show coincidence, it is, at step S309, determined that the n-th row is abnormal. Then, at step S310, operation of the image capturing device is stopped, or a warning of failure of the image capturing device is made. In this case, the processing does not proceed to operation determination for the n+1-th row.

As described above, in the present embodiment, the availability of the normal image capturing device can be determined even in a case where there is an abnormality in the reference pixel 4. In this configuration, beneficial effects similar to those of the first embodiment are obtained.

Fourth Embodiment

A fourth embodiment is different from the first embodiment in a configuration of a vertical scanning circuit 11. Other configurations are similar to those of the first embodiment, and therefore, description thereof will not be repeated.

Figure 20:
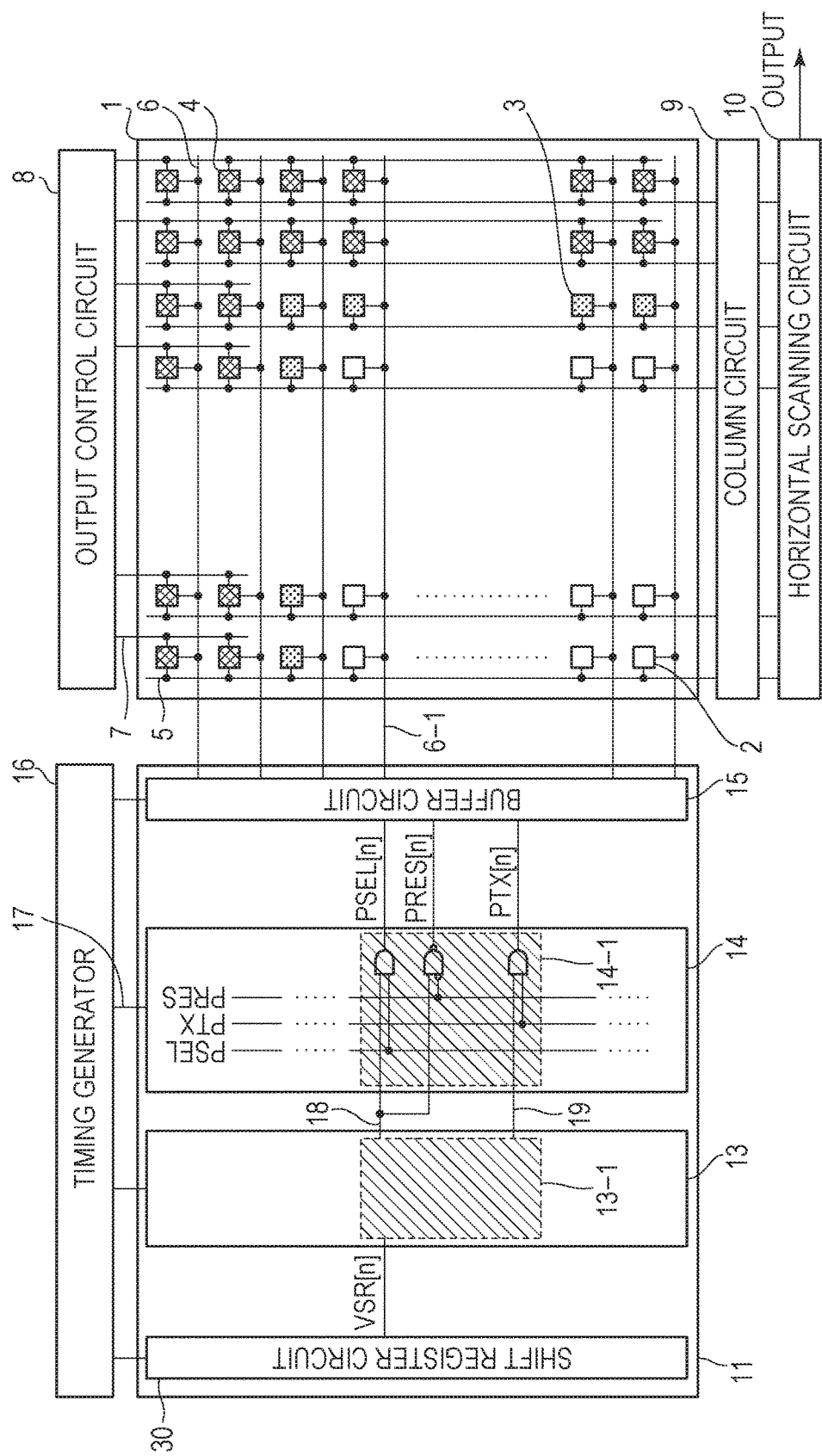
FIG. 20 is a diagram of a configuration of an image capturing device.

FIG. 20 illustrates a configuration of an image capturing device of the present embodiment. Focusing on the vertical scanning circuit 11, a portion for outputting a row selection signal by a control signal from a timing generator 16 is a shift register circuit 30. Other configurations of the image capturing device are the same as those of the first embodiment, and therefore, description thereof will not be repeated.

Figure 21:
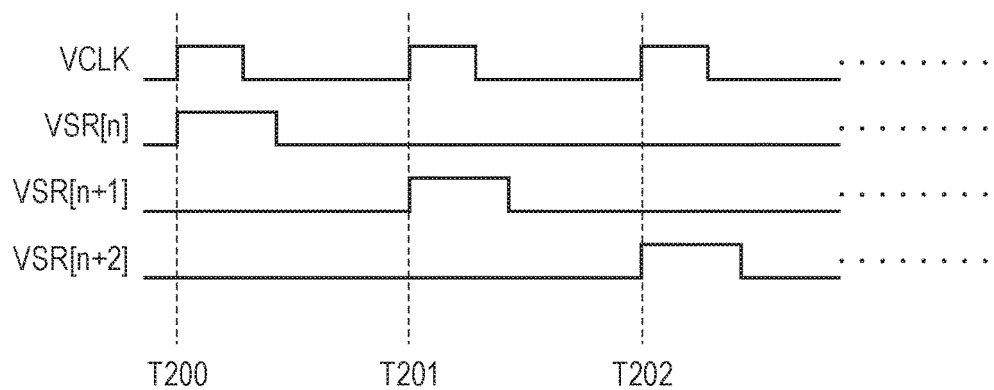
FIG. 21 is a chart of operation of the image capturing device.

FIG. 21 illustrates driving timing until the row selection signal is output after the control signal has been supplied to the shift register circuit 30 by the timing generator 16.

A control signal VCLK is supplied to the shift register circuit 30 by the timing generator 16.

At a time point T200, when a VCLK pulse is input, a row selection signal VSR[n] reaches a high level, and an n-th row selection signal is output from the shift register circuit 30.

At a time point T201, when the VCLK pulse is input, a row selection signal VSR[n+1] reaches the high level, and an n+1-th row selection signal is output from the shift register circuit 30.

At a time point T202, when the VCLK pulse is input, a row selection signal VSR[n+2] reaches the high level, and an n+2-th row selection signal is output from the shift register circuit 30. That is, the row selection signal is output one by one according to the input of the VCLK pulse. The row selection signal VSR[n] corresponds to the decoder signal DEC[n] of the first embodiment.

As described above, beneficial effects similar to those of the first embodiment are obtained even in a configuration in which the row selection pulse is supplied by the shift register circuit 30 as in the present embodiment.

The address signal for each row has been described above by way of example, but operation of the image capturing device may be determined using an address signal for each column. In this case, the "row" may be replaced with the "column" in the specification.

Fifth Embodiment

Figure 22:
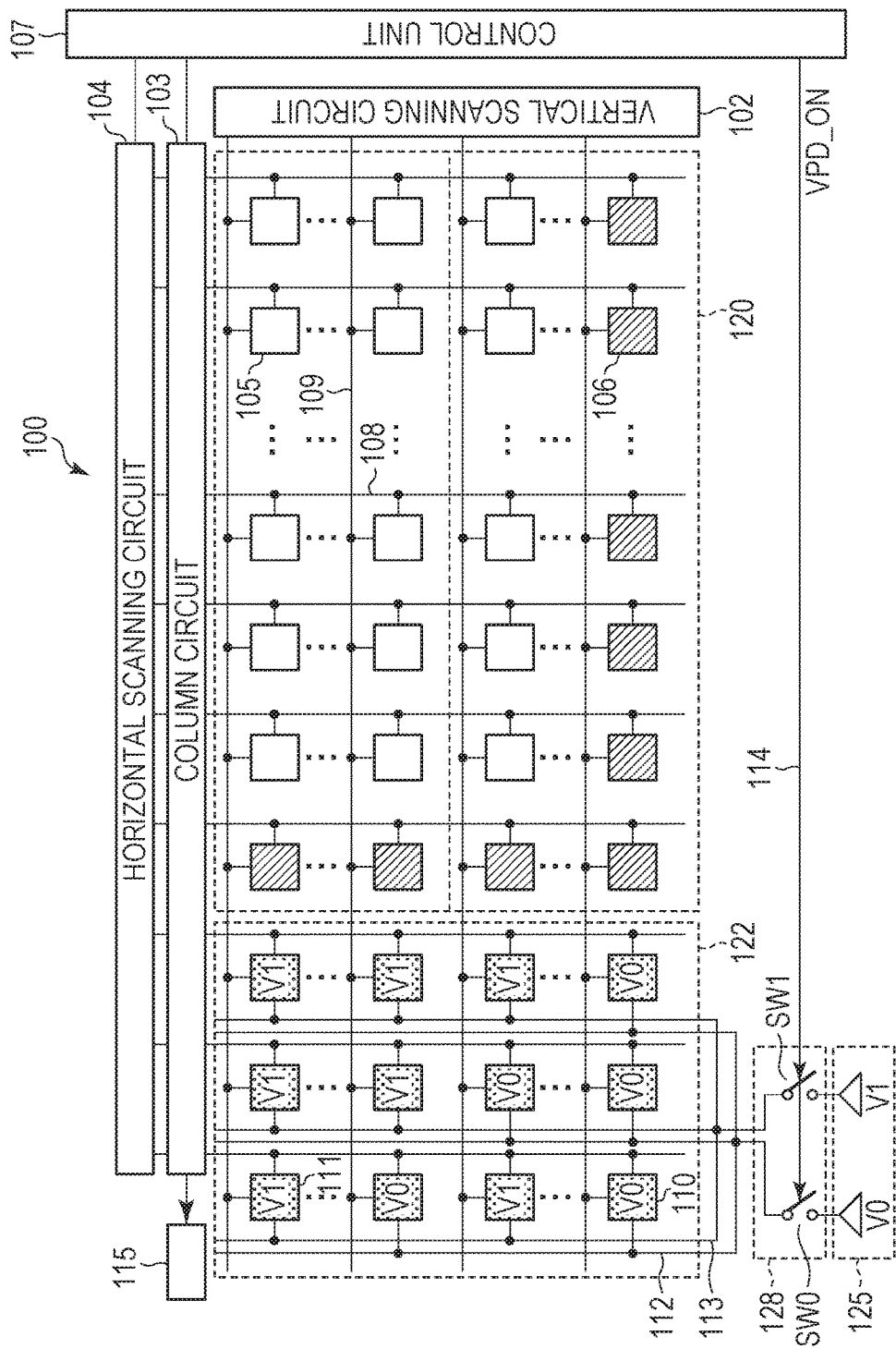
FIG. 22 is a diagram of the entirety of an image capturing device.
Figure 23:
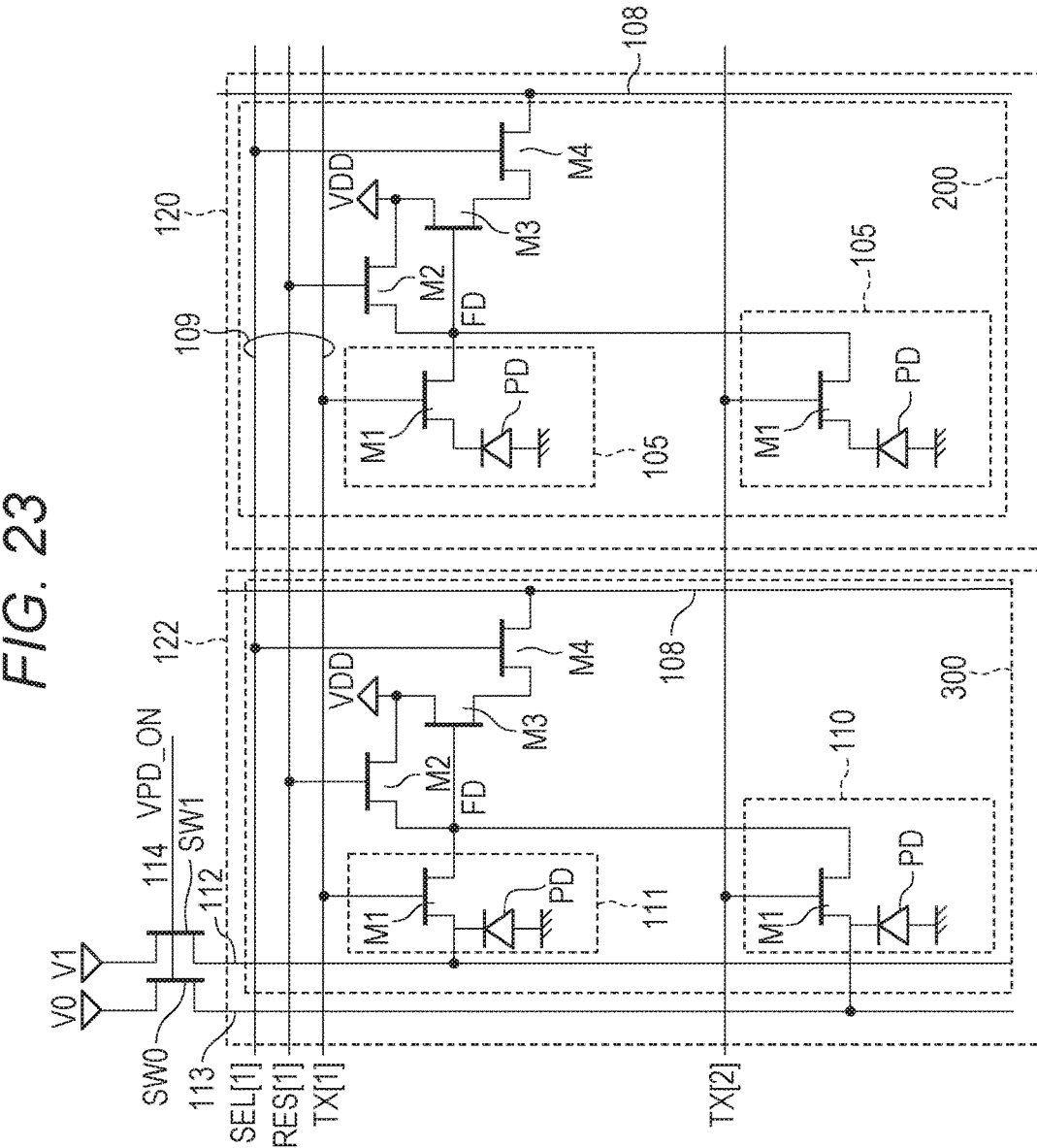
FIG. 23 is an equivalent circuit diagram of an image obtaining pixel and a failure detection pixel.
Figure 24A:
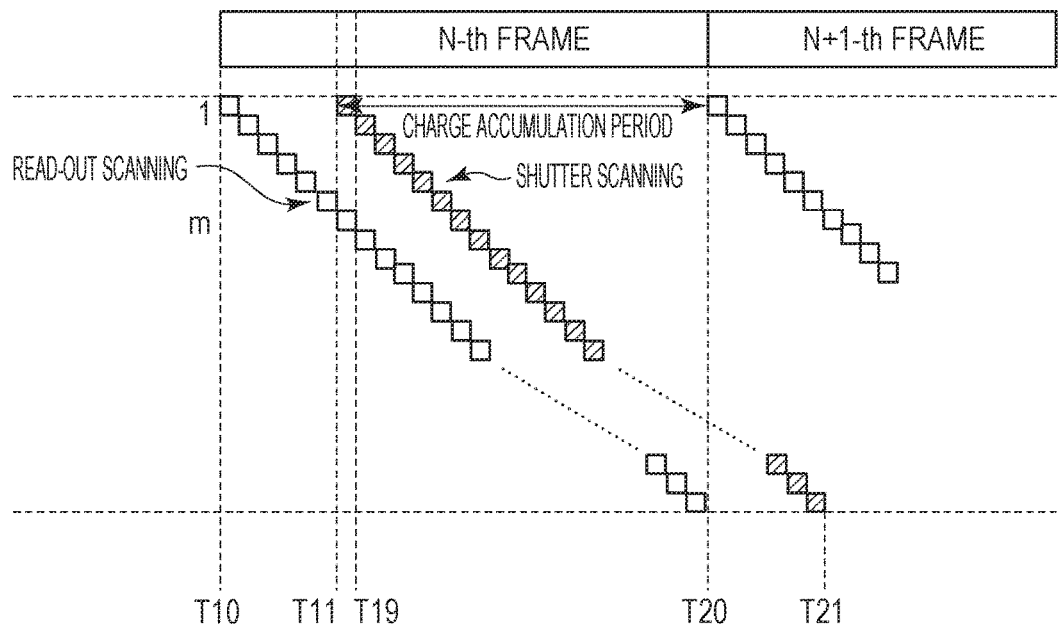
FIGS. 24A and 24B are charts of operation of the pixels.
Figure 24B:
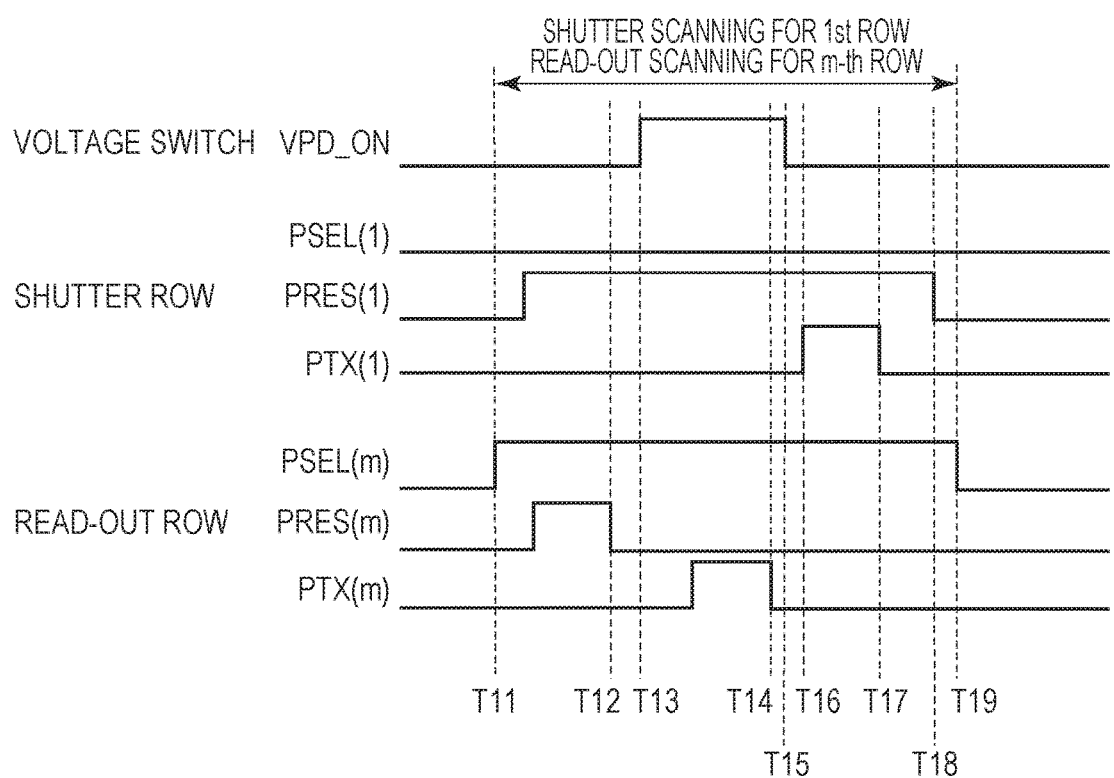

FIG. 22 is a block diagram of an outline configuration of an image capturing device of the present embodiment. FIG. 23 is a circuit diagram of a pixel configuration example in the image capturing device according to the present embodiment. FIGS. 24A and 24B are timing charts of the method for driving the image capturing device according to the present embodiment.

First, the structure of the image capturing device according to the present embodiment will be described with reference to FIGS. 22 and 23.

An image capturing device 100 according to the present embodiment includes, as illustrated in FIG. 22, a first region 120, a second region 122, a vertical scanning circuit 102, column circuits 103, a horizontal scanning circuit 104, an output circuit 115, a control unit 107, a voltage supply unit 125, and a voltage switch 128.

Any of the vertical scanning circuits of the above-described first to fourth embodiments is applicable as the vertical scanning circuit 102 of the present embodiment.

In the first region 120, pixels 105 of a first group and pixels 106 of a second group are arranged in multiple rows and multiple columns. The first region 120 is an image obtaining pixel region where the pixels for obtaining an image are arranged. The pixel 105 is a pixel including a photoelectric conversion unit, and is illustrated as a white block in FIG. 22. The pixel 106 is a pixel including a light-shielded photoelectric conversion unit, and is illustrated as a shaded block in FIG. 22. The pixel 106 is a pixel for outputting a reference signal as a reference for a black level, and is typically arranged at a peripheral edge portion of the first region 120. Note that the pixels 106 are not necessarily provided.

In the second region 122, pixels 110 of a third group and pixels 111 of a fourth group are arranged in multiple rows and multiple columns. The second region 122 is a failure detection pixel region where the pixels for failure detection are arranged. The pixel 110 is a pixel configured to output a signal corresponding to the electric potential of a fixed voltage terminal V0, and is illustrated as a block indicated by "V0" in FIG. 22. The pixel 111 is a pixel configured to output a signal corresponding to the electric potential of a fixed voltage terminal V1, and is illustrated as a block indicated by "V1" in FIG. 22.

The first region 120 and the second region 122 are arranged adjacent to each other in a row direction (a traverse direction in FIG. 22), and the first region 120 and the second region 122 are arranged in the same row, but are arranged in different columns.

A pixel control line 109 extending in the row direction is arranged for each row of the first region 120 and the second region 122. The pixel control line 109 for each row forms the common signal line for the pixels 105, 106, 110, and 111 belonging to such a row. The pixel control line 109 is connected to the vertical scanning circuit 102.

In each row of the first region 120 and the second region 122, vertical output lines 108 extending in the column direction are arranged. The vertical output line 108 for each column of the first region 120 forms the common signal line for the pixels 105 and 106 belonging to such a column. The vertical output line 108 for each column of the second region 122 forms the common signal line for the pixels 110 and 111 belonging to such a column. The vertical output line 108 is connected to the column circuit 103.

The vertical scanning circuit 102 is configured to supply a predetermined control signal for driving the pixels 105, 106, 110, and 111 via the pixel control lines 109. A logic circuit such as a shift register or an address decoder can be used as the vertical scanning circuit 102. FIG. 22 illustrates the pixel control line 109 for each row by a single signal line, but actually includes multiple control signal lines. The pixels 105, 106, 110, and 111 of the row selected by the vertical scanning circuit 102 operate to simultaneously output signals to the corresponding vertical output lines 108.

The column circuit 103 is configured to amplify the pixel signal output to the vertical output line 108, thereby performing correlated double sampling based on a signal upon resetting and a signal upon photoelectric conversion. For the pixel signals output from the pixels 110 and 111 for failure detection, the correlated double sampling based on the signal upon resetting and a signal upon fixed voltage input is performed as in the pixels 105 and 106 for obtaining the image.

The horizontal scanning circuit 104 is configured to supply, to the column circuits 103, a control signal for sequentially transferring, for each column, the pixel signals processed in the column circuits 103 to the output circuit 115.

The output circuit 115 includes a buffer amplifier, a differential amplifier, etc., and is configured to output, to an external signal processing unit (not shown) of the image capturing device 100, the pixel signals transferred from the column circuits 103. Note that an AD conversion unit may be provided at the column circuit 103 or the output circuit 115, thereby outputting a digital image signal to the outside.

The voltage supply unit 125 is a power source circuit configured to supply the electric potential of the predetermined fixed voltage terminals V0 and V1. The voltage switch 128 includes switches SW0 and SW1. The switch SW0 is provided between the fixed voltage terminal V0 of the voltage supply unit 125 and a voltage supply line 112, and is configured to supply the electric potential of the fixed voltage terminal V0 to the voltage supply line 112 according to a control signal (VPD_ON) supplied from the control unit 107 via a control signal line 114. The switch SW1 is provided between the fixed voltage terminal V1 of the voltage supply unit 125 and a voltage supply line 113, and is configured to supply the electric potential of the fixed voltage terminal V1 to the voltage supply line 113 according to the control signal (VPD_ON) supplied from the control unit 107 via the control signal line 114.

The voltage supply lines 112 and 113 are lines for supplying the electric potentials of the fixed voltage terminals V0 and V1 from the voltage supply unit 125 to the pixels 110 and 111 arranged in the second region 122. In the multiple pixels 110 and 111 in the second region 122, the common line is, for example, used as the voltage supply lines 112 and 113 as illustrated in the figure, and therefore, circuit space saving can be realized.

In the second region 122, the pixels 110 to which the electric potential of the fixed voltage terminal V0 is supplied and the pixels 111 to which the electric potential of the fixed voltage terminal V1 different from the electric potential of the fixed voltage terminal V0 is supplied are arranged in a matrix according to a specific pattern.

A case where the second region 122 includes three columns will be described by way of example. For example, in a certain row (e.g., the lowermost row in FIG. 22), the pixels 110, 110, and 110 are each arranged in the columns. Moreover, in another row (e.g., the second row from below in FIG. 22), the pixels 111, 110, and 111 are each arranged in the columns. That is, the pattern of a fixed voltage applied to the pixels 110 and 111 varies according to the row for vertical scanning.

The failure detection pixels 110 and the image obtaining pixels 105 belonging to the same row share the pixel control line 109. Thus, an output pattern in the second region 122 is compared with an expectation value, and in this manner, it can be sensed whether the vertical scanning circuit 102 is normally operated or is failed and is scanning a row different from an intended row.

Note that in the present embodiment, the case where the second region 122 includes three columns has been described by way of example, but the number of columns forming the second region 122 is not limited to three.

FIG. 23 is the circuit diagram of the configuration example of the pixels 105, 106, 110, and 111 forming the first region 120 and the second region 122. FIG. 23 illustrates only some pixels including the pixel 105 arranged in the first row and the pixel 105 arranged in the second row in the first column of the first region 120, and the pixel 111 arranged in the first row and the pixel 110 arranged in an m-th row in the first column of the second region 122.

Each pixel 105 arranged in the first region 120 includes a photoelectric conversion unit PD and a transfer transistor M1. A pixel cell 200 has two pixels 105. The pixel cell 200 includes a reset transistor M2, an amplification transistor M3, and a selection transistor M4. The photoelectric conversion unit PD is, for example, a photodiode. Of the photodiode of the photoelectric conversion unit PD, an anode is connected to a reference voltage terminal GND, and a cathode is connected to a source of the transfer transistor M1. A drain of the transfer transistor M1 is connected to a source of the reset transistor M2 and a gate of the amplification transistor M3. A connection node among the drain of the transfer transistor M1, the source of the reset transistor M2, and the gate of the amplification transistor M3 form a floating diffusion FD. A drain of the reset transistor M2 and a drain of the amplification transistor M3 are connected to a power source voltage terminal VDD. A source of the amplification transistor M3 is connected to a drain of the selection transistor M4. A source of the selection transistor M4 is connected to the vertical output line 108. The pixel 105 of the first row and the pixel 105 of the second row share the floating diffusion FD as an input node of the gate of the single amplification transistor M3.

The pixels 110 and 111 arranged in the second region 122 include light-shielded photodiodes PD and transfer transistors M1. A pixel cell 300 has the pixel 110 and the pixel 111. Further, the pixel cell 300 includes a reset transistor M2, an amplification transistor M3, and a selection transistor M4. A source of the transfer transistor M1 of the pixel 111 is connected to the voltage supply line 112. Hereinafter, the pixel 111 will be described. A drain of the transfer transistor M1 is connected to a source of the reset transistor M2 and a gate of the amplification transistor M3. A connection node among the drain of the transfer transistor M1, the source of the reset transistor M2, and the gate of the amplification transistor M3 form a floating diffusion FD. A drain of the reset transistor M2 and a drain of the amplification transistor M3 are connected to a power source voltage terminal VDD. A source of the amplification transistor M3 is connected to a drain of the selection transistor M4. A source of the selection transistor M4 is connected to the vertical output line 108. The pixel 111 of the first row and the pixel 110 of the second row share the floating diffusion FD as an input node of the gate of the single amplification transistor M3.

In the pixel 110 arranged in the second region 122, a source of the transfer transistor M1 is not connected to the voltage supply line 112, but is connected to the voltage supply line 113.

In the case of the pixel configuration of FIG. 23, the pixel control line 109 arranged for each row includes signal lines TX, RES, and SEL. The signal line TX is connected to each of the gates of the transfer transistors M1 of the pixels belonging to a corresponding row. The signal line RES is connected to each of the gates of the reset transistors M2 of the pixels belonging to a corresponding row. The signal line SEL is connected to each of the gates of the selection transistors M4 of the pixels belonging to a corresponding row. Note that a row number is added to signal line reference characters in FIG. 23 (e.g., SEL(1), RES(1)).

A control signal PTX as a drive pulse for controlling the transfer transistor M1 is output to the signal line TX from the vertical scanning circuit 102. A control signal PRES as a drive pulse for controlling the reset transistor M2 is output to the signal line RES from the vertical scanning circuit 102. A control signal PSEL as a drive pulse for controlling the selection transistor M4 is output to the signal line SEL from the vertical scanning circuit 102. In a case where each transistor is an N-type transistor, a corresponding transistor is turned ON when a high-level control signal is supplied from the vertical scanning circuit 102, and is turned OFF when a low-level control signal is supplied from the vertical scanning circuit 102.

The photoelectric conversion unit PD included in the pixel 105 for obtaining the image is configured to convert (photoelectrically convert) incident light into an electric charge corresponding to the quantity of incident light to accumulate the generated electric charge. The transfer transistor M1 of the pixel 105 is turned ON to transfer the electric charge of the photoelectric conversion unit PD to the floating diffusion FD. The floating diffusion FD generates, by charge-voltage conversion according to the capacitance value of the floating diffusion FD, a voltage corresponding to the quantity of electric charge transferred from the photoelectric conversion unit PD. The transfer transistors M1 of the pixels 110 and 111 are turned ON to apply, to the floating diffusion FD, voltages supplied from the voltage supply lines 112 and 113. The amplification transistor M3 is configured such that a power source voltage is supplied to the drain and a bias current is supplied from a not-shown current source to the source via the selection transistor M4, and forms an amplification unit (a source follower circuit) having a gate as an input node. With this configuration, the amplification transistor M3 outputs a signal based on the voltage of the floating diffusion FD to the vertical output line 108 via the selection transistor M4. The reset transistor M2 is turned ON to reset the floating diffusion FD to a voltage corresponding to the power source voltage VDD.

For the pixels in the same row, the common control signals PTX, PRES, and PSEL are supplied to the first region 120 and the second region 122 from the vertical scanning circuit 102. For example, control signals PTX(m), PSEL(m), and PRES(m) are supplied to the transfer transistors M1, the reset transistors M2, and the selection transistors M4 of the pixels 105, 110, and 111 of the m-th row.

Next, the method for driving the image capturing device according to the present embodiment will be described with reference to FIGS. 24A and 24B. FIG. 24A is the timing chart of a relationship between read-out scanning and shutter scanning in a single frame period. FIG. 24B is the timing chart of details of pixel operation in scanning for a read-out scanning row and a shutter scanning row.

FIG. 24A illustrates the outline of operation for an N-th frame starting at a time point T10 and ending at a time point T20 and an N+1-th frame starting at the time point T20. The operation for each frame includes the read-out scanning for sequentially performing, for the rows, read-out operation from the pixels 105, 106, 110, and 111, and the shutter scanning for sequentially starting, for the rows, electric charge accumulation in the photoelectric conversion units PD of the pixels 105 and 106.

The read-out scanning for the N-th frame starts at the time point T10, and ends at the time point T20. The time point T10 is the point of time of starting the read-out operation from the pixels of the first row, and the time point T20 is the point of time of ending the read-out operation from the pixels of the last row.

The shutter scanning for the N-th frame starts at a time point T11, and ends at a time point T21. The time point T11 is the point of time of starting the shutter operation for the pixels of the first row, and the time point T21 is the point of time of ending the shutter operation for the pixels of the last row. A period from the point of time of starting the shutter operation to the point of time of starting the subsequent read-out operation is a charge accumulation period. Focusing on, e.g., the first row, a period from the time point T11 to the time point T20 is a charge accumulation period. The timing of starting the shutter operation is controlled so that the charge accumulation period can be controlled.

In this example, at the time point T11 of starting the shutter operation for the pixels of the first row, the read-out operation from the pixels of the m-th row begins. The shutter operation for the pixels of the first row and the read-out operation from the pixels 106 of the m-th row end at a time point T19.

FIG. 24B illustrates the details of the pixel operation from the time point T11 to the time point T19. Note that the pixel operation is the same between the shutter operation and the read-out operation.

At the time point T11, a control signal PSEL(m) for the read-out scanning row (the m-th row) reaches a high level, and the selection transistors M4 of the pixels of the read-out scanning row are turned ON. By such operation, a state in which reading of the signals from the pixels of the read-out scanning row to the vertical output lines 108 is available is brought.

Subsequently, between the time point T11 and a time point T12, a control signal PRES(1) for the shutter scanning row (the first row) and a control signal PRES(m) for the read-out scanning row reach the high level. By such operation, each reset transistor M2 of the pixels of the shutter scanning row and the read-out scanning row is turned ON, and the floating diffusion FD is reset.

Subsequently, at the time point T12, the control signal PRES(m) for the read-out scanning row reaches a low level, and the reset transistors M2 of the pixels of the read-out scanning row are turned OFF. By such operation, the electric charge in each floating diffusion FD is discharged to the power source voltage terminal VDD. The voltage of each floating diffusion FD is amplified by source follower operation, and is read out to the vertical output line 108.

Subsequently, at a time point T13, the control signal VPD_ON reaches the high level, and in this manner, the switches SW0 and SW1 of the voltage switch 128 are turned ON. Thus, the electric potentials of the fixed voltage terminals V0 and V1 are supplied to the voltage supply line 112 and 113, respectively, from the voltage supply unit 125.

Subsequently, a control signal PTX(m) for the read-out scanning row reaches the high level between the time point T13 and a time point T14, and the transfer transistors M1 of the pixels of the read-out scanning row are turned ON. By such operation, in each of the pixels 105 and 106 of the read-out scanning row, the electric charge accumulated in the photoelectric conversion unit PD is transferred to the floating diffusion FD. Moreover, in each of the pixels 110 and 111 of the read-out scanning row, the electric potential of the fixed voltage terminal V0 and V1 supplied from the voltage supply unit 125 is written in the floating diffusion FD.

Subsequently, at the time point T14, the control signal PTX(m) for the read-out scanning row reaches the low level, and the transfer transistors M1 of the pixels of the read-out scanning row are turned OFF. By such operation, the voltage of each floating diffusion FD of the read-out scanning row is fixed. The fixed voltage is amplified by the source follower operation, and is read out to the vertical output line 108.

Subsequently, at a time point T15, the control signal VPD_ON reaches the low level, and accordingly, the switches SW0 and SW1 of the voltage switch 128 are turned OFF. A supply of the electric potential of the fixed voltage terminals V0 and V1 from the voltage supply unit 125 to the voltage supply line 112 and 113 is blocked.

Subsequently, at a time point T16, a control signal PTX(1) for the shutter scanning row reaches the high level, and the transfer transistors M1 of the pixels of the shutter scanning row are turned ON. At this point, the reset transistors M2 of the pixels of the shutter scanning row are also ON, and therefore, the electric charge of each photoelectric conversion unit PD is discharged to the power source voltage terminal VDD via the transfer transistor M1 and the reset transistor M2.

Subsequently, at a time point T17, the control signal PTX(1) for the shutter scanning row reaches the low level, and the transfer transistors M1 of the pixels of the shutter scanning row are turned OFF. Moreover, at a time point T18, the control signal PRES(1) for the shutter scanning row reaches the low level, and the reset transistors M2 of the pixels of the shutter scanning row are turned OFF. By such operation, the shutter operation for the shutter scanning row is completed.

Subsequently, at the time point T19, the control signal PSEL(m) for the read-out scanning row reaches the low level, and the selection transistors M4 of the pixels of the read-out scanning row are turned OFF. By such operation, the pixels of the read-out scanning row are deselected, and the read-out operation for the read-out scanning row is completed.

In the present embodiment, the switches SW0 and SW1 of the voltage switch 128 are, as described above, turned OFF (the control signal VPD_ON is at the low level) during the period that the transfer transistors M1 of the shutter scanning row are ON. Reasons will be described below.

For completely removing the electric charge of the photoelectric conversion unit PD of each of the pixels 105 and 106 of the first region 120 by the shutter operation, in one embodiment, the reset transistors M2 and the transfer transistors M1 of the shutter scanning row are turned ON at the same time. Specifically, in a case where a saturation charge quantity of the photoelectric conversion unit PD exceeds that of the floating diffusion FD, the reset transistors M2 and the transfer transistors M1 are simultaneously turned ON.

However, in this state, when the voltage remains supplied from the voltage supply unit 125 to each of the pixels 110 and 111 of the second region 122 as the failure detection pixel region, short circuit of the fixed voltage terminals V1 and V0 and the power source voltage terminal VDD is caused. Typically, the electric potential of the fixed voltage terminal V1 is about 1.6 V, and the power source voltage VDD is 3.3 V. Thus, an adverse effect such as unavailability of accurate reading of the electric potential of the pixels 110 and 111 of the second region 122 due to a short-circuit current is caused.

For this reason, in the present embodiment, it is configured such that the voltage switch 128 is provided between the voltage supply unit 125 and the pixels 110 and 111 of the second region 122. When the transfer transistors M1 of the shutter scanning row is turned ON, driving is made such that the switches SW0 and SW1 of the voltage switch 128 are turned OFF.

With this configuration, short circuit of the fixed voltage terminals V0 and V1 and the power source voltage terminal VDD upon shutter scanning can be avoided, and the accuracy of detection in failure detection can be enhanced. That is, short circuit between the voltage terminals upon shutter scanning is avoided. This leads to a beneficial effect that image capturing and failure detection are performed in real time while the accuracy of detection of failure detection is enhanced.

Note that in the present embodiment, the timing of turning ON the transfer transistors M1 of the shutter scanning row is after the timing of turning ON the transfer transistors M1 of the read-out scanning row. The present embodiment is not limited to such operation. That is, the timing of turning ON the transfer transistors M1 of the shutter scanning row may be before the timing of turning ON the transfer transistors M1 of the read-out scanning row.

<Upper View of Pixel>

Figure 25:
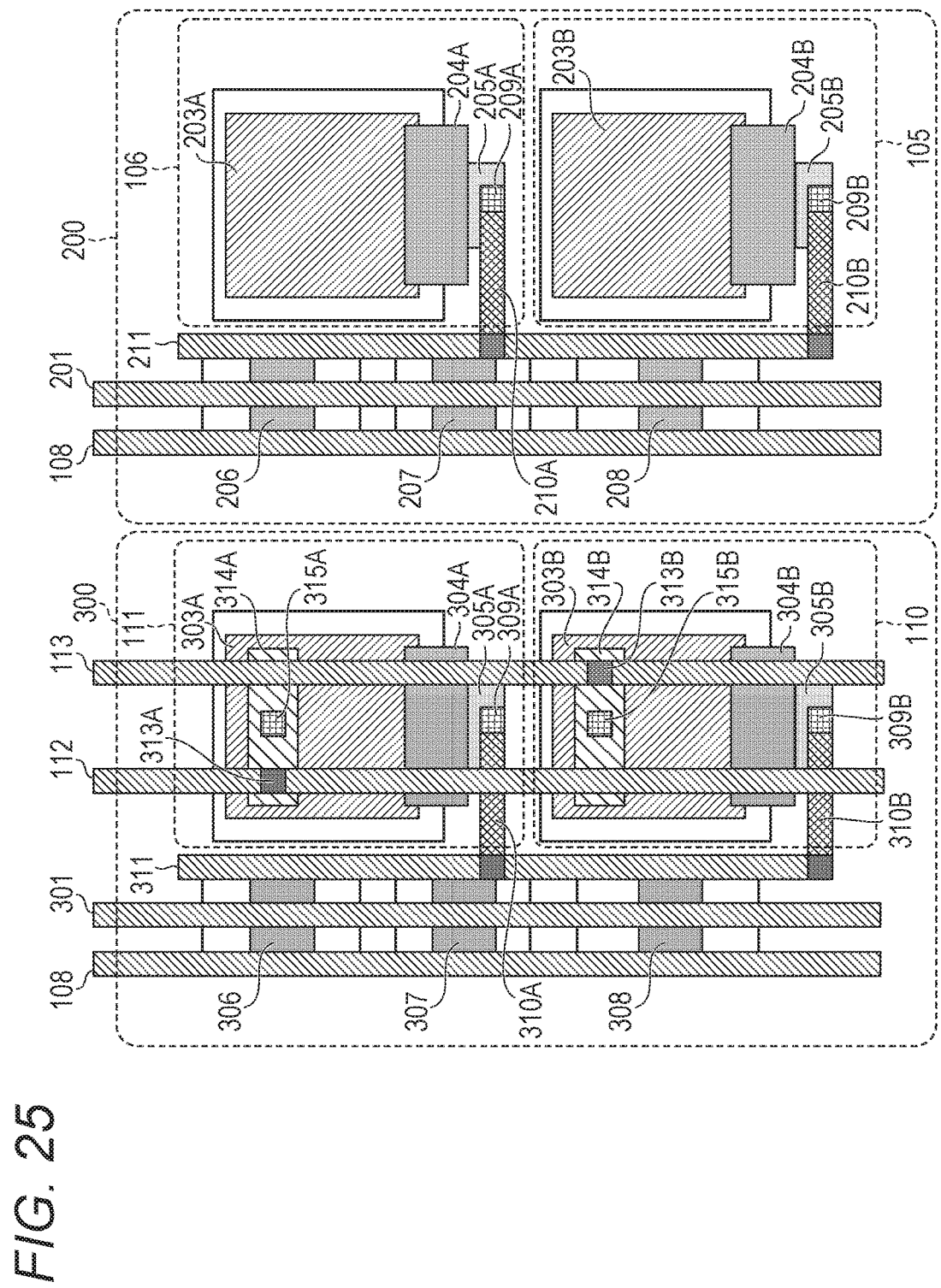
FIG. 25 is an upper view of the pixels.

FIG. 25 is an upper view of the pixels 105, 110, and 111. In FIG. 25, the same reference numerals as those of FIG. 23 are used to represent members having the same functions as those of FIG. 23.

A pixel power source line 201 is a line for transferring the power source voltage VDD to the pixels for obtaining the image. The pixel cell 200 has semiconductor regions 203A and 203B as part of the photoelectric conversion units PD. The semiconductor region 203A, 203B is a charge accumulation unit configured to accumulate an electric charge generated by photoelectric conversion. In this example, the conductivity type of the semiconductor regions 203A and 203B is an N-type. Moreover, the electric charge accumulated in the semiconductor regions 203A and 203B is an electron.

Further, the pixel cell 200 has floating diffusion regions 205A and 205B as part of gates 204A and 204B of the transfer transistors M1 and the floating diffusion (hereinafter referred to as "FD"). Further, the pixel cell 200 has a gate 206 of the selection transistor M4, a gate 207 of the amplification transistor M3, and a gate 208 of the reset transistor M2. Further, the pixel cell 200 has FD connection contacts (the contacts will be hereinafter referred to as "CNTs") 209A and 209B, FD connection lines 210A and 210B, and an FD connection line 211. Hereinafter, the gate of the reset transistor will be referred to as a "reset gate", the gate of the transfer transistor will be referred to as a "transfer gate", the gate of the amplification transistor will be referred to as an "amplification gate", and the gate of the selection transistor will be referred to as a "selection gate".

The semiconductor region 203A is connected to the floating diffusion region 205A via the transfer gate 204A. An electric charge accumulated in the semiconductor region 203A is transferred to the floating diffusion region 205A via the transfer gate 204A. The floating diffusion region 205A is connected to the amplification gate 207 via the FD connection CNT 209A, the FD connection line 210A, and the FD connection line 211.

The semiconductor region 203B is connected to the floating diffusion region 205B via the transfer gate 204B. An electric charge accumulated in the semiconductor region 203B is transferred to the floating diffusion region 205B via the transfer gate 204B. The floating diffusion region 205B is connected to the amplification gate 207 via the FD connection CNT 209B, the FD connection line 210B, and the FD connection line 211.

The floating diffusion region 205A is connected to the reset transistor M2 via the FD connection CNT 209A, the FD connection line 210A, and the FD connection line 211.

The floating diffusion region 205B is connected to the reset transistor M2 via the FD connection CNT 209B, the FD connection line 210B, and the FD connection line 211.

A pixel power source line 301 is a line for transferring the power source voltage VDD to the failure detection pixels.

The pixel cell 300 for failure detection has semiconductor regions 303A and 303B as part of the photoelectric conversion units PD. The pixel cell 300 has transfer gates 304A and 304B, floating diffusion regions 305A and 305B, a selection gate 306, an amplification gate 307, and a reset gate 308.

Further, the pixel cell 300 has FD connection CNTs 309A and 309B, FD connection lines 310A and 310B, an FD connection line 311, and the voltage supply lines 112 and 113. Further, the pixel cell 300 has failure detection VIAs 313A and 313B, failure detection lines 314A and 314B, and failure detection CNTs 315A and 315B.

The voltage supply line 112 and the voltage supply line 113 are arranged on the photoelectric conversion units PD of the pixel cell 300. In other words, as viewed in plane, the voltage supply line 112 and the photoelectric conversion unit PD overlap with each other, and the voltage supply line 113 and the photoelectric conversion unit PD overlap with each other.

The voltage supply line 112 is connected to the failure detection line 314A via the failure detection VIA 313A. Further, the failure detection line 314A is connected to the semiconductor region 303A via the failure detection CNT 315A.

An electric potential applied to the semiconductor region 303A by the voltage supply line 112 is output to the floating diffusion region 305A via the reset transistor M2.

The voltage supply line 113 is connected to the failure detection line 314B via the failure detection VIA 313B. Further, the failure detection line 314B is connected to the semiconductor region 303B via the failure detection CNT 315B.

An electric potential applied to the semiconductor region 303B by the voltage supply line 113 is output to the floating diffusion region 305B via the reset transistor M2.

The amplification transistor M3 outputs a signal corresponding to the electric potential of the amplification gate 307 to the vertical output line 108 via the selection transistor M4.

The floating diffusion region 305A is connected to the reset transistor M2 via the FD connection CNT 309A, the FD connection line 310A, and the FD connection line 311. The floating diffusion region 305B is connected to the reset transistor M2 via the FD connection CNT 309B, the FD connection line 310B, and the FD connection line 311.

The output of the pixel cell 300 for failure detection is at a signal level corresponding to the electric potential of the voltage supply line 112 or the voltage supply line 113.

<Upper View and Sectional View of Photoelectric Conversion Unit>

Further, regarding the upper view of the pixels described with reference to FIG. 25, the photoelectric conversion unit will be mainly described with reference to FIG. 26.

Figure 26:
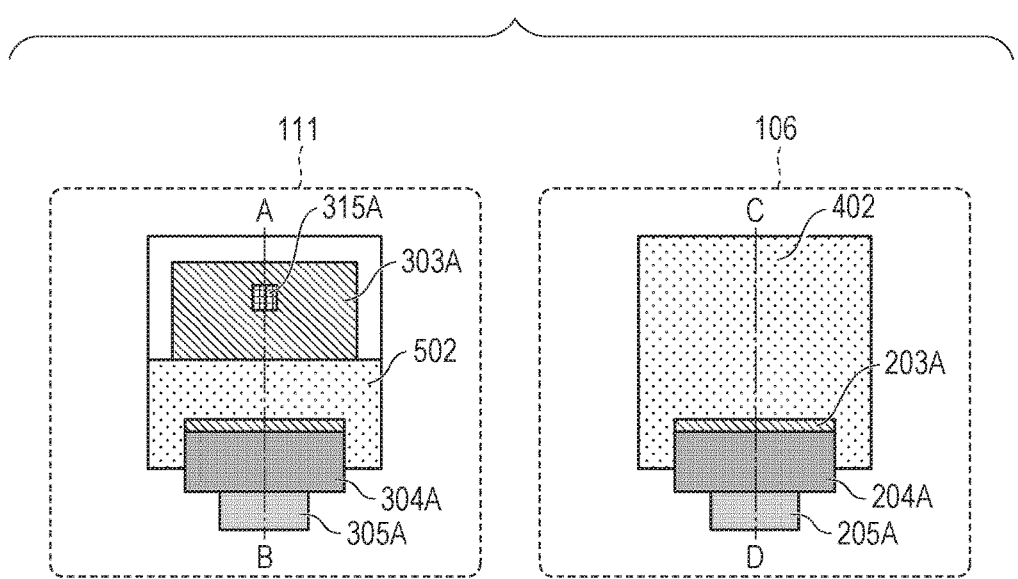
FIG. 26 is an upper view of a photoelectric conversion unit and a transfer transistor.

FIG. 26 is an upper view of the image obtaining pixel 106, the photoelectric conversion unit PD of the failure detection pixel 111, and the reset transistor M2. In FIG. 26, the same reference numerals as those of FIG. 25 are used to represent members having the same functions as those of FIG. 25.

First, the pixel 106 for obtaining the image will be described. As viewed in plane, the semiconductor region 203A where the electric charge is accumulated overlaps with a P-type semiconductor region 402. Although will be described later with reference to FIGS. 27A and 27B, the semiconductor region 402 functions as a surface protection layer for protecting a surface of a semiconductor region 203. Hereinafter, the semiconductor region 402 might be described as the surface protection layer.

Next, the pixel 111 for failure detection will be described. As viewed in plane, a P-type semiconductor region 502 is provided between a portion of the semiconductor region 303A connected to the failure detection CNT 315A and the transfer gate 304A.

Figure 27A:
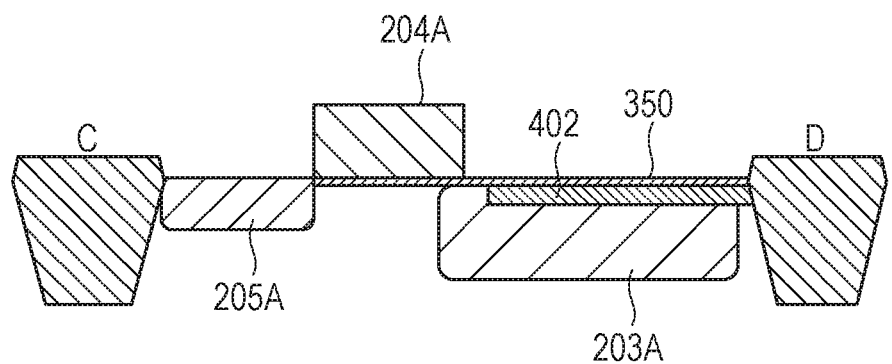
FIGS. 27A and 27B are sectional views of the photoelectric conversion unit and the transfer transistor.
Figure 27B:
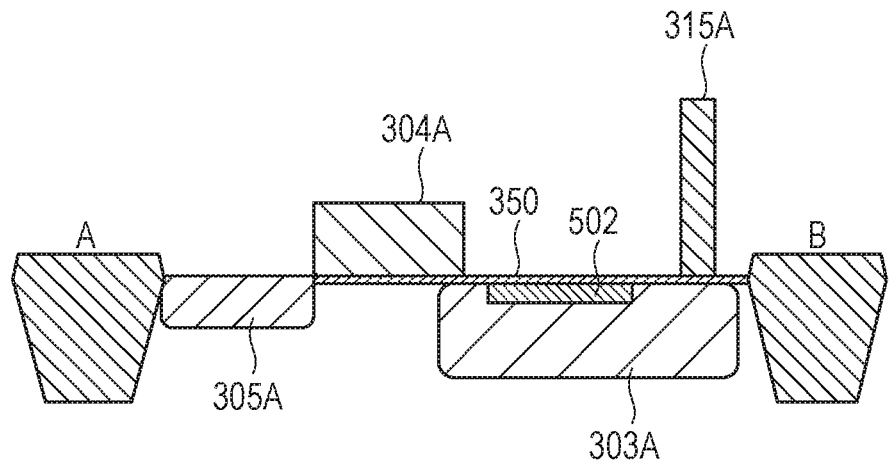

FIG. 27A is a sectional view of the pixel at a position at which a line indicated by "C-D" passes in FIG. 26. FIG. 27B is a sectional view of the pixel at a position at which a line indicated by "A-B" passes in FIG. 26.

First, the pixel 106 for obtaining the image (the section corresponding to the line of C-D) as illustrated in FIG. 27A will be described. The semiconductor region 203A where the electric charge is accumulated is formed below the P-type semiconductor region 402. Thus, the semiconductor region 402 functions as the surface protection layer for protecting the surface of the semiconductor region 203. The semiconductor region 402 is formed between a semiconductor substrate principal surface 350 and the semiconductor region 203A.

Next, the pixel 111 for failure detection (the section corresponding to the line of A-B) as illustrated in FIG. 27B will be described. The failure detection CNT 315A is connected to a partial region of the semiconductor region 303A where the electric charge is accumulated. No semiconductor region 502 is formed below the failure detection CNT 315A. Moreover, the semiconductor region 502 is provided between the portion of the semiconductor region 303A connected to the failure detection CNT 315A and the transfer gate 304A. Further, at a portion where the semiconductor region 502 and the semiconductor region 303A overlap with each other as viewed in plane, the semiconductor region 303A is provided below the semiconductor region 502. The semiconductor region 502 is formed between the semiconductor substrate principal surface 350 and the semiconductor region 303A.

<Beneficial Effects of Semiconductor Region 502>

When the conductivity type of the semiconductor region 303A is the N-type, the conductivity of the semiconductor region 502 is a P-type. Thus, the semiconductor region 502 has a lower electric potential than that of the semiconductor region 303A. That is, the electric potential of the semiconductor region 502 is an electric potential between the electric potential of the transfer gate 304A in an OFF state and the electric potential of the semiconductor region 303A. In the case of forming no semiconductor region 502, an electric field corresponding to a potential difference between the transfer gate 304A and the semiconductor region 303A is applied to the transfer gate 304A. On the other hand, in the present embodiment, the semiconductor region 502 is provided such that the electric field of the transfer gate 304A corresponding to the potential difference between the transfer gate 304A and the semiconductor region 502 is relaxed. With this configuration, failure of the reset transistor M2 of the pixel 111 for failure detection can be reduced. That is, the pixel configuration of the present embodiment can reduce failure of the pixel 111. Moreover, the image capturing device of the present embodiment can reduce a manufacturing defect. Thus, the image capturing device of the present embodiment can provide the beneficial effect of improving the yield rate of the image capturing device in manufacturing.

Sixth Embodiment

Regarding an image capturing device of the present embodiment, differences from the fifth embodiment will be mainly described.

The image capturing device of the present embodiment is configured such that a failure detection CNT 315A is connected to a semiconductor region provided inside a semiconductor region 303A, having the same conductivity type as that of the semiconductor region 303A, and having a higher impurity concentration than that of the semiconductor region 303A.

Figure 28:
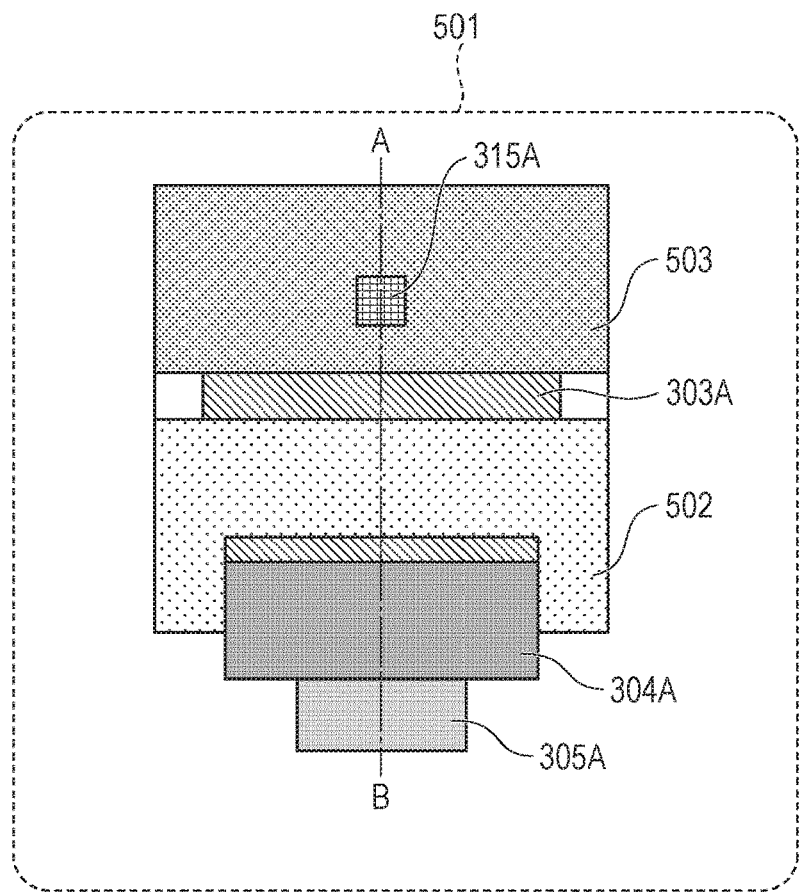
FIG. 28 is an upper view of a photoelectric conversion unit and a transfer transistor.

FIG. 28 is an upper view of a photoelectric conversion unit and a transfer transistor of a pixel 501 for failure detection in the present embodiment. In FIG. 28, the same reference numerals as those of FIG. 25 are used to represent members having the same functions as those of FIG. 25.

As viewed in plane, a semiconductor region 503 is formed at a portion where the semiconductor region 303A does not overlap with a semiconductor region 502. The semiconductor region 503 is a region having the same conductivity type as that of the semiconductor region 303A and having a higher impurity concentration than that of the semiconductor region 303A. As viewed in plane, a gap is formed between the semiconductor region 503 and the semiconductor region 502.

Figure 29:
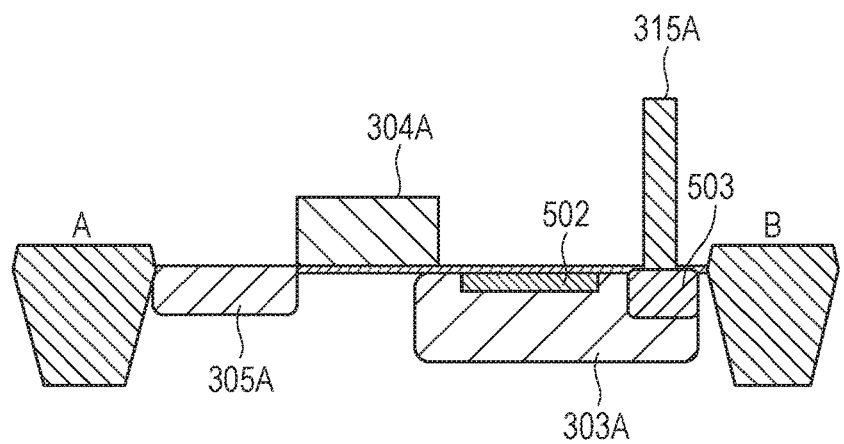
FIG. 29 is a sectional view of the photoelectric conversion unit and the transfer transistor.

FIG. 29 is a sectional view along a line of A-B illustrated in FIG. 28.

The semiconductor region 503 is formed inside the semiconductor region 303A. A bottom portion of the semiconductor region 503 is at a position deeper than that of the semiconductor region 502.

The image capturing device of the present embodiment includes the semiconductor region 503 so that electric resistance between the failure detection CNT 315A and the semiconductor region 303A can be reduced. This can improve detection accuracy in failure detection.

Figure 30A:
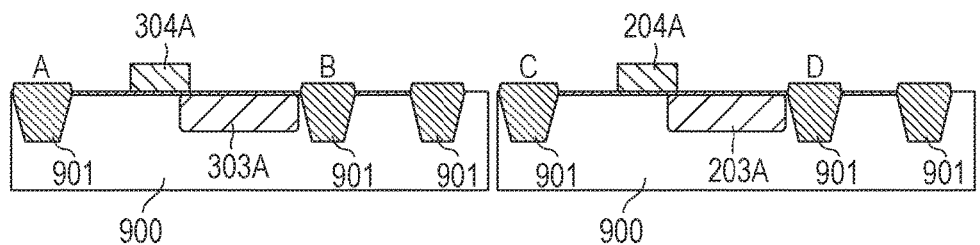
FIGS. 30A to 30E are views of the step of manufacturing the photoelectric conversion unit and the transfer transistor.
Figure 30B:
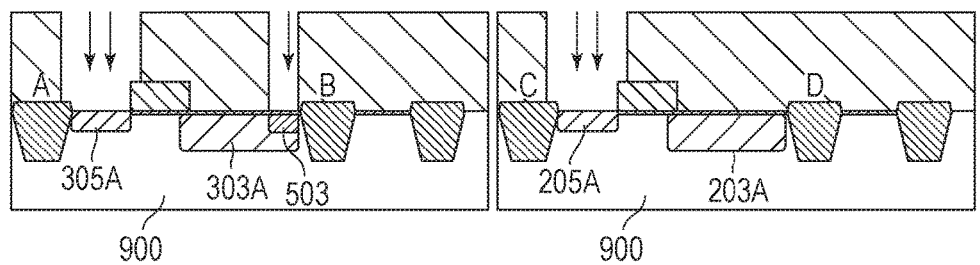
Figure 30C:
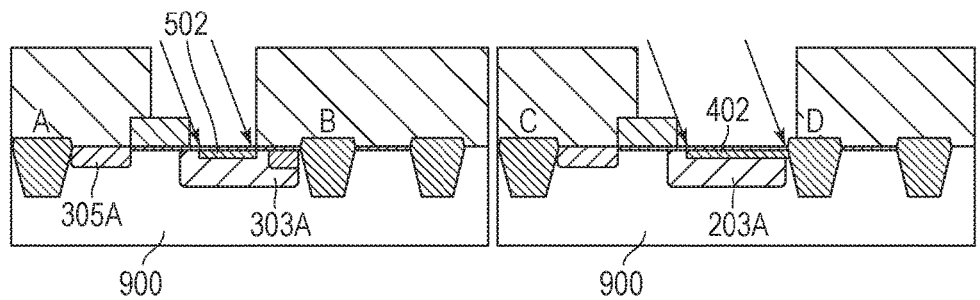
Figure 30D:
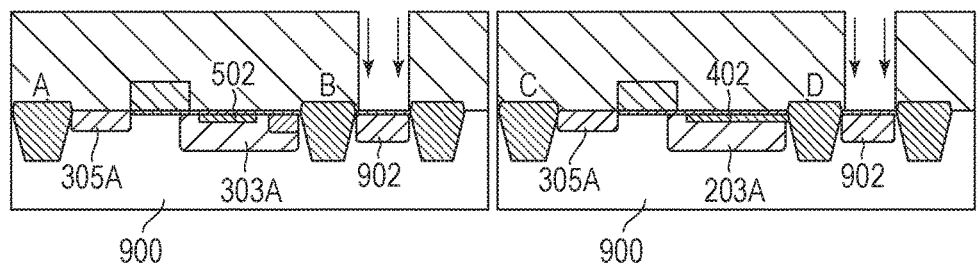
Figure 30E:
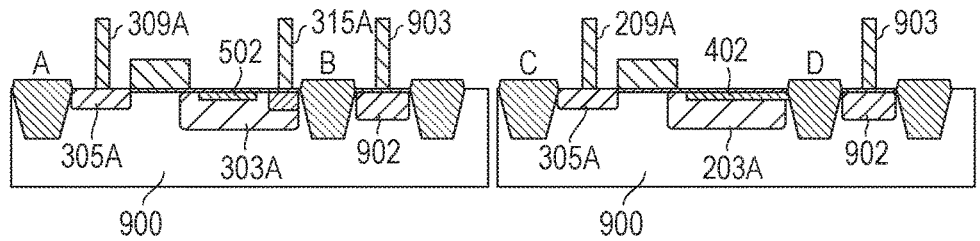

FIGS. 30A to 30E illustrate the method for manufacturing the image capturing device of the present embodiment. A and B of FIGS. 30A to 30E correspond to A and B of FIG. 28. Moreover, C and D of FIGS. 30A to 30E correspond to C and D of FIG. 26. FIG. 30E illustrates a configuration of the image capturing device of the present embodiment. A P-type semiconductor region 900 is formed across the first region 120 and the second region 122 illustrated in FIG. 1. Moreover, a P-type semiconductor region 902 having a higher impurity concentration than that of the P-type semiconductor region 900 is formed. A contact 903 is connected to the semiconductor region 902. An electric potential is provided from the contact 903 to the semiconductor region 900 via the semiconductor region 902.

In FIG. 30A, an element isolation portion 901 is formed. The element isolation portion 901 can be formed using, e.g., a shallow trench isolation (STI) method or a local-oxidation-of-silicon (LOCOS) method. Moreover, the semiconductor region 303A is formed by ion implantation. Further, a transfer gate 304A is formed by a PVD method.

FIG. 30B illustrates the step of forming a semiconductor region 205A, a semiconductor region 305A, and the semiconductor region 503. Other regions than a region where the semiconductor region 205A, the semiconductor region 305A, and the semiconductor region 503 are formed are masked with a photoresist. In such a masked state, dopant for forming an N-type semiconductor region such as arsenic is ion-implanted to the region forming the semiconductor region 205A, the semiconductor region 305A, and the semiconductor region 503. This forms the N-type semiconductor regions 205A, 305A, and 503. That is, the step of forming the semiconductor region 503 is performed in parallel with the step of forming the semiconductor regions 205A and 305A. Thus, the step of forming the semiconductor region 503 is not necessarily provided as a separate step. Consequently, beneficial effects including cost reduction due to reduction in the number of photomasks or reticles of a semiconductor exposure device and throughput improvement due to reduction in the number of steps are obtained.

FIG. 30C illustrates the step of forming a semiconductor region 402 and the semiconductor region 502. A mask using a photoresist is not formed on a semiconductor region 203A, whereas is formed on part of the semiconductor region 303A. Further, the semiconductor region 503 is masked using the photoresist. In such a masked state using the photoresist, dopant for forming a P-type semiconductor region such as boron is ion-implanted to a region where the semiconductor regions 402, 502 are formed. Such ion implantation is so-called "angled ion implantation" in which the direction of ion implantation is angled with respect to a semiconductor substrate normal line. By angled ion implantation, a portion to be a projected portion of the transfer gate 304A can be formed on a semiconductor substrate. This reduces ion implantation to the projected portion. As described above, the semiconductor regions 402 and 502 are formed in a region defined by the projected portion of the transfer gate 304A due to the angle of region ion implantation and the mask using the photoresist.

FIG. 30D illustrates the step of forming the semiconductor region 902. A mask is, using a photoresist, formed in other regions than an upper portion of a region to be the semiconductor region 902. In such a masked state, dopant for forming a P-type semiconductor region such as boron is implanted to the region where the semiconductor region 902 is formed. This forms the P-type semiconductor region 902.

Thereafter, an interlayer insulating film is formed on the semiconductor substrate. Then, a region where FD connection CNTs 209A, 309A, 315A, and 903 are formed is etched, and in this manner, openings are formed. A metal material such as tungsten is implanted to these openings, and in this manner, the FD connection CNTs 209A, 309A, 315A, and 903 are formed. That is, the step of forming the failure detection CNT 315A is performed in parallel with the step of forming the FD connection CNTs 209A, 309A, and 903. For this reason, the step of forming the failure detection CNT 315A is not necessarily provided as a separate step. Consequently, the beneficial effects including cost reduction due to reduction in the number of photomasks or reticles of the semiconductor exposure device and throughput improvement due to reduction in the number of steps are obtained.

As described above, pixels 110 and 111 for failure detection and pixels 105 and 106 for obtaining an image in the image capturing device of the present embodiment can be formed.

Seventh Embodiment

Regarding an image capturing device of the present embodiment, differences from the fifth embodiment will be mainly described.

The image capturing device of the present embodiment is configured such that the width of an active region where a photoelectric conversion unit of a failure detection pixel is provided is smaller than the width of an active region where a photoelectric conversion unit of an image obtaining pixel is provided.

Figure 31A:
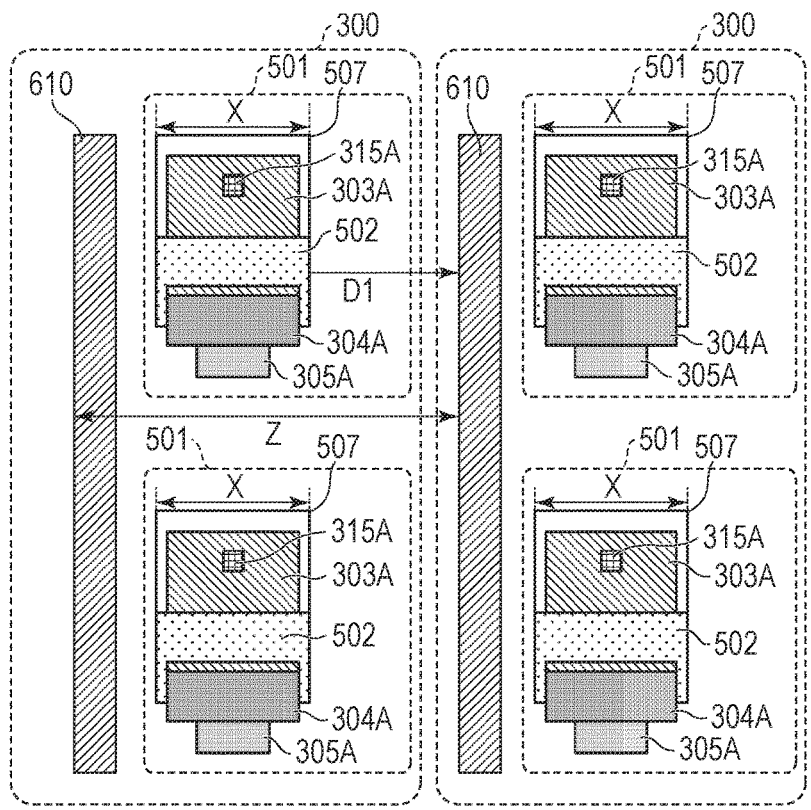
FIGS. 31A and 31B are upper views of a photoelectric conversion unit, a transfer transistor, and an active region where other transistors are formed.

FIG. 31A is an upper view of a photoelectric conversion unit PD, a reset transistor M2, and an active region 610 where an amplification transistor and a selection transistor are provided in a failure detection pixel 501 of the present embodiment.

The photoelectric conversion unit PD is formed in an active region 507. In FIG. 31A, the width of the active region 507 of the photoelectric conversion unit PD of the failure detection pixel 501 is illustrated as "X". The width X is the length of the active region 507 in a direction crossing the direction of extending a vertical output line 108 as illustrated in FIG. 25.

Figure 31B:
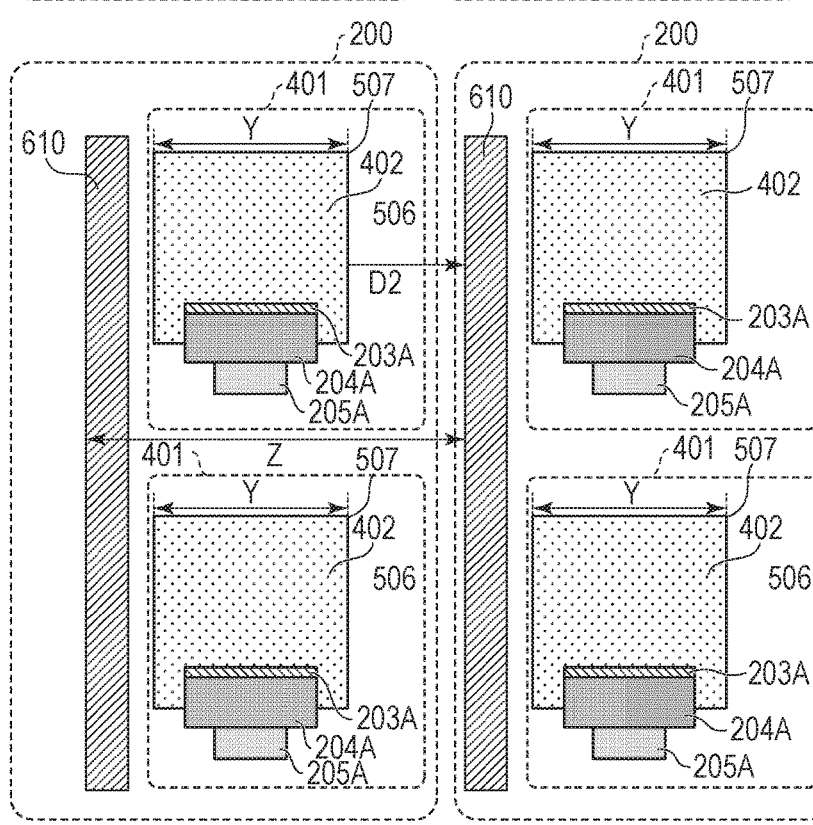

On the other hand, FIG. 31B is an upper view of a photoelectric conversion unit PD, a reset transistor M2, and an active region 610 where an amplification transistor and a selection transistor are provided in an image obtaining pixel 401 of the present embodiment.

The photoelectric conversion unit PD is formed in the active region 507. In FIG. 31B, the width of the active region 507 of the photoelectric conversion unit PD of the image obtaining pixel 401 is illustrated as "Y". The width Y is the length of the active region 507 in the direction crossing the direction of extending the vertical output line 108 as illustrated in FIG. 25.

In FIG. 31A, a distance from a semiconductor region 303A of one pixel cell 300 to the active region 610 of another pixel cell 300 provided with the transistors is illustrated as "D1". Moreover, in FIG. 31B, a distance from a semiconductor region 203A of one pixel cell 200 to the active region 610 of another pixel cell 200 provided with the transistors is illustrated as "D2". In the present embodiment, the width X is smaller than the width Y. With this configuration, the distance D1 can be longer than the distance D2. Thus, an electric field between the semiconductor region 303A of one pixel cell 200 and the active region 610 of another pixel cell 200 can be relaxed. This can reduce failure of the transistors formed in the active region 610 or the photoelectric conversion unit PD.

Eighth Embodiment

Regarding an image capturing device of the present embodiment, differences from the sixth embodiment will be mainly described.

Figure 32:
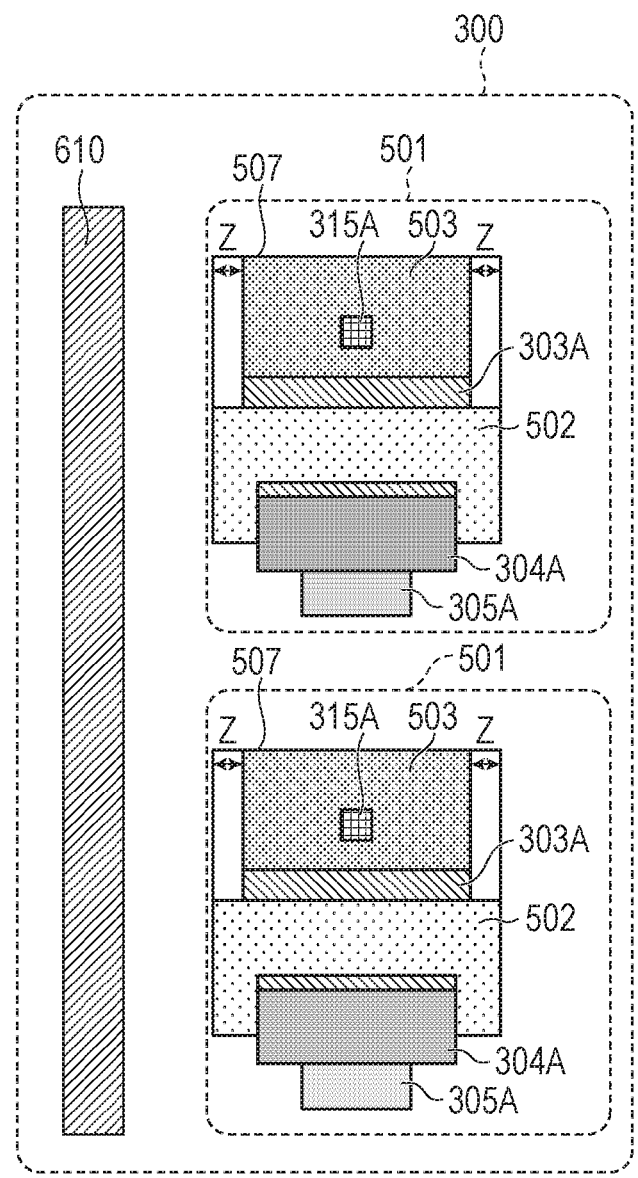
FIG. 32 is an upper view of a photoelectric conversion unit, a transfer transistor, and an active region where other transistors are formed.

In FIG. 32, The same reference numerals as those of FIG. 28 are used to represent members described with reference to FIG. 32 and having the same functions as those of FIG. 28.

FIG. 32 is an upper view of a pixel cell 300 for failure detection.

In FIG. 32, an active region 610 where an amplification transistor M3 and a selection transistor M4 are formed is arranged adjacent to pixels 501 of the failure detection pixel cell 300. An N-type semiconductor region 503 is a region having a higher impurity concentration than that of an N-type semiconductor region 303A. The semiconductor region 503 is formed inward of an end portion of an active region 507 of a photoelectric conversion unit PD by a distance Z. The distance Z is a distance from the end portion of the active region 507 of the photoelectric conversion unit PD to an end portion of the semiconductor region 503 in a direction crossing the direction of extending a vertical output line 108 as illustrated in FIG. 25.

With the distance Z, the image capturing device of the present embodiment can be configured such that an electric field generated between the photoelectric conversion unit PD and the active region 610 is relaxed. This can reduce failure of the transistors formed in the active region 610 or the photoelectric conversion unit PD.

Ninth Embodiment

Figure 33:
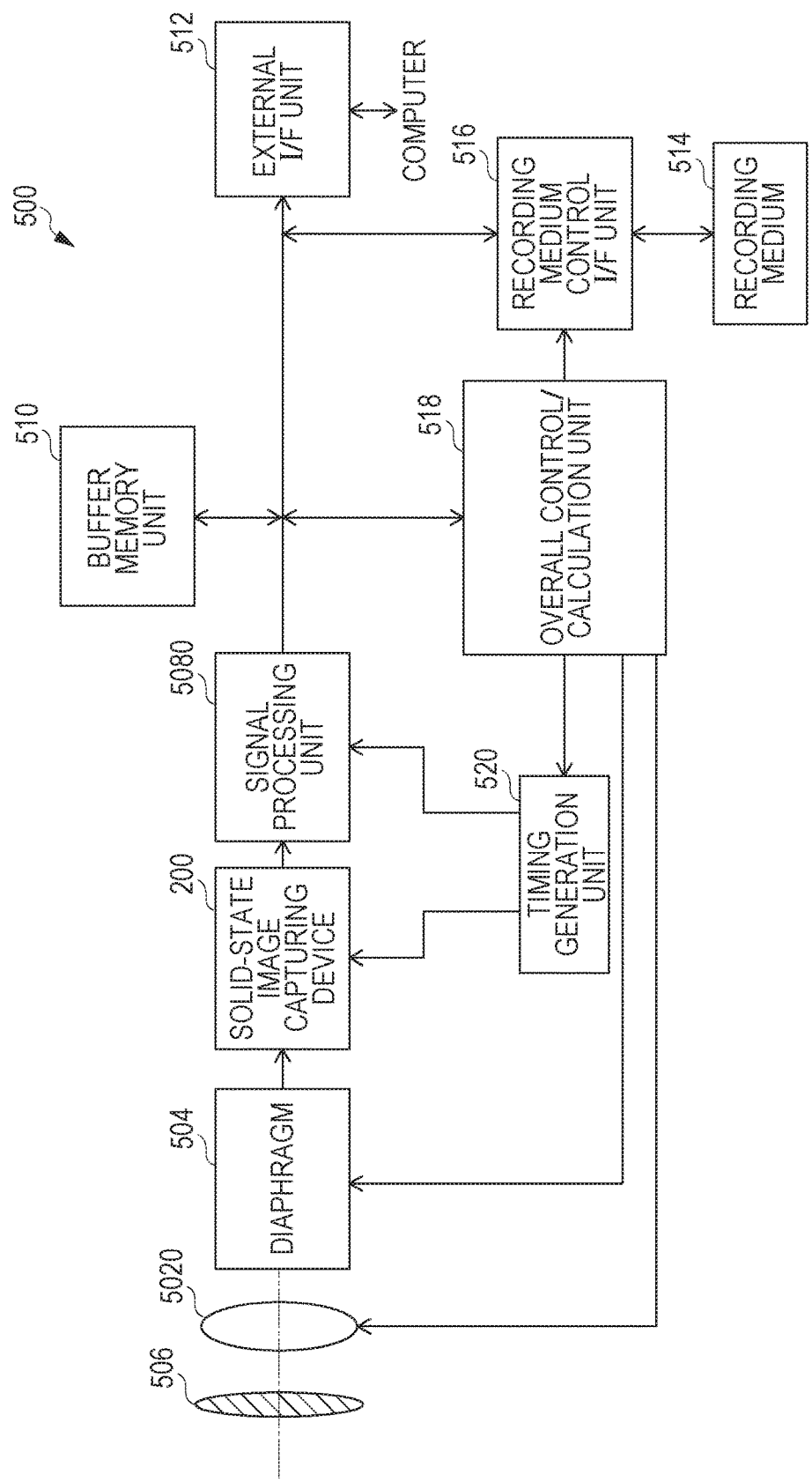
FIG. 33 is a diagram of the entirety of an image capturing system.

FIG. 33 is a block diagram of a configuration of an image capturing system 500 of the present embodiment. The image capturing system 500 of the present embodiment includes an image capturing device 200 to which any of the configurations of the image capturing devices described above in each embodiment has been applied. Specific examples of the image capturing system 500 include a digital still camera, a digital camcorder, and a security camera. FIG. 33 illustrates a configuration example of the digital still camera to which any of the above-described image capturing devices of the embodiments has been applied as the image capturing device 200.

The image capturing system 500 illustrated by way of example in FIG. 33 has the image capturing device 200, a lens 5020 configured to focus an optical image of an object onto the image capturing device 200, a diaphragm 504 configured to variably change the quantity of light passing through the lens 5020, and a barrier 506 configured to protect the lens 5020. The lens 5020 and the diaphragm 504 form an optical system configured to collect light to the image capturing device 200.

Moreover, the image capturing system 500 has a signal processing unit 5080 configured to process an output signal from the image capturing device 200. The signal processing unit 5080 performs, as necessary, the signal processing operation of performing various types of correction and compression for an input signal to output the input signal. The signal processing unit 5080 may have the function of performing AD conversion processing for the output signal from the image capturing device 200. In this case, an AD conversion circuit is not necessarily provided in the image capturing device 200.

Further, the image capturing system 500 has a buffer memory unit 510 configured to temporarily store image data, and an external interface unit (an external I/F unit) 512 configured to communicate with an external computer etc. Further, the image capturing system 500 has a recording medium 514 configured to record or read out captured image data, such as a semiconductor memory, and a recording medium control interface unit (a recording medium control I/F unit) 516 configured to perform recording or read-out for the recording medium 514. Note that the recording medium 514 may be built in the image capturing system 500, or may be detachable.

Further, the image capturing system 500 has an overall control/calculation unit 518 configured to perform various types of calculation and control the entirety of the digital still camera, and a timing generation unit 520 configured to output various timing signals to the image capturing device 200 and the signal processing unit 5080. The timing signals etc. described herein may be input from the outside, and the image capturing system 500 may have at least the image capturing device 200 and the signal processing unit 5080 configured to process the output signal from the image capturing device 200. The overall control/calculation unit 518 and the timing generation unit 520 may be configured such that some or all of control functions of the image capturing device 200 are implemented.

The image capturing device 200 outputs an image signal to the signal processing unit 5080. The signal processing unit 5080 performs predetermined signal processing for the image signal output from the image capturing device 200, thereby outputting the image data. Moreover, the signal processing unit 5080 uses the image signal to generate an image.

The image capturing system is configured using the image capturing device of each of the above-described embodiments, and therefore, is configured so that an image with better quality can be obtained can be realized.

Tenth Embodiment

An image capturing system and a moving body of the present embodiment will be described with reference to FIGS. 34A, 34B, and 35.

Figure 34A:
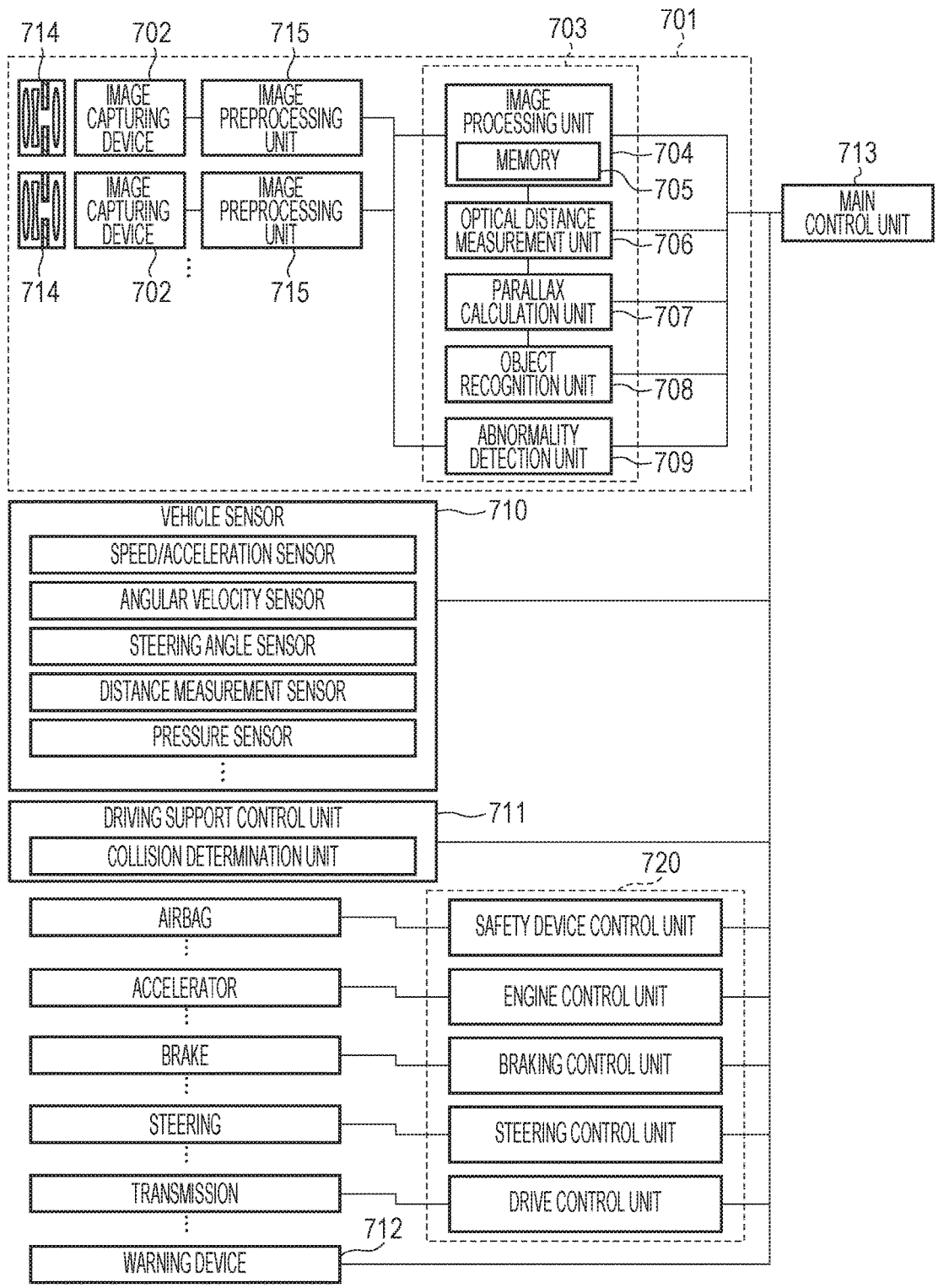
Figure 35:
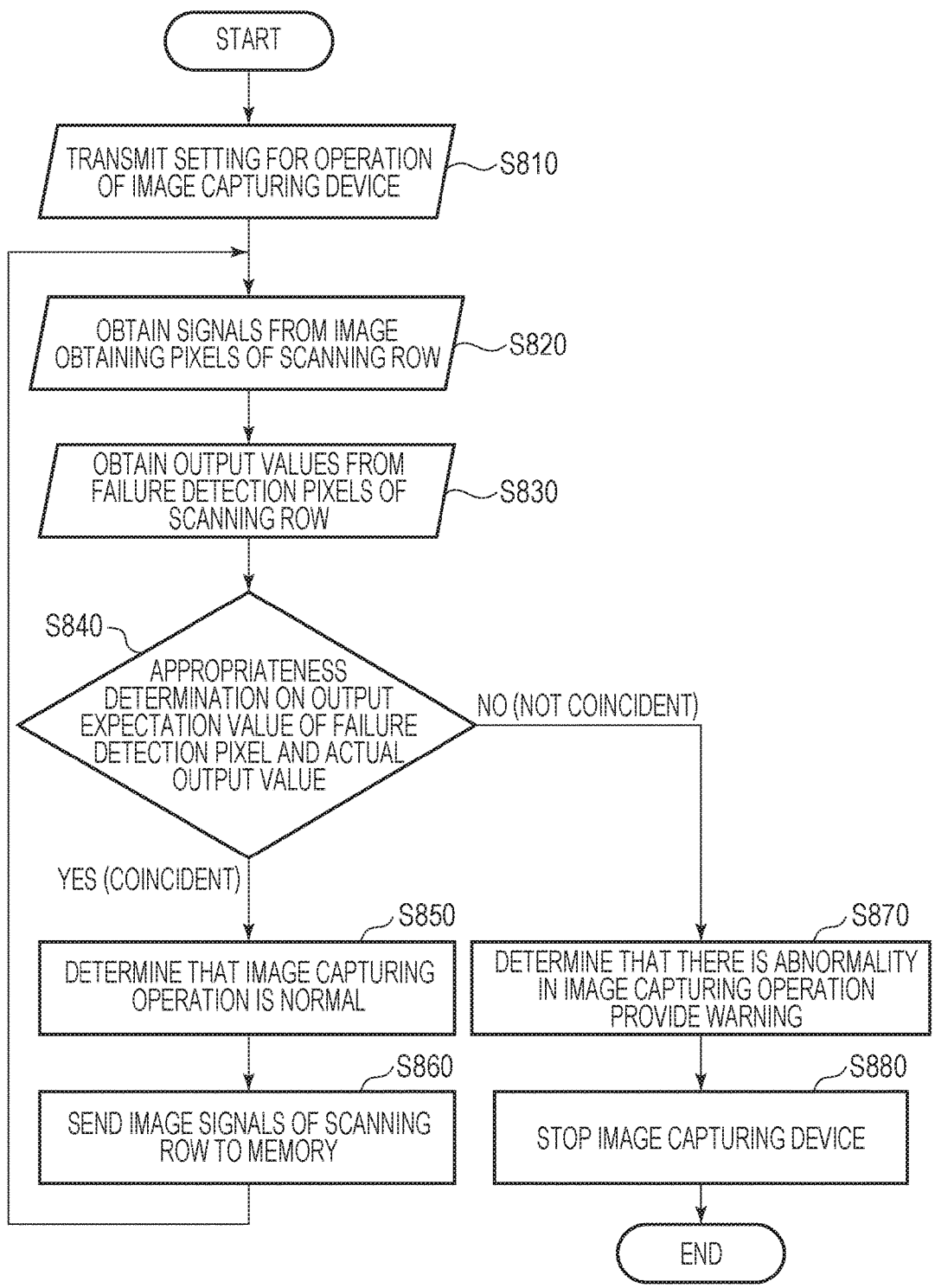
FIG. 35 is a control flowchart of the moving body.

FIGS. 34A and 34B are schematic views of configuration examples of the image capturing system and the moving body according to the present embodiment. FIG. 35 is a flowchart of operation of the image capturing system according to the present embodiment.

In the present embodiment, an example of the image capturing system for an on-vehicle camera will be described. FIGS. 34A and 34B illustrate examples of a vehicle system and the image capturing system mounted on the vehicle system. An image capturing system 701 includes image capturing devices 702, image preprocessing units 715, an integrated circuit 703, and optical systems 714. The optical system 714 is configured to focus an optical image of an object onto the image capturing device 702. The image capturing device 702 is configured to convert the optical image of the object focused by the optical system 714 into an electric signal. The image capturing device 702 is any of the image capturing devices of the above-described embodiments. The image preprocessing unit 715 is configured to perform predetermined signal processing for a signal output from the image capturing device 702. The function of the image preprocessing unit 715 may be incorporated into the image capturing device 702. The image capturing system 701 includes at least two pairs of optical systems 714, two pairs of image capturing devices 702, and two pairs of image preprocessing units 715. The output of each pair of image preprocessing units 715 is input to the integrated circuit 703.

The integrated circuit 703 is an integrated circuit for an image capturing system application. The integrated circuit 703 includes an image processing unit 704 having a memory 705, an optical distance measurement unit 706, a parallax calculation unit 707, an object recognition unit 708, and an abnormality detection unit 709. The image processing unit 704 is configured to perform image processing such as development processing or defect correction for the output signal of the image preprocessing unit 715. The memory 705 is configured to temporarily store a captured image and store a defect position of the captured image. The optical distance measurement unit 706 is configured to perform focusing or distance measurement for the object. The parallax calculation unit 707 is configured to calculate a parallax (a parallax image phase difference) from multiple pieces of image data obtained by the multiple image capturing devices 702. The object recognition unit 708 is configured to recognize the object such as a vehicle, a road, a sign, or a person. The abnormality detection unit 709 is configured to notify a main control unit 713 of an abnormality when the abnormality of the image capturing device 702 is sensed.

The integrated circuit 703 may be implemented by exclusively-designed hardware, may be implemented by a software module, or may be implemented by a combination thereof. The integrated circuit 703 may be implemented by a field programmable gate array (FPGA), an application specific integrated circuit (ASIC), etc., or may be implemented by a combination thereof.

The main control unit 713 is configured to overall control operation of the image capturing system 701, a vehicle sensor 710, a control unit 720. Note that a method may be employed, in which the image capturing system 701, the vehicle sensor 710, and the control unit 720 separately have, without the main control unit 713, communication interfaces and each perform transmission/receiving of a control signal via a communication network (e.g., CAN standards).

The integrated circuit 703 has the function of transmitting the control signal or a set value to the image capturing devices 702 in response to the control signal from the main control unit 713 or by the control unit itself. For example, the integrated circuit 703 transmits a setting for pulse-driving a voltage switch 13 in the image capturing device 702 or a setting for switching the voltage switch 13 for each frame.

The image capturing system 701 is connected to the vehicle sensor 710, and can sense a vehicle running state such as a vehicle speed, a yaw rate, and a steering angle, outer-vehicle environment, and states of other vehicles and objects. The vehicle sensor 710 is a distance information obtaining unit configured to obtain distance information from the parallax image to the object. Moreover, the image capturing system 701 is connected to a driving support control unit 711 configured to perform various types of driving support such as automatic steering, automatic travelling, and collision prevention functions. Specifically, regarding a collision determination function, estimation of collision with other vehicles/objects and the presence or absence of collision are determined based on sensing results of the image capturing system 701 and the vehicle sensor 710. Thus, avoidance control upon estimation of collision and activation of a safety device upon collision are performed.

Moreover, the image capturing system 701 is also connected to a warning device 712 configured to provide a warning to a driver based on a determination result of a collision determination unit. For example, in a case where the determination result of the collision determination unit shows a high probability of collision, the main control unit 713 performs the vehicle control of avoiding collision and reducing damage by, e.g., braking, returning of an accelerator, or suppression of engine output. The warning device 712 is configured to warn a user by, e.g., setting off of an alarm such as sound, displaying of warning information on a display unit screen of a car navigation system, a meter panel, etc., or application of vibration to a seat belt or a steering.

In the present embodiment, an image of the periphery of the vehicle, such as the front or back of the vehicle, is picked up by the image capturing system 701. FIG. 34B illustrates an arrangement example of the image capturing system 701 in the case of picking up the image of the front of the vehicle by the image capturing system 701.

Two image capturing devices 702 are arranged in the front of a vehicle 700. In one embodiment, two image capturing devices 702 are arranged symmetrically with respect to the line of symmetry as an advancing/retreating direction of the vehicle 700 or a center line of an outer shape (e.g., a vehicle width) of the vehicle 700 in obtaining of information on a distance between the vehicle 700 and a target object or determination in the collision probability. Moreover, for the image capturing devices 702, not blocking the field of view of the driver when the driver visually recognizes a situation outside the vehicle 700 from a driver's seat is arranged. The warning device 712 is arranged such that the warning device 712 easily comes into sight of the driver.

Next, failure detection operation of the image capturing devices 702 in the image capturing system 701 will be described with reference to FIG. 35. The failure detection operation of the image capturing devices 702 is performed according to steps S810 to S880 illustrated in FIG. 35.

Step S810 is the step of performing setting upon start-up of the image capturing devices 702. That is, a setting for operation of the image capturing devices 702 is transmitted from the outside (e.g., the main control unit 713) of the image capturing system 701 or the inside of the image capturing system 701, and image capturing operation and the failure detection operation of the image capturing devices 702 begin. The setting for operation of the image capturing devices 702 includes a setting for control of the voltage switch 13.

Subsequently, at step S820, signals are obtained from pixels 105 and 106 of a first region 10 as an image obtaining pixel region belonging to a scanning row. Moreover, at step S830, output values are obtained from pixels 110 and 111 of a second region 11 belonging to the scanning row. Note that step S820 and step S830 may be interchanged.

Subsequently, at step S840, appropriateness determination is made for an output expectation value of the pixels 110 and 111 based on the setting of connection of fixed voltage terminals V0 and V1 to the pixels 110 and 111 and an actual output value from the pixels 110 and 111.

As a result of appropriateness determination at step S840, in a case where the output expectation value and the actual output value are coincident with each other, the processing transitions to step S850, and it is determined that the image capturing operation in the first region 10 is normally performed. Then, the processing step transitions to step S860. At step S860, the pixel signals of the scanning row are transmitted and temporarily saved in the memory 705. Thereafter, the processing returns to step S820, and the failure detection operation is continued.

On the other hand, in a case where the output expectation value and the actual output value are not coincident with each other as a result of appropriateness determination at step S840, the processing step transitions to step S870. At step S870, it is determined that there is an abnormality in the image capturing operation in the first region 10, and a warning is provided to the main control unit 713 or the warning device 712. The warning device 712 displays, on a display unit, the sensed abnormality. Thereafter, the image capturing devices 702 are stopped at step S880, and operation of the image capturing system 701 is completed.

Note that in the present embodiment, an example where the flowchart is repeated in a loop for each row has been described. However, the flowchart may be repeated in a loop for every multiple rows, or the failure detection operation may be performed for each frame.

Moreover, in the present embodiment, the control of avoiding collision with other vehicles has been described, but the present embodiment is also applicable to, e.g., the control of performing automatic driving to follow other vehicles or the control of performing automatic driving not to run over a traffic lane. Further, the image capturing system 701 is not limited to the vehicle such as an automobile, and is also applicable to moving bodies (movement devices) such as ships, airplanes, and industrial robots. In addition, the image capturing system 701 is not limited to the moving bodies, but is also applicable to equipment broadly used for object recognition, such as an intelligent transportation system (ITS).

[Variations]

The disclosure is not limited to the above-described embodiments, and variations can be made to the disclosure.

For example, the embodiments of the disclosure may include an example where some configurations of any of the embodiments are added to other embodiments, and an example where some configurations of any of the embodiments are replaced with some configurations of other embodiments.

The example illustrated in FIG. 22 is an example where the first region 120, the second region 122, the vertical scanning circuit 102, the column circuits 103, the horizontal scanning circuit 104, and the control unit 107 are provided at the single semiconductor substrate (chip). In another example, a multilayer image capturing device may be employed, in which a pixel chip provided with the first region 120 and the second region 122 and a signal processing chip provided with the vertical scanning circuit 102, the column circuits 103, the horizontal scanning circuit 104, and the control unit 107 are stacked on each other. In this case, the column circuits 103 may be part of the first region 120 and the second region 122, and the single column circuit 103 may be configured corresponding to a single block including multiple pixels arranged in multiple rows and multiple columns. That is, the first region 120 and the second region 122 may be divided into multiple blocks, and the single column circuit 103 may be provided corresponding to one of the multiple blocks.

The pixel circuit configurations described so far are not limited to those illustrated in FIGS. 3A to 3C and FIG. 23, and changes can be made as necessary. For example, the pixels 105, 110, and 111 of FIG. 23 may form a dual pixel structure in which two photoelectric conversion units are arranged for a single microlens.

Any of the above-described embodiments is merely a specific example in implementation of the disclosure, and the technical scope of the disclosure shall not be interpreted in a limited way from these examples. That is, the disclosure can be implemented in various forms without departing from the technical idea or main features of the disclosure. Moreover, the embodiments described so far can be implemented in various combinations.

According to the aspect of the embodiments, a circuit configured to suitably read out signals from reference pixels can be realized, the circuit contributing to high-speed determination of the presence or absence of failure of an image capturing device in a case where the reference pixels are arranged in multiple rows.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-143686, filed Jul. 25, 2017, which is hereby incorporated by reference herein in its entirety.

What is claimed is:

1. An image capturing device comprising:
effective pixels each configured to output a signal corresponding to a quantity of incident light and arranged in rows and columns;
reference pixels arranged in the rows and configured to output pixel signals forming address signals indicating positions of a row to which the reference pixels belong; and
a vertical scanning circuit having control signal output units each provided corresponding to the rows and each configured to output a control signal for controlling effective pixels and reference pixels of a corresponding one of the rows.

2. The image capturing device according to claim 1, wherein
the control signal output units are each arranged corresponding to the rows in units of a pair of one of the rows and one of the control signal output units.

3. The image capturing device according to claim 1, wherein
the control signal output units are each arranged corresponding to the rows in units of a group of some of the rows and one of the control signal output units.

4. The image capturing device according to claim 1, wherein
in ones of the reference pixels in each row, a sub-address signal formed of reference pixel signals of one of groups of the ones of the reference pixels in the each row is repeated for the groups, thereby forming the address signal indicating the position of the row to which the ones of the reference signals belong.

5. The image capturing device according to claim 1, wherein
the vertical scanning circuit is a decoder.

6. The image capturing device according to claim 5, wherein
the decoder includes an address decoder circuit configured to receive a scanning instruction signal containing information on an instruction for a scanning row and output a decoder signal based on the scanning instruction signal to the control signal output units, and
the address signal has a value corresponding to a value of the decoder signal.

7. The image capturing device according to claim 1, wherein
a first voltage supply line configured to supply a first voltage is connected to ones of the reference pixels, and the ones of the reference pixels output, as the pixel signals, signals corresponding to the first voltage, and
a second voltage supply line configured to supply a second voltage is connected to other ones of the reference pixels, and the other ones of the reference pixels output, as the pixel signals, signals corresponding to the second voltage.

8. The image capturing device according to claim 7, wherein
the signals corresponding to the first voltage and the signals corresponding to the second voltage form the address signals.

9. The image capturing device according to claim 7, wherein
each reference pixel has an amplification transistor, a reset transistor connected to a gate of the amplification transistor, and a transfer transistor having one node and the other node connected to the amplification transistor,
the first voltage supply line is connected to the one node of the transfer transistor of each of the ones of the reference pixels, and
the second voltage supply line is connected to the other node of the transfer transistor of each of the other ones of the reference pixels.

10. The image capturing device according to claim 1, wherein effective pixels and reference pixels included in one of the rows are connected to a corresponding one of the control signal output units via a common control line.

11. The image capturing device according to claim 1, wherein
each of the control signal output units is a buffer circuit.

12. The image capturing device according to claim 1, wherein
signal values of the address signals vary according to frame.

13. The image capturing device according to claim 1, wherein
the reference pixels are formed on a semiconductor substrate,
each reference pixel includes a first semiconductor region of a first conductivity type, a floating diffusion region of the first conductivity type, and a transfer gate positioned between the first semiconductor region and the floating diffusion region and provided on a principal surface of the semiconductor substrate,
in each reference pixel, an electric potential is supplied from a contact to a partial region of the first semiconductor region, and
a second semiconductor region of a second conductivity type is further provided, the second semiconductor region being formed in a region between the first semiconductor region and the principal surface and between the partial region and the transfer gate as viewed in plane.

14. The image capturing device according to claim 1, further comprising:
a detection unit configured to compare the pixel signal output from each reference pixel with an expectation value, thereby generating a signal for providing notification of an abnormality in a case where the pixel signal output from the each reference pixel is different from the expectation value.

15. A pixel chip comprising:
effective pixels each configured to output a signal corresponding to a quantity of incident light and arranged in rows and columns; and
reference pixels arranged in the rows and configured to output pixel signals forming address signals indicating positions of a row to which the reference pixels belong,
wherein from control signal output units provided in a vertical scanning circuit and each provided corresponding to the rows, a control signal for controlling effective pixels and reference pixels of a corresponding one of the rows is output.

16. A signal processing chip comprising:
a vertical scanning circuit including control signal output units,
wherein the control signal output units are each arranged corresponding to rows of pixels arranged in the rows,
the pixels include effective pixels arranged in rows and columns, and reference pixels arranged in the rows and configured to output pixel signals forming address signals indicating positions of a row to which the reference pixels belong, and
each control signal output unit is configured to output a control signal for controlling effective pixels and reference pixels of a corresponding one of the rows.

17. An image capturing system comprising:
the image capturing device according to claim 1; and
a signal processing unit configured to generate an image using a signal output from the image capturing device.

18. An image capturing system comprising:
the image capturing device according to claim 1; and
a detection unit configured to compare the pixel signal output from each reference pixel with an expectation value, thereby generating a signal for providing notification of an abnormality in a case where the pixel signal output from the each reference pixel is different from the expectation value.

19. A moving body comprising:
the image capturing device according to claim 1;
a processing device configured to process the pixel signal output from each effective pixel of the image capturing device; and
a control unit configured to control the moving body based on a processing result.

20. A moving body comprising:
the image capturing device according to claim 1; and
a detection unit configured to compare the pixel signal output from each reference pixel with an expectation value, thereby generating a signal for providing notification of an abnormality in a case where the pixel signal output from the each reference pixel is different from the expectation value.

* * * * *